US008654073B2

(12) United States Patent
Konishi

(10) Patent No.: US 8,654,073 B2
(45) Date of Patent: Feb. 18, 2014

(54) INFORMATION PROCESSING PROGRAM HAVING COMPUTER-READABLE STORAGE MEDIUM THEREIN AND INFORMATION PROCESSING APPARATUS

(75) Inventor: Yoshinori Konishi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1077 days.

(21) Appl. No.: 12/632,314

(22) Filed: Dec. 7, 2009

(65) Prior Publication Data

US 2011/0074665 A1 Mar. 31, 2011

(30) Foreign Application Priority Data

Sep. 30, 2009 (JP) ................................ 2009-228120

(51) Int. Cl.
*G09G 5/00* (2006.01)
(52) U.S. Cl.
USPC .......................................................... 345/156
(58) Field of Classification Search
None
See application file for complete search history.

(56) References Cited

U.S. PATENT DOCUMENTS

| 588,172 A | 8/1897 | Peters |
| 688,076 A | 12/1901 | Ensign |
| D188,376 S | 7/1960 | Hotkins et al. |
| 3,184,962 A | 5/1965 | Gay |
| 3,217,536 A | 11/1965 | Motsinger et al. |
| 3,424,005 A | 1/1969 | Brown |
| 3,428,312 A | 2/1969 | Machen |
| 3,712,294 A | 1/1973 | Muller |
| 3,752,144 A | 8/1973 | Weigle, Jr. |
| 3,780,817 A | 12/1973 | Videon |
| 3,826,145 A | 7/1974 | McFarland |
| 3,869,007 A | 3/1975 | Haggstrom et al. |
| 4,058,178 A | 11/1977 | Shinohara et al. |
| 4,104,119 A | 8/1978 | Schilling |
| 4,136,682 A | 1/1979 | Pedotti |
| 4,246,783 A | 1/1981 | Steven et al. |
| 4,296,931 A | 10/1981 | Yokoi |
| 4,337,050 A | 6/1982 | Engalitcheff, Jr. |
| 4,404,854 A | 9/1983 | Krempl et al. |
| 4,488,017 A | 12/1984 | Lee |
| 4,494,754 A | 1/1985 | Wagner, Jr. |

(Continued)

FOREIGN PATENT DOCUMENTS

| DE | 40 04 554 | 8/1991 |
| DE | 195 02 918 | 8/1996 |

(Continued)

OTHER PUBLICATIONS

Addlesee, M.D., et al., "The ORL Active Floor," IEEE—Personal Communications, Oct. 1997.

(Continued)

*Primary Examiner* — Nicholas Lee
(74) *Attorney, Agent, or Firm* — Nixon & Vanderhye, P.C.

(57) ABSTRACT

A game apparatus calculates a first evaluation value based on the difference between the time when the load value detected by a load controller becomes the maximum and the time when the velocity of the center of gravity, which represents the velocity of movement of the position of the center of gravity, becomes the maximum. The game apparatus calculates a second evaluation value based on the velocity of load, which represents the degree of increase in the load in a predetermined time period, and the velocity of the center of gravity. The game apparatus calculates a third evaluation value based on the path of the position of the center of gravity. The game apparatus calculates the amount of slice based on the first through third evaluation values.

27 Claims, 20 Drawing Sheets

(56) References Cited

U.S. PATENT DOCUMENTS

| | | |
|---|---|---|
| 4,558,757 A | 12/1985 | Mori et al. |
| 4,569,519 A | 2/1986 | Mattox et al. |
| 4,574,899 A | 3/1986 | Griffin |
| 4,577,868 A | 3/1986 | Kiyonaga |
| 4,598,717 A | 7/1986 | Pedotti |
| 4,607,841 A | 8/1986 | Gala |
| 4,630,817 A | 12/1986 | Buckleu |
| 4,660,828 A | 4/1987 | Weiss |
| 4,680,577 A | 7/1987 | Straayer et al. |
| 4,688,444 A | 8/1987 | Nordstrom |
| 4,691,694 A | 9/1987 | Boyd et al. |
| 4,711,447 A | 12/1987 | Mansfield |
| 4,726,435 A | 2/1988 | Kitagawa et al. |
| 4,739,848 A | 4/1988 | Tulloch |
| 4,742,832 A | 5/1988 | Kauffmann et al. |
| 4,742,932 A | 5/1988 | Pedragosa |
| 4,800,973 A | 1/1989 | Angel |
| 4,838,173 A | 6/1989 | Schroeder et al. |
| 4,855,704 A | 8/1989 | Betz |
| 4,880,069 A | 11/1989 | Bradley |
| 4,882,677 A | 11/1989 | Curran |
| 4,893,514 A | 1/1990 | Gronert et al. |
| 4,907,797 A | 3/1990 | Gezari et al. |
| 4,927,138 A | 5/1990 | Ferrari |
| 4,970,486 A | 11/1990 | Gray et al. |
| 4,982,613 A | 1/1991 | Becker |
| D318,073 S | 7/1991 | Jang |
| 5,044,956 A | 9/1991 | Behensky et al. |
| 5,049,079 A | 9/1991 | Furtado et al. |
| 5,052,406 A | 10/1991 | Nashner |
| 5,054,771 A | 10/1991 | Mansfield |
| 5,065,631 A | 11/1991 | Ashpitel et al. |
| 5,089,960 A | 2/1992 | Sweeney, Jr. |
| 5,103,207 A | 4/1992 | Kerr et al. |
| 5,104,119 A | 4/1992 | Lynch |
| 5,116,296 A | 5/1992 | Watkins et al. |
| 5,118,112 A | 6/1992 | Bregman et al. |
| 5,151,071 A | 9/1992 | Jain et al. |
| 5,195,746 A | 3/1993 | Boyd et al. |
| 5,197,003 A | 3/1993 | Moncrief et al. |
| 5,199,875 A | 4/1993 | Trumbull |
| 5,203,563 A | 4/1993 | Loper, III |
| 5,207,426 A | 5/1993 | Inoue et al. |
| 5,259,252 A | 11/1993 | Kruse et al. |
| 5,269,318 A | 12/1993 | Nashner |
| 5,299,810 A | 4/1994 | Pierce et al. |
| 5,303,715 A | 4/1994 | Nashner et al. |
| 5,360,383 A | 11/1994 | Boren |
| 5,362,298 A | 11/1994 | Brown et al. |
| 5,368,546 A | 11/1994 | Stark et al. |
| 5,405,152 A | 4/1995 | Katanics et al. |
| 5,431,569 A | 7/1995 | Simpkins et al. |
| 5,462,503 A | 10/1995 | Benjamin et al. |
| 5,466,200 A | 11/1995 | Ulrich et al. |
| 5,469,740 A | 11/1995 | French et al. |
| 5,474,087 A | 12/1995 | Nashner |
| 5,476,103 A | 12/1995 | Nahsner |
| 5,507,708 A | 4/1996 | Ma |
| 5,541,621 A | 7/1996 | Nmngani |
| 5,541,622 A | 7/1996 | Engle et al. |
| 5,547,439 A | 8/1996 | Rawls et al. |
| 5,551,445 A | 9/1996 | Nashner |
| 5,551,693 A | 9/1996 | Goto et al. |
| 5,577,981 A | 11/1996 | Jarvik |
| D376,826 S | 12/1996 | Ashida |
| 5,584,700 A | 12/1996 | Feldman et al. |
| 5,584,779 A | 12/1996 | Knecht et al. |
| 5,591,104 A | 1/1997 | Andrus et al. |
| 5,613,690 A | 3/1997 | McShane et al. |
| 5,623,944 A | 4/1997 | Nashner |
| 5,627,327 A | 5/1997 | Zanakis |
| D384,115 S | 9/1997 | Wilkinson et al. |
| 5,669,773 A | 9/1997 | Gluck |
| 5,689,285 A | 11/1997 | Asher |
| 5,690,582 A | 11/1997 | Ulrich et al. |
| 5,697,791 A | 12/1997 | Nasher et al. |
| 5,713,794 A | 2/1998 | Shimojima et al. |
| 5,721,566 A | 2/1998 | Rosenberg et al. |
| 5,746,684 A | 5/1998 | Jordan |
| 5,785,630 A | 7/1998 | Bobick et al. |
| D397,164 S | 8/1998 | Goto |
| 5,788,618 A | 8/1998 | Joutras |
| 5,792,031 A | 8/1998 | Alton |
| 5,800,314 A | 9/1998 | Sakakibara et al. |
| 5,805,138 A | 9/1998 | Brawne et al. |
| 5,813,958 A | 9/1998 | Tomita |
| 5,814,740 A | 9/1998 | Cook et al. |
| 5,820,462 A | 10/1998 | Yokoi et al. |
| 5,825,308 A | 10/1998 | Rosenberg |
| 5,837,952 A | 11/1998 | Oshiro et al. |
| D402,317 S | 12/1998 | Goto |
| 5,846,086 A | 12/1998 | Bizzi et al. |
| 5,853,326 A | 12/1998 | Goto et al. |
| 5,854,622 A | 12/1998 | Brannon |
| 5,860,861 A | 1/1999 | Lipps et al. |
| 5,864,333 A | 1/1999 | O'Heir |
| 5,872,438 A | 2/1999 | Roston |
| 5,886,302 A | 3/1999 | Germanton et al. |
| 5,888,172 A | 3/1999 | Andrus et al. |
| 5,889,507 A | 3/1999 | Engle et al. |
| D407,758 S | 4/1999 | Isetani et al. |
| 5,890,995 A | 4/1999 | Bobick et al. |
| 5,897,457 A | 4/1999 | Mackovjak |
| 5,897,469 A | 4/1999 | Yalch |
| 5,901,612 A | 5/1999 | Letovsky |
| 5,902,214 A | 5/1999 | Makikawa et al. |
| 5,904,639 A | 5/1999 | Smyser et al. |
| D411,258 S | 6/1999 | Isetani et al. |
| 5,912,659 A | 6/1999 | Rutledge et al. |
| 5,919,092 A | 7/1999 | Yokoi et al. |
| 5,921,780 A | 7/1999 | Myers |
| 5,921,899 A | 7/1999 | Rose |
| 5,929,782 A | 7/1999 | Stark et al. |
| 5,947,824 A | 9/1999 | Minami et al. |
| 5,976,063 A | 11/1999 | Joutras et al. |
| 5,980,256 A | 11/1999 | Carmein |
| 5,980,429 A | 11/1999 | Nashner |
| 5,984,785 A | 11/1999 | Takeda et al. |
| 5,987,982 A | 11/1999 | Wenman et al. |
| 5,989,157 A | 11/1999 | Walton |
| 5,993,356 A | 11/1999 | Houston et al. |
| 5,997,439 A | 12/1999 | Ohsuga et al. |
| 6,001,015 A | 12/1999 | Nishiumi et al. |
| 6,007,428 A | 12/1999 | Nishiumi et al. |
| 6,010,465 A | 1/2000 | Nashner |
| D421,070 S | 2/2000 | Jang et al. |
| 6,037,927 A | 3/2000 | Rosenberg |
| 6,038,488 A | 3/2000 | Barnes et al. |
| 6,044,772 A | 4/2000 | Gaudette et al. |
| 6,063,046 A | 5/2000 | Allum |
| 6,086,518 A | 7/2000 | MacCready, Jr. |
| 6,102,803 A | 8/2000 | Takeda et al. |
| 6,102,832 A | 8/2000 | Tani |
| D431,051 S | 9/2000 | Goto |
| 6,113,237 A | 9/2000 | Ober et al. |
| 6,147,674 A | 11/2000 | Rosenberg et al. |
| 6,152,564 A | 11/2000 | Ober et al. |
| D434,769 S | 12/2000 | Goto |
| D434,770 S | 12/2000 | Goto |
| 6,155,926 A | 12/2000 | Miyamoto et al. |
| 6,162,189 A | 12/2000 | Girone et al. |
| 6,167,299 A | 12/2000 | Galchenkov et al. |
| 6,190,287 B1 | 2/2001 | Nashner |
| 6,200,253 B1 | 3/2001 | Nishiumi et al. |
| 6,203,432 B1 | 3/2001 | Roberts et al. |
| 6,216,542 B1 | 4/2001 | Stockli et al. |
| 6,216,547 B1 | 4/2001 | Lehtovaara |
| 6,220,865 B1 | 4/2001 | Macri et al. |
| D441,369 S | 5/2001 | Goto |
| 6,225,977 B1 | 5/2001 | Li |
| 6,227,968 B1 | 5/2001 | Suzuki et al. |
| 6,228,000 B1 | 5/2001 | Jones |
| 6,231,444 B1 | 5/2001 | Goto |
| 6,239,806 B1 | 5/2001 | Nishiumi et al. |

(56) References Cited

U.S. PATENT DOCUMENTS

| | | |
|---|---|---|
| 6,241,611 B1 | 6/2001 | Takeda et al. |
| 6,244,987 B1 | 6/2001 | Ohsuga et al. |
| D444,469 S | 7/2001 | Goto |
| 6,264,558 B1 | 7/2001 | Nishiumi et al. |
| 6,280,361 B1 | 8/2001 | Harvey et al. |
| D447,968 S | 9/2001 | Pagnacco et al. |
| 6,295,878 B1 | 10/2001 | Berme |
| 6,296,595 B1 | 10/2001 | Stark et al. |
| 6,325,718 B1 | 12/2001 | Nishiumi et al. |
| 6,330,837 B1 | 12/2001 | Charles et al. |
| 6,336,891 B1 | 1/2002 | Fedrigon et al. |
| 6,353,427 B1 | 3/2002 | Rosenberg |
| 6,354,155 B1 | 3/2002 | Berme |
| 6,357,827 B1 | 3/2002 | Brightbill et al. |
| 6,359,613 B1 | 3/2002 | Poole |
| D456,410 S | 4/2002 | Ashida |
| D456,854 S | 5/2002 | Ashida |
| D457,570 S | 5/2002 | Brinson |
| 6,387,061 B1 | 5/2002 | Nitto |
| 6,388,655 B1 | 5/2002 | Leung |
| 6,389,883 B1 | 5/2002 | Berme et al. |
| 6,394,905 B1 | 5/2002 | Takeda et al. |
| 6,402,635 B1 | 6/2002 | Nesbit et al. |
| D459,727 S | 7/2002 | Ashida |
| D460,506 S | 7/2002 | Tamminga et al. |
| 6,421,056 B1 | 7/2002 | Nishiumi et al. |
| 6,436,058 B1 | 8/2002 | Krahner et al. |
| D462,683 S | 9/2002 | Ashida |
| 6,454,679 B1 | 9/2002 | Radow |
| 6,461,297 B1 | 10/2002 | Pagnacco et al. |
| 6,470,302 B1 | 10/2002 | Cunningham et al. |
| 6,482,010 B1 | 11/2002 | Marcus et al. |
| 6,510,749 B1 | 1/2003 | Pagnacco et al. |
| 6,514,145 B1 | 2/2003 | Kawabata et al. |
| 6,515,593 B1 | 2/2003 | Stark et al. |
| 6,516,221 B1 | 2/2003 | Hirouchi et al. |
| D471,594 S | 3/2003 | Nojo |
| 6,543,769 B1 | 4/2003 | Podoloff et al. |
| 6,563,059 B2 | 5/2003 | Lee |
| 6,568,334 B1 | 5/2003 | Gaudette et al. |
| 6,616,579 B1 | 9/2003 | Reinbold et al. |
| 6,624,802 B1 | 9/2003 | Klein et al. |
| 6,632,158 B1 | 10/2003 | Nashner |
| 6,636,161 B2 | 10/2003 | Rosenberg |
| 6,636,197 B1 | 10/2003 | Goldenberg et al. |
| 6,638,175 B2 | 10/2003 | Lee et al. |
| 6,663,058 B1 | 12/2003 | Peterson et al. |
| 6,676,520 B2 | 1/2004 | Nishiumi et al. |
| 6,676,569 B1 | 1/2004 | Radow |
| 6,679,776 B1 | 1/2004 | Nishiumi et al. |
| 6,697,049 B2 | 2/2004 | Lu |
| 6,719,667 B2 | 4/2004 | Wong et al. |
| 6,726,566 B2 | 4/2004 | Komata |
| 6,764,429 B1 | 7/2004 | Michalow |
| 6,797,894 B2 | 9/2004 | Montagnino et al. |
| 6,811,489 B1 | 11/2004 | Shimizu et al. |
| 6,813,966 B2 | 11/2004 | Dukart |
| 6,817,973 B2 | 11/2004 | Merril et al. |
| D500,100 S | 12/2004 | Van Der Meer |
| 6,846,270 B1 | 1/2005 | Etnyre |
| 6,859,198 B2 | 2/2005 | Onodera et al. |
| 6,872,139 B2 | 3/2005 | Sato et al. |
| 6,872,187 B1 | 3/2005 | Stark et al. |
| 6,888,076 B2 | 5/2005 | Hetherington |
| 6,913,559 B2 | 7/2005 | Smith |
| 6,936,016 B2 | 8/2005 | Berme et al. |
| D510,391 S | 10/2005 | Merril et al. |
| 6,975,302 B1 | 12/2005 | Ausbeck, Jr. |
| 6,978,684 B2 | 12/2005 | Nurse |
| 6,991,483 B1 | 1/2006 | Milan et al. |
| D514,627 S | 2/2006 | Merril et al. |
| 7,004,787 B2 | 2/2006 | Milan |
| D517,124 S | 3/2006 | Merril et al. |
| 7,011,605 B2 | 3/2006 | Shields |
| 7,033,176 B2 | 4/2006 | Feldman et al. |
| 7,038,855 B2 | 5/2006 | French et al. |
| 7,040,986 B2 | 5/2006 | Koshima et al. |
| 7,070,542 B2 | 7/2006 | Reyes et al. |
| 7,083,546 B2 | 8/2006 | Zillig et al. |
| 7,100,439 B2 | 9/2006 | Carlucci |
| 7,121,982 B2 | 10/2006 | Feldman |
| 7,126,584 B1 | 10/2006 | Nishiumi et al. |
| 7,127,376 B2 | 10/2006 | Nashner |
| 7,163,516 B1 | 1/2007 | Pagnacco et al. |
| 7,179,234 B2 | 2/2007 | Nashner |
| 7,195,355 B2 | 3/2007 | Nashner |
| 7,202,424 B2 | 4/2007 | Carlucci |
| 7,202,851 B2 | 4/2007 | Cunningham et al. |
| 7,270,630 B1 | 9/2007 | Patterson |
| 7,307,619 B2 | 12/2007 | Cunningham et al. |
| 7,308,831 B2 | 12/2007 | Cunningham et al. |
| 7,331,226 B2 | 2/2008 | Feldman et al. |
| 7,335,134 B1 | 2/2008 | Lavelle |
| RE40,427 E | 7/2008 | Nashner |
| 7,416,537 B1 | 8/2008 | Stark et al. |
| 7,530,929 B2 | 5/2009 | Feldman et al. |
| 7,722,501 B2 | 5/2010 | Nicolas et al. |
| 7,938,751 B2 | 5/2011 | Nicolas et al. |
| 2001/0001303 A1 | 5/2001 | Ohsuga et al. |
| 2001/0018363 A1 | 8/2001 | Goto et al. |
| 2001/0050683 A1 | 12/2001 | Ishikawa et al. |
| 2002/0055422 A1 | 5/2002 | Airmet et al. |
| 2002/0080115 A1 | 6/2002 | Onodera et al. |
| 2002/0185041 A1 | 12/2002 | Herbst |
| 2003/0054327 A1 | 3/2003 | Evensen |
| 2003/0069108 A1 | 4/2003 | Kaiserman et al. |
| 2003/0107502 A1 | 6/2003 | Alexander |
| 2003/0176770 A1 | 9/2003 | Merril et al. |
| 2003/0193416 A1 | 10/2003 | Ogata et al. |
| 2004/0038786 A1 | 2/2004 | Kuo et al. |
| 2004/0041787 A1 | 3/2004 | Graves |
| 2004/0077464 A1 | 4/2004 | Feldman et al. |
| 2004/0099513 A1 | 5/2004 | Hetherington |
| 2004/0110602 A1 | 6/2004 | Feldman |
| 2004/0127337 A1 | 7/2004 | Nashner |
| 2004/0163855 A1 | 8/2004 | Carlucci |
| 2004/0180719 A1 | 9/2004 | Feldman et al. |
| 2004/0259688 A1 | 12/2004 | Stabile |
| 2005/0070154 A1 | 3/2005 | Milan |
| 2005/0076161 A1 | 4/2005 | Albanna et al. |
| 2005/0130742 A1 | 6/2005 | Feldman et al. |
| 2005/0202384 A1 | 9/2005 | DiCuccio et al. |
| 2006/0097453 A1 | 5/2006 | Feldman et al. |
| 2006/0161045 A1 | 7/2006 | Merril et al. |
| 2006/0205565 A1 | 9/2006 | Feldman et al. |
| 2006/0211543 A1 | 9/2006 | Feldman et al. |
| 2006/0217243 A1 | 9/2006 | Feldman et al. |
| 2006/0223634 A1 | 10/2006 | Feldman et al. |
| 2006/0258512 A1 | 11/2006 | Nicolas et al. |
| 2007/0021279 A1 | 1/2007 | Jones |
| 2007/0027369 A1 | 2/2007 | Pagnacco et al. |
| 2007/0155589 A1 | 7/2007 | Feldman et al. |
| 2007/0219050 A1 | 9/2007 | Merril |
| 2008/0012826 A1 | 1/2008 | Cunningham et al. |
| 2008/0228110 A1 | 9/2008 | Berme |
| 2008/0261696 A1 | 10/2008 | Yamazaki et al. |
| 2009/0093315 A1 | 4/2009 | Matsunaga et al. |

FOREIGN PATENT DOCUMENTS

| | | |
|---|---|---|
| DE | 297 12 785 | 1/1998 |
| DE | 20 2004 021 792 U1 | 5/2011 |
| DE | 20 2004 021 793 U1 | 5/2011 |
| EP | 0 275 665 | 7/1988 |
| EP | 0 299 738 | 1/1989 |
| EP | 0 335 045 | 10/1989 |
| EP | 0 519 836 | 12/1992 |
| EP | 1 043 746 A1 | 10/2000 |
| EP | 1 120 083 A2 | 8/2001 |
| EP | 1 127 599 A2 | 8/2001 |
| EP | 1 870 141 | 12/2007 |
| EP | 2 308 573 A1 | 4/2011 |
| FR | 2 472 929 | 7/1981 |
| FR | 2 587 611 | 3/1987 |

(56) References Cited

FOREIGN PATENT DOCUMENTS

| | | |
|---|---|---|
| FR | 2 604 910 | 4/1988 |
| FR | 2 647 331 | 11/1990 |
| FR | 2 792 182 | 10/2000 |
| FR | 2 801 490 | 6/2001 |
| FR | 2 811 753 | 1/2002 |
| FR | 2 906 365 | 3/2008 |
| GB | 1 209 954 | 10/1970 |
| GB | 2 288 550 | 10/1995 |
| JP | 44-23551 | 10/1969 |
| JP | 55-95758 | 12/1978 |
| JP | 54-73689 | 6/1979 |
| JP | 55-113472 | 9/1980 |
| JP | 55-113473 | 9/1980 |
| JP | 55-125369 | 9/1980 |
| JP | 55-149822 | 11/1980 |
| JP | 55-152431 | 11/1980 |
| JP | 60-79460 | 6/1985 |
| JP | 60-153159 | 10/1985 |
| JP | 61-154689 | 7/1986 |
| JP | 62-034016 | 2/1987 |
| JP | 62-34016 | 2/1987 |
| JP | 63-158311 | 10/1988 |
| JP | 63-163855 | 10/1988 |
| JP | 63-193003 | 12/1988 |
| JP | 02-102651 | 4/1990 |
| JP | 2-238327 | 9/1990 |
| JP | 3-25325 | 2/1991 |
| JP | 3-103272 | 4/1991 |
| JP | 03-107959 | 11/1991 |
| JP | 6-063198 | 3/1994 |
| JP | 6-282373 | 10/1994 |
| JP | 7-213741 | 8/1995 |
| JP | 7-213745 | 8/1995 |
| JP | 7-241281 | 9/1995 |
| JP | 7-241282 | 9/1995 |
| JP | 7-275307 | 10/1995 |
| JP | 7-302161 | 11/1995 |
| JP | 8-43182 | 2/1996 |
| JP | 08-131594 | 5/1996 |
| JP | 8-182774 | 7/1996 |
| JP | 08-182774 | 7/1996 |
| JP | 08-184474 | 7/1996 |
| JP | 8-184474 | 7/1996 |
| JP | 8-215176 | 8/1996 |
| JP | 08-244691 | 9/1996 |
| JP | 2576247 | 1/1997 |
| JP | 9-120464 | 5/1997 |
| JP | 9-168529 | 6/1997 |
| JP | 9-197951 | 7/1997 |
| JP | 9-305099 | 11/1997 |
| JP | 11-309270 | 11/1999 |
| JP | 2000-146679 | 5/2000 |
| JP | U3068681 | 5/2000 |
| JP | U3069287 | 6/2000 |
| JP | 2000-254348 | 9/2000 |
| JP | 3172738 | 6/2001 |
| JP | 2001-178845 | 7/2001 |
| JP | 2001-286451 | 10/2001 |
| JP | 2002-112984 | 4/2002 |
| JP | 2002-157081 | 5/2002 |
| JP | 2002-253534 | 9/2002 |
| JP | 2003-79599 | 3/2003 |
| JP | 2003-235834 | 8/2003 |
| JP | 3722678 | 11/2005 |
| JP | 2005-334083 | 12/2005 |
| JP | 3773455 | 5/2006 |
| JP | 2006-167094 | 6/2006 |
| JP | 3818488 | 9/2006 |
| JP | 2006-284539 | 10/2006 |
| JP | U3128216 | 12/2006 |
| JP | 2008-49117 | 3/2008 |
| WO | WO 91/11221 | 8/1991 |
| WO | 92/12768 | 8/1992 |
| WO | WO 98/40843 | 9/1998 |
| WO | WO 00/12041 | 3/2000 |
| WO | WO 00/57387 | 9/2000 |
| WO | WO 00/69523 | 11/2000 |
| WO | WO 02/29375 | 4/2002 |
| WO | WO 02/057885 | 7/2002 |
| WO | WO 2004/051201 | 6/2004 |
| WO | WO 2004/053629 | 6/2004 |
| WO | WO 2005/043322 | 5/2005 |
| WO | WO 2008/099582 | 8/2008 |

OTHER PUBLICATIONS

Baek, Seongmin, et al., "Motion Evaluation for VR-based Motion Training," Eurographics 2001, vol. 20, No. 3, 2001.

Biodex Medical Systems, Inc.—Balance System SD Product Information—http://www.biodex.com/rehab/balance/balance_300feat.htm.

Chen, I-Chun, et al., "Effects of Balance Training on Hemiplegic Stroke Patients," Chang Gung Medical Journal, vol. 25, No. 9, pp. 583-590, Sep. 2002.

Dingwell, Jonathan, et al., "A Rehabilitation Treadmill with Software for Providing Real-Time Gait Analysis and Visual Feedback," Transactions of the ASME, Journal of Biomechanical Engineering, 118 (2), pp. 253-255, 1996.

Geiger, Ruth Ann, et al., "Balance and Mobility Following Stroke: Effects of Physical Therapy Interventions With and Without Biofeedback/Forceplate Training," Physical Therapy, vol. 81, No. 4, pp. 995-1005, Apr. 2001.

Harikae, Miho, "Visualization of Common People's Behavior in the Barrier Free Environment," Graduate Thesis—Master of Computer Science and Engineering in the Graduate School of the University of Aizu, Mar. 1999.

Hodgins, J.K., "Three-Dimensional Human Running," Proceedings: 1996 IEEE International Conference on Robotics and Automation, vol. 4, Apr. 1996.

Kim, Jong Yun, et al., "Abstract—A New VR Bike System for Balance Rehabilitation Training," Proceedings: 2001 IEEE Seventh International Conference on Virtual Systems and Multimedia, Oct. 2001.

McComas, Joan, et al., "Virtual Reality Applications for Prevention, Disability Awareness, and Physical Therapy Rehabilitation in Neurology: Our Recent Work," School of Rehabilitation Sciences, University of Ottawa—Neurology Report, vol. 26, No. 2, pp. 55-61, 2002.

NeuroCom International, Inc.—Balance Manager Systems/Products—http://resourcesonbalance.com/neurocom/products/index.aspx.

NeuroCom International, Inc.—Neurogames—http://resourcesonbalance.com/neurocom/products/NeuroGames.aspx.

Nicholas, Deborah S, "Balance Retraining After Stroke Using Force Platform Feedback," Physical Therapy, vol. 77, No. 5, pp. 553-558, May 1997.

Nintendo Co., Ltd.—Aerobic Exercise Rhythm Boxing—http://www.nintendo.co.jp/wii/rfnj/training/aerobics/aerobics07.html.

Redfern, Mark, et al., "Visual Influences of Balance," Journal of Anxiety Disorders, vol. 15, pp. 81-94, 2001.

Sackley, Catherine, "Single Blind Randomized Controlled Trial of Visual Feedback After Stroke: Effects on Stance Symmetry and Function," Disavility and Rehabilitation, vol. 19, No. 12, pp. 536-546, 1997.

Tossavainen, Timo, et al., "Postural Control as Assessed with Virtual Reality," Acta Otolaryngol, Suppl 545, pp. 53-56, 2001.

Tossavainen, Timo, et al., "Towards Virtual Reality Simulation in Force Platform Posturography," Medinfo, pp. 854-857, 2001.

Tsutsuguchi, Ken, et al., "Human Walking Animation Based on Foot Reaction Force in the Three-Dimensional Virtual World," The Journal of Visualization and Computer Animation, vol. 11, pp. 3-16, 2000.

Wong, Alice, et al., "The Devlopment and Clinical Evaluation of a Standing Biofeedback Trainer," Journal of Rehabilitation Research and Development, vol. 34, No. 3, pp. 322-327, Jul. 1997.

Yang, Ungyeon, et al., "Implementation and Evaluation of 'Just Follow Me': An Immersive, VR-Based, Motion-Training System," Presence, vol. 11, No. 3, pp. 304-323, 2002.

(56) References Cited

OTHER PUBLICATIONS

Interface, Inc.—Advanced Force Measurement—SM Calibration Certificate Installation Information, 1984.
Hugh Stewart, "Isometric Joystick: A Study of Control by Adolescents and Young Adults with Cerebral Palsy," The Australian Occupational Therapy Journal, Mar. 1992, vol. 39, No. 1, pp. 33-39.
Raghavendra S. Rao, et al., "Evaluation of an Isometric and a Position Joystick in a Target Acquisition Task for Individuals with Cerebral Palsy," IEEE Transactions on Rehabilitation Engineering, vol. 8, No. 1, Mar. 2000, pp. 118-125.
D. Sengupta, et al., "Comparative Evaluation of Control Surfaces for Disabled Patients,"Proceedings of the 27th Annual Conference on Engineering in Medicine and Biology, vol. 16, Oct. 6-10, 1974, p. 356.
Ian Bogost, "The Rhetoric of Exergaming,"The Georgia Institute of Technology, 9 pages (date unknown).
Ludonauts, "Body Movin'," May 24, 2004, http://web.archive.org/web/20040611131903/http:/www.ludonauts.com; retrieved Aug. 31, 2010, 4 pages.
Atari Gaming Headquarters—AGH's Atari Project Puffer Page, http://www.atarihq.com/othersec/puffer/index.html, retrieved Sep. 19, 2002, 4 pages.
Michael Antonoff, "Real estate is cheap here, but the places you'd most want to visit are still under construction," Popular Science, Jun. 1993, pp. 33-34.
Steve Aukstakalnis and David Blatner, "The Art and Science of Virtual Reality—Silicon Mirage," 1992, pp. 197-207.
Electronics, edited by Michael Antonoff, "Video Games—Virtual Violence: Boxing Without Bruises," Popular Science, Apr. 1993, p. 60.
Stuart F. Brown, "Video cycle race," Popular Science, May 1989, p. 73.
Scanning the Field for Ideas, "Chair puts Player on the Joystick," Machine Design, No. 21, Oct. 24, 1991, XP 000255214, 1 page.
Francis Hamit, "Virtual Reality and the Exploration of Cyberspace," University of MD Baltimore County, 1993, 4 pages.
Innovation in Action—Biofeed back Motor Control, Active Leg Press—IsoLegPress, 2 pages (date unknown).
Ric Manning, "Videogame players get a workout with the Exertainment," The Gizmo Page from the Courier Journal Sep. 25, 1994, 1 page.
Tech Lines, Military—Arcade aces and Aviation—Winging it, Popular Mechanics, Mar. 1982, p. 163.
Sarju Shah, "Mad Catz Universal MC2 Racing Wheel: Mad Catz MC2 Universal," Game Spot, posted Feb. 18, 2005, 3 pages.
Joe Skorupa, "Virtual Fitness," Sports Science, Popular Mechanics, Oct. 1994, 3 pages.
Agh Musuem—Suncom Aerobics Joystick; http://atarihq.com/museum/2678/hardware/aerobics.html, (retrieved date unknown) 1 page.
Nintendo Zone—The History of Nintendo (1889-1997), retrieved Aug. 24, 1998 pp. 1, 9-10.
The Legible City, Computergraphic Installation with Dirk Groeneveld, Manhattan version (1989), Amsterdam version (1990), Karlsruhe version (1991), 3 pages.
The New Exertainment System. It's All About Giving Your Members Personal Choices, Life Fitness, Circle Reader Service Card No. 28, 1995, 1 page.
The Race Begins with $85, Randal Windracer, Circle Reader Service Card No. 34, 1990, 1 page.
Universal S-Video/ Audio Cable; Product #5015, MSRP 9,99; http://www.madcatz.com/Default.asp?Page=133 &CategoryImg=Universal_Cables, retrieved May 12, 2005, 1 page.
Tom Dang, et al., "Interactive Video Exercise System for Pediatric Brain Injury Rehabilitation," Assistive Technology Research Center, Rehabilitation Engineering Service, National Rehabilitation Hospital, Proceedings of the RESNA 20th Annual Conference, Jun. 1998, 3 pages.
Linda S. Miller, "Upper Limb Exerciser," Biometrics Ltd—Unique Solutions for Clinical and Research Applications, 6 pages (date unknown).
Raymond W. McGorry, "A system for the measurement of grip forces and applied moments during hand tool use," Liberty Mutual Research Center for Safety and Health, Applied Ergonomics 32 (2001) 271-279.
NordicTrack's Aerobic Cross Trainer advertisment as shown in "Big Ideas—For a Little Money: Great Places to Invest $1,000 or Less," Kiplinger's Personal Finance Magazine, Jul. 1994, 3 pages.
Maurice R. Masliah, "Measuring the Allocation of Control in 6 Degree of Freedom Human-Computer Interaction Tasks," Graduate Department of Mechanical and Industrial Engineering, University of Toronto, 2001, 177 pages.
Leigh Ann Roman, "Boing! Combines Arcade Fun with Physical Training," Memphis—Health Care News: Monitoring the Pulse of Our Health Care Community, Sep. 20, 1996, One Section, 1 page.
"No More Couch Potato Kids," as shown in Orange Coast, Sep. 1994, p. 16.
Gary L. Downey, et al., "Design of an Exercise Arcade for Children with Disabilities," Resna, Jun. 26-30, 1998, pp. 405-407.
Frank Serpas, et al., "Forward-dynamics Simulation of Anterior Cruciate Ligament Forces Developed During Isokinetic Dynamometry," Computer Methods in Biomechanics and Biomedical Engineering, vol. 5 (1), 2002, pp. 33-43.
Carolyn Cosmos, "An 'Out of Wheelchair Experience'", The Washington Post, May 2, 2000, 3 pages.
"Look Ma! No Hands!", The Joyboard—Power Body Control, (date unknown).
David H. Ahl, "Controller update," Creative Computing, vol. 9, No. 12, Dec. 1983, p. 142.
Ian Bogost, "Water Cooler Games—The Prehistory of Wii Fit," Videogame Theory, Criticism, Design, Jul. 15, 2007, 2 pages.
Jeremy Reimer, "A history of the Amiga, part 2: The birth of Amiga," last updated Aug. 12, 2007, 2 pages.
The Amiga Joyboard (1982) image, Photos: Fun with plastic—peripherals that changed gaming; http://news.cnet.com/2300-27076_3-10001507-2.html (retrieved Jul. 23, 2010), 1 page.
The Amiga Power System Joyboard, Amiga history guide, http://www.amigahistory.co.uk/joyboard.html (retrieved Jul. 23, 2010), 2 pages.
"Joyboard," Wikipedia—the free encyclopedia, http://en.wikipedia.org/wiki/Joyboard (retrieved Jul. 26, 2010), 2 pages.
"Dance Dance Revolution," Wikipedia—the free encyclopedia, http://en.wikipedia.org/wiki/Dance Dance Revolution (retrieved Jul. 23, 2010), 9 pages.
"Cure for the couch potato," Kansas City Star (MO), Jan. 2, 2005, WLNR 22811884, 1 page.
JC Fletcher, "Virtually Overlooked: The Power Pad games," Joystiq, http://www.joystiq.com/2007/09/20/virtually-overlooked-the-power-pad-games/ (retrieved Jul. 26, 2010), 3 pages.
Family Fun Fitness, Nintendo Entertainment System, BANDAI, (date unknown).
"Power Pad/Family Fun and Fitness/Family Trainer," http://www.gamersgraveyard.com/repository/nes/peripherals/powerpad.html (retrieved Jul. 26, 2010), 2 pages.
"Power Pad Information," Version 1.0 (Sep. 23, 1999) http://www.gamersgraveyard.com/repository/nes/peripherals/powerpad.txt (retrieved Jul. 26, 2010), 2 pages.
Wii+Power+Pad.jpg (image), http ://bpl.blogger.com/_J5LEiGp54I/RpZbNpnLDgl/AAAAAAAAAic/Gum6DD3Umjg/s1600-h/Wii+Power+Pad.jpg (retrieved Jul. 26, 2010), 1 page.
Vs. Slalom—Videogame by Nintendo, KLOV—Killer List of Video Games, http://www.arcade-museum.com/game_detail.php?game_id=10368 (retrieved Jul. 26, 2010), 3 pages.
"Nintendo Vs. System," Wikipedia—the free encyclopedia, http://en.wikipedia.org/wiki/Nintendo_Vs._System (retrieved Jul. 26, 2010), 3 pages.
Vs. Slalom—Step Up to the Challenge, Nintendo, (date unknown).
Vs. Slalom—Live the Thrill, Nintendo, (date unknown).
Vs. Slalom—Operation Manual, MDS(MGS), Nintendo, 4 pages, (date unknown).

(56) References Cited

OTHER PUBLICATIONS

HyperspaceArcade.com—Specialists in Arcade Video Game Repair and Restoration, http://www.hyperspacearcade.com/VSTypes.html (retrieved Jul. 3, 2010), 3 pages.
Vs. Slalom—Attachment Pak Manual; for Installation in: VS. UniSystem (UPRIGHT) and Vs. DualSystem (UPRIGHT), TM of Nintendo of America Inc., 1986, 15 pages.
Leiterman, "Project Puffer: Jungle River Cruise," Atari, Inc., 1982, 2 pages.
Leiterman, "Project Puffer: Tumbleweeds," Atari, Inc., 1982, 1 page.
Jerry Smith, "Other Input Devices," Human Interface Technology Laboratory, 2 pages, (date unknown).
Trevor Meers, "Virtually There: VR Entertainment Transports Players to Entrancing New Worlds," Smart Computing, vol. 4, Issue 11, Nov. 1993, 6 pages.
"Dance Aerobics," Moby Games, Feb. 12, 2008, 2 pages.
"Hard Drivin'," KLOV—Killer List of Video Games, The International Arcade Museum, http://www.arcade-museum.com, 6 pages, (date unknown).
"The World's First Authentic Driving Simulation Game!", Hard Drivin'—Get Behind the Wheel and Feel the Thrill (image), Atari games Corporation, 1 page, (date unknown).
Electronic Entertainment Expo (E3) Overview, Giant Bomb—E3 2004 (video game concept), http://www.giantbomb.com/e3-2004/92/3436/ (retrieved Sep. 3, 2010), 3 pages.
Guang Yang Amusement, Product Name: Live Boxer, 1 page, (date unknown).
Family Fun Fitness: Basic Set (Control Mat and Athletic World Game Pak), Nintendo Entertainment System, Bandai, (date unknown).
Roll & Rocker (image), 1 page, (date unknown).
Roll & Rocker, Enteractive (image), 2 pages, (date unknown).
Michael Goldstein, "Revolution on Wheels—Thatcher Ulrich," Nov.-Dec. 1994, 3 pages.
"Playboy on the Scene: Ride on!", 1 page, (date unknown).
Candace Putnam, "Software for Hardbodies: A virtual-reality hike machine takes you out on the open road," Design, 1 page, (date unknown).
Rachel, "No-Sweat Exercise—Can you get healthier without really trying?" Fitness, 1 page, (date unknown).
Fitness article, Sep. 1994, p. 402-404.
"Wired Top 10: Best Selling Toys in Jun. 1994," Wired Sep. 1994, 1 page.
"Top Skater," Sega Amusements U.S.A, Inc, 1 page, (date unknown).
Katharine Alter, et al., "Video Games for Lower Extremity Strength Training in Pediatric Brain Injury Rehabilitation," National Rehabilitation Hospital, 18 pages, (date unknown).
Cateye Recumbent GameBike Pro: Latest Technology in Exercise Bikes, beyondmoseying.com High Performance Exercise Equipment, 2 pages (advertisement; no date).
Fitness Fun, while Exercising and Getting FIT for Kids, Teens and Adults, (advertisement, no date).
Warranty Information and Your Joyboard: How it Works, Amiga Corporation, date unknown, 2 pages.
Complaint for Patent Infringement, *IA Labs CA, LLC* v. *Nintendo Co., Ltd.* and *Nintendo of America, Inc.*, United States District Court for the District of Maryland Northern Division (Apr. 2, 2010), 317 pages.
Plaintiff IA Labs CA, LLC's Opening Claim Construction Brief, *IA Labs CA, LLC* v. *Nintendo Co., Ltd.* and *Nintendo of America, Inc.*, United States District Court for the District of Maryland Southern Division (Dec. 13, 2010), 36 pages.
Nintendo Co., Ltd. and Nintendo of America Inc.'s Opening Claim Construction Brief, *IA Labs CA, LLC* v. *Nintendo Co., Ltd.* and *Nintendo of America, Inc.*, United States District Court for the District of Maryland Southern Division (Dec. 13, 2010), 55 pages.
Plaintiff IA Labs CA, LLC's Response Claim Construction Brief, *IA Labs CA, LLC* v. *Nintendo Co., Ltd.* and *Nintendo of America, Inc.*, United States District Court for the District of Maryland Southern Division (Jan. 6, 2011), 49 pages.
Nintendo Co., Ltd. and Nintendo of America Inc.'s Closing Claim Construction Brief, *IA Labs CA, LLC* v. *Nintendo Co., Ltd.* and *Nintendo of America, Inc.*, United States District Court for the District of Maryland Southern Division (Jan. 6, 2011), 25 pages.
Expert Report of Lee Rawls, Nov. 2, 2010, 37 pages (redacted).
Nintendo Co., Ltd. and Nintendo of America's Opposition to IA Labs CA, LLC's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), including the Appendix of Exhibits and Exhibits A-R, 405 pages.
Declaration of R. Lee Rawls in Support of Nintendo Co., Ltd. and Nintendo of America Inc.'s Opposition to IA Labs CA. LLC's Motion for Partial Summary Judgment, *IA Labs CA, LLC*, (Plaintiff) v. *Nintendo CO., Ltd. et al.*, (Defendant), United States District Court for the District of Maryland Southern Division (May 16, 2011), including Exhibits 1, 3-12, 193 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), 7 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Appendix of Exhibits, 2 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 1, 36 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 2, 40 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 3, 85 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 4, 10 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 5, 9 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 6, 17 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 7, 16 pages.
Declaration of Tyler C. Peterson Pursuant to Fed. R. Civ. P. 56(D) in Support of Nintendo Co., Ltd. and Nintendo of American Inc.'s

(56) References Cited

OTHER PUBLICATIONS

Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 8, 45 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 9, 4 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 10, 22 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 11, 27 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 12, 3 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 13, 7 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 14, 22 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 15, 45 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 16, 42 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 17, 19 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 18, 27 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 19, 13 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 20, 29 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 21, 25 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 22, 11 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 23, 20 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 24, 7 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 25, 80 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court of the District of Maryland Southern Division (May 16, 2011), Exhibit 26, 32 pages.
U.S. Appl. No. 74/402,755, filed Jun. 14, 1993, 43 pages.
"AccuSway Dual Top: For Balance and Postural Sway Measurement," AMTI: Force and Motion, ISO 9001:2000, 2 pages.
Borzelli G., Cappozzo A., and Papa E., "Inter- and intra-individual variability of ground rejection forces during sit-to-stand with principal component analysis," Medical Engineering & Physics 21 (1999), pp. 235-240.
Chiari L., Cappello A., Lenzi D., and Della Croce U, "An Improved Technique for the Extraction of Stochasitic Parameters from Stabilograms," Gait and Posture 12 (2000), pp. 225-234.
Cutlip R., Hsiao H., Garcia R., Becker E., Mayeux B., "A comparison of different postures for scaffold end-frame disassembly," Applied Ergonomics 31 (2000), pp. 507-513.
Davis K.G., Marras W.S., Waters T.R., "Evaluation of spinal loading during lowering and lifting," The Ohio State University, Biodynamics Laboratory, Clinical Biomechanics vol. 13, No. 3, 1998 pp. 141-152.
Rolf G. Jacob, Mark S. Redfern, Joseph M. Furman, "Optic Flow-induced Sway in Anxiety Disorders Associated with Space and Motion Discomfort," Journal of Anxiety Disorders, vol. 9, No. 5, 1995, pp. 411-425.
Jorgensen M.J., Marras W.S., "The effect of lumbar back support tension on trunk muscle activity," Clinical Biomechanics 15 (2000), pp. 292-294.
Deborah L. King and Vladimir M. Zatsiorsky, "Extracting gravity line displacement from stabilographic recordings," Gait & Posture 6 (1997), pp. 27-38.
Kraemer W.J., Volek J.S., Bush J.A., Gotshalk L.A., Wagner P.R., Gómez A.L., Zatsiorsky V.M., Duzrte M., Ratamess N.A., Mazzetti

(56) References Cited

OTHER PUBLICATIONS

S.A., Selle B.J., "Influence of compression hosiery on physiological responses to standing fatigue in women," The Human Performance Laboratory, Medical & Science in Sports & Exercise, 2000, pp. 1849-1858.
Papa E. and Cappozzo A., "A telescopic inverted-pendulum model of the musculo-skeletal system and its use for the analysis of the sit-to-stand motor task," Journal of Biomechanics 32 (1999), pp. 1205-1212.
Balance System, BalanceTrak 500, & Quantrem, ZapConnect.com: Medical Device Industry Portal, http://www.zapconnect.com/products/index/cfm/fuseaction/products, 2 pages. (Retrieved Apr. 5, 2011).
BERTEC: Dominate Your Field, Physician's Quick Guide, Version 1.0.0, Feb. 2010, 13 pages.
BERTEC: Dominate Your Field, Balancecheck Screener, Version 1.0.0, Feb. 2010, 35 pages.
BERTEC: Dominate Your Field, Balancecheck Trainer, Version 1.0.0, Feb. 2010, 37 pages.
BERTEC Corporation—BALANCECHECK Standard Screener Package, http://bertec.com/products/balance-systems/standard-screener.html, 1 page. (Retrieved Apr. 12, 2011).
BERTEC Corporation—Balance Systems: Balancecheck Advanced balance assessment & training products for the balance professional, http://bertec.com/products/balance-systems.html, 1 page. (Retrieved Mar. 31, 2011).
BERTEC Corporation—Balancecheck Mobile Screener Package: Portable balance screening with full functionality, http://bertec.com/products/balance-systems/mobile-screener.html, 1 page. (Retrieved Mar. 31, 2011).
BERTEC Corporation—Balancecheck Standard Screener & Trainer Package: Advanced balance screening and rehabilitation system, http://bertec.com/products/balance-systems/standard-screener-trainer.html, 1 page. (Retrieved Mar. 31, 2011).
U.S. Appl. No. 75/136,330, filed Jul. 19, 1996, 47 pages.
BERTEC: Dominate Your Field, Digital Acquire 4, Version 4.0.10, Mar. 2011, 22 pages.
BERTEC: Dominate Your Field, Bertec Force Plates, Version 1.0.0, Sep. 2009, 31 pages.
BERTEC: Dominate Your Field, Product Information: Force Plate FP4060-08:Product Details and Specifications, 4 pages.
BERTEC: Dominate Your Field, Product Information: Force Plate FP4060-10:Product Details and Specifications, 2 pages.
U.S. Appl. No. 73/542,230, filed Jun. 10, 1985, 52 pages.
Brent L. Arnold and Randy J. Schmitz, "Examination of Balance Measures Produced by the Biodex Stability System," Journal of Athletic Training, vol. 33(4), 1998, pp. 323-327.
Trademark Registration No. 1,974,115 filed Mar. 28, 1994, 8 pages.
ICS Balance Platform, Fall Prevention: Hearing Assessment, Fitting Systems, Balance Assessment, Otometrics: Madsen, Aurical, ICS, 2 pages.
U.S. Appl. No. 75/471,542, filed Apr. 16, 1998, 102 pages.
VTI Force Platform, Zapconnect.com: Medical Device Industry Portal, http://zapconnect.com/products/index.cfm/fuseaction/products, 2 pages. (Retrieved Apr. 5, 2011).
Amin M, Girardi M., Konrad H.R., Hughes L., "A Comparison of Electronystagmorgraphy Results with Posturography Findings from the BalanceTrak 500," Otology Neurotology, 23(4), 2002, pp. 488-493.
Girardi M., Konrad H.R., Amin M., Hughes L.F., "Predicting Fall Risks in an Elderly Population: Computer Dynamic Posturography Versus Electronystagmography Test Results," Laryngoscope, 111(9), 2001, 1528-32.
Dr. Guido Pagnacco, Publications, 1997-2008, 3 pages.
College of Engineering and Applied Science: Electrical and Computer Engineering, University of Wyoming, Faculty: Guido Pagnacco, http://wwweng.uwyo.edu/electrical/faculty/Pagnacco.html, 2 pages. (Retrieved Apr. 20, 2011).
EyeTracker, IDEAS, DIFRA, 501(k) Summary: premarket notification, Jul. 5, 2007, 7 pages.
Vestibular technologies, copyright 2000-2004, 1 page.
Scopus preview—Scopus—Author details (Pagnacco, Guido), http:www.scopus.com/authid/detail.url?authorId=6603709393, 2 pages. (Retrieved Apr. 20, 2011).
Vestibular Technologies Company Page "Vestibular technologies: Helping People Regain their Balance for Life," http:www.vestibtech.com/AboutUs.html, 2 pages. (Retrieved Apr. 20, 2011).
GN Otometrics Launces ICS Balance Platform: Portable system for measuring postural sway, http://audiologyonline.com/news/pf_news_detail.asp?news_id=3196, 1 page. (Retrieved Mar. 31, 2011).
U.S. Appl. No. 75/508,272, filed Jun. 25, 1998, 36 pages.
U.S. Appl. No. 75/756,991, filed Jul. 21, 1999, 9 pages.
U.S. Appl. No. 76/148,037, filed Oct. 17, 2000, 78 pages.
Vestibular technologies, VTI Products: BalanceTRAK User's Guide, Preliminary Version 0.1, 2005, 34 pages.
U.S. Appl. No. 76/148,037, filed Oct. 17, 2000, 57 pages.
Vestibular Technologies, Waybackmachine, http://vestibtech.com/balancetrak500.html, 7 pages. (Retrieved Mar. 30, 2011).
Vestibular Technologies, 2004 Catalog, 32 pages.
The Balance Trak 500—Normative Data, 8 pages.
State of Delaware: The Official Website of the First State, Division of Corporations—Online Services, http://delecorp.delaware.gov/tin/controller, 2 pages. (Retrieved Mar. 21, 2011).
Memorandum in Support of Plaintiff IA Labs' Motion for Partial Summary Judgment on Defendants' Affirmative Defense and Counterclaim That U.S. Patent No. 7,121,982 Is Invalid Under 35 U.S.C. §§ 102 and 103, *IA Labs CA, LLC*, (Plaintiff) v. *Nintendo Co., Ltd. et al.*, (Defendant), United States District Court for the District of Maryland Southern Division (Apr. 27, 2011), 17 pages.
Search Report (2 pgs.) dated May 27, 2011 issued in German Application No. 20 2004 021 793.7.
Office Action dated Jul. 11, 2013 in corresponding European Patent Appln. No. 09178368.8.

F I G. 2
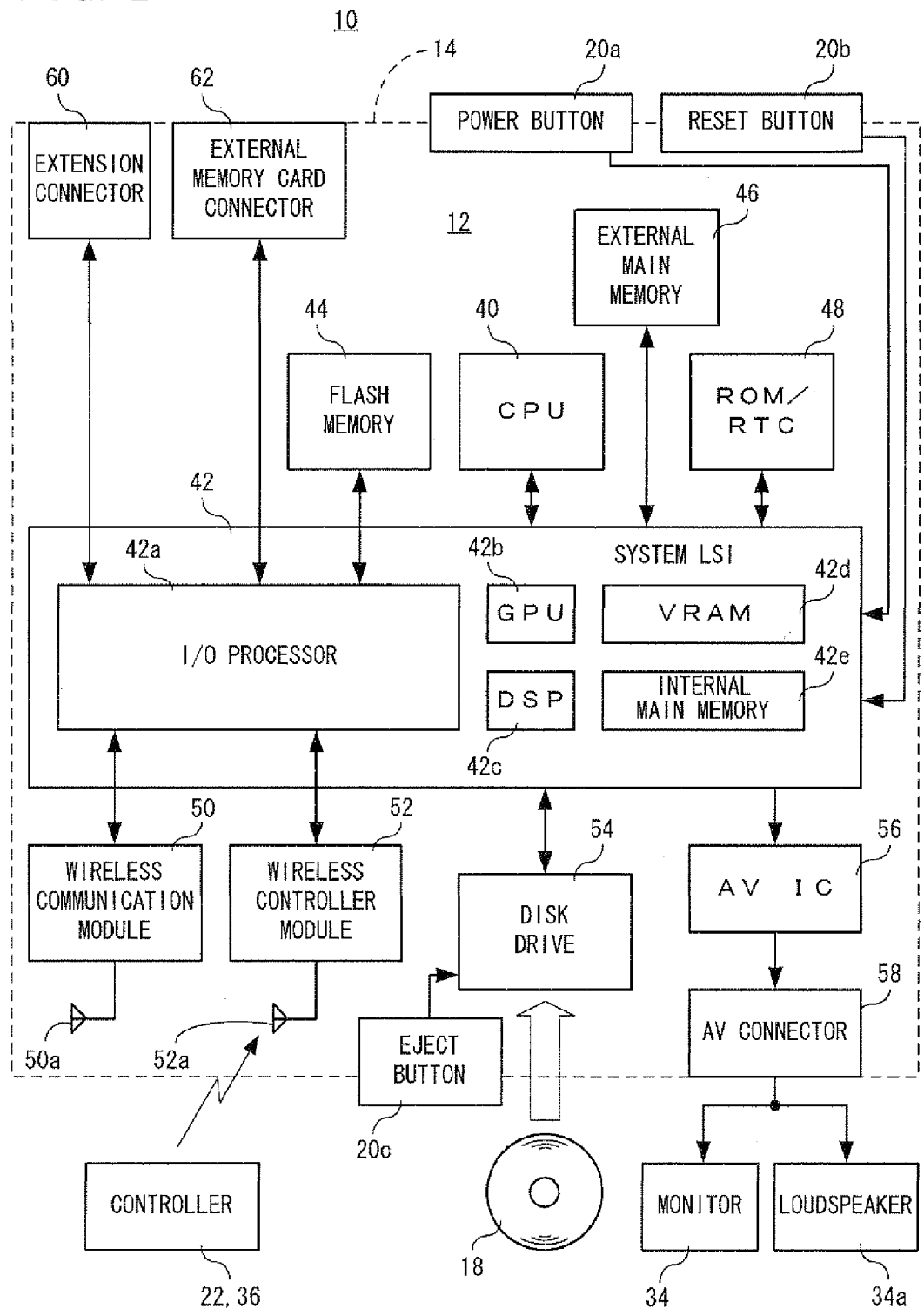

F I G. 7
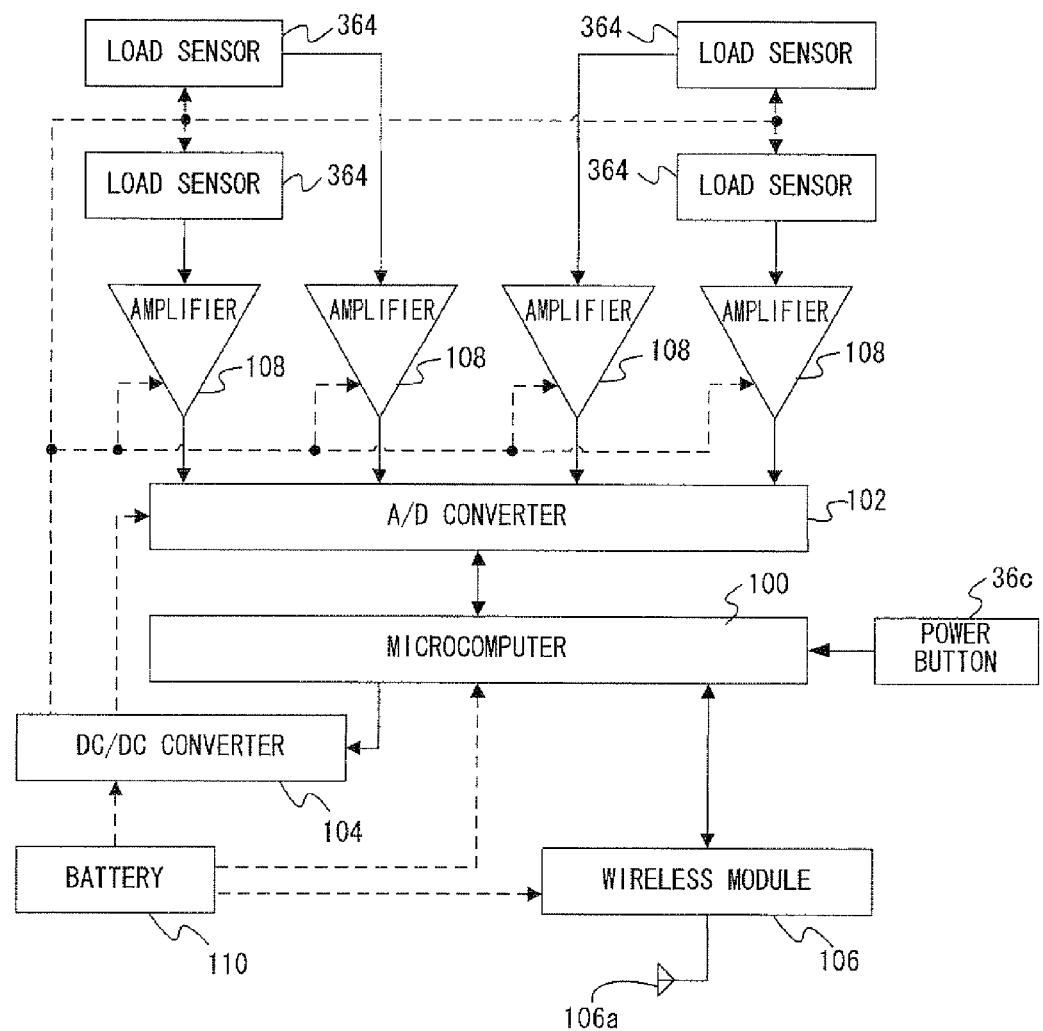

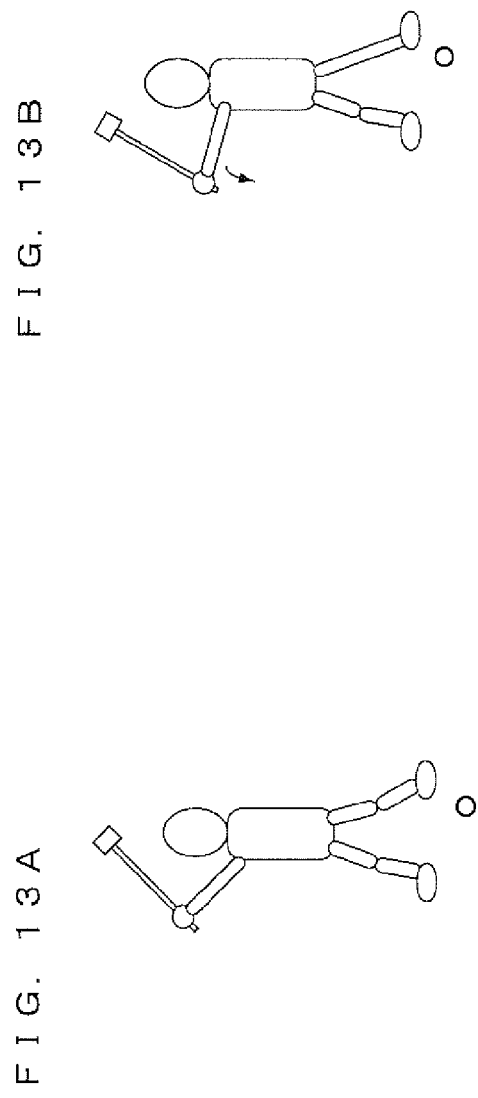
FIG. 13A  FIG. 13B  FIG. 13C  FIG. 13D  FIG. 13E

INFORMATION PROCESSING PROGRAM HAVING COMPUTER-READABLE STORAGE MEDIUM THEREIN AND INFORMATION PROCESSING APPARATUS

CROSS REFERENCE TO RELATED APPLICATION

The disclosure of Japanese Patent Application No. 2009-228120, filed on Sep. 30, 2009, is incorporated herein by reference.

BACKGROUND OF THE INVENTION

1. Field of the Invention

The present invention relates to a computer-readable storage medium having an information processing program stored therein and an information processing apparatus, and particularly relates to a computer-readable storage medium having stored therein an information processing program that executes a predetermined process based on the load of a user and the position of the center of gravity of the user, and an information processing apparatus.

2. Description of the Background Art

Conventionally, a golf practice device is present that measures the position of the center of gravity of a user to thereby display the path of the position of the center of gravity during a swing, and also causes an optical sensor or the like to detect the presence or absence of a ball to thereby display the position of the top of the swing, the point of impact, and the like (e.g., Japanese Laid-Open Patent Publication No. 06-63198 (Patent Document 1)). Specifically, the golf practice device disclosed in Patent Document 1 causes the optical sensor to detect the passage of a club head to thereby detect the starting point of a swing and the point of impact. The golf practice device also detects feature points, from the starting point of the swing to the point of impact, such as the starting point of the turn of the body, the position of the top, and the point of the downswing, based on the changes in the load and the position of the center of gravity of the user. Then the golf practice device displays on a display device the feature points of the swing in association with measurement information about the load and the position of the center of gravity. This makes it possible to make a detailed analysis of the form of the user's golf swing.

However, the technique disclosed in Patent Document 1 has the following problems. That is, in order to determine the motion of the user, the technique disclosed in Patent Document 1 needs to measure the point of impact and the like, using an optical sensor or the like that detects the presence or absence of a ball or a club head. This complicates the structure of the device and increases the production cost.

SUMMARY OF THE INVENTION

Therefore an object of the present invention is to provide an information processing program that is capable of determining a given motion of a user with a simple structure, and an information processing apparatus.

The present invention has the following features to attain the above-mentioned object.

An embodiment of the present invention is a computer-readable storage medium having stored therein an information processing program to be executed by a computer of an information processing apparatus for processing a signal from a first input device including a load sensor to which load is applied by a user. The information processing program causes the computer to function as: load information acquisition means, position-of-center-of-gravity detection means, velocity-of-center-of-gravity calculation means, and motion determination means. The load information acquisition means, based on the signal from the first input device, acquires load information about a change over time in the load applied to the first input device. The position-of-center-of-gravity detection means detects a position of center of gravity of the user based on the signal from the first input device. The velocity-of-center-of-gravity calculation means calculates a velocity of center of gravity, the velocity of center of gravity representing a velocity of movement of the position of center of gravity. The motion determination means determines a given motion of the user based on a relationship between the load information and velocity-of-center-of-gravity information about the velocity of center of gravity.

The load information may be for example, the maximum value (or the minimum value) of the load and the time when the load becomes the maximum (or minimum) value, the local maximum (or the local minimum) of the load and the time when the load becomes the local maximum (or minimum), and the time when the load value becomes a predetermined value. The load information may also be the amount of change in the load in a predetermined time period. That is, the load information is a concept including various pieces of information about the change over time in the load value. The velocity-of-center-of-gravity information is a concept including various pieces of information about the velocity of the center of gravity, and may be, for example, the maximum (or minimum) velocity of the center of gravity in a predetermined time period and the time of the maximum (or minimum) velocity, the time when the velocity of the center of gravity becomes a predetermined velocity, the local maximum (or the local minimum) of the velocity of the center of gravity and the time of the local maximum (or minimum), and the direction of the velocity of the center of gravity (the movement direction of the center of gravity).

According to the above, it is possible to determine a given motion of the user based on the load applied to the first input device and the velocity of the center of gravity of the load. This makes it possible to determine a given motion of the user by only the load input to the first input device, with no need for a complicated structure of the apparatus.

In an embodiment of the present invention, the information processing program may further cause the computer to function as storage means. The storage means stores therein load value data based on the signal from the first input device, the load value data representing the load applied to the first input device in a predetermined time period. The load information acquisition means acquires the load information based on the load value data stored in the storage means.

According to the above, it is possible to store the load value detected by the first input device in a predetermined time period and acquire the load information based on the detected load value.

In an embodiment of the present invention, the load information acquisition means may acquire, as the load information, a time when the load applied to the first input device satisfies a first condition. In this case, the motion determination means may determine the given motion of the user based on the time when the load applied to the first input device satisfies the first condition and a time when the velocity of center of gravity satisfies a second condition.

According to the above, it is possible to determine a given motion of the user based on the time when the load value satisfies the first condition and the time when the velocity of the center of gravity satisfies the second condition.

In an embodiment of the present invention, the load information acquisition means may acquire a time when the load applied to the first input device becomes a maximum. In this case, the motion determination means may determine the given motion of the user based on the time when the load becomes the maximum and a time when the velocity of center of gravity becomes a maximum.

According to the above, it is possible to determine the motion of the user based on the time when the load value becomes the maximum and the time when the velocity of the center of gravity becomes the maximum. This makes it possible that when a determination is made of the motion of the user swinging their arms or rotating their hips with the shifting of their weight, the motion of the user is determined based on the above two times. For example, it is possible to determine whether or not the motion is a predetermined desired motion.

In an embodiment of the present invention, the motion determination means may determine the given motion of the user based on a difference between the time when the load becomes the maximum and the time when the velocity of center of gravity becomes the maximum.

According to the above, it is possible to determine the motion of the user based on the difference between the time when the load value becomes the maximum and the time when the velocity of the center of gravity becomes the maximum. This makes it possible to determine, for example, that the greater the difference, the more the motion of the user differs from a predetermined motion.

In an embodiment of the present invention, the load information acquisition means may acquire a velocity of load as the load information, the velocity of load representing an amount of change in the load applied to the first input device in a predetermined time period. In this case, the motion determination means may determine the given motion of the user based on the velocity of center of gravity and the velocity of load.

According to the above, it is possible to determine the motion of the user based on the velocity of load and the velocity of the center of gravity.

In an embodiment of the present invention, the load information acquisition means may acquire a velocity of load as the load information, the velocity of load representing an amount of change in the load applied to the first input device in a predetermined time period. In this case, the motion determination means may determine the given motion of the user by comparing a relationship between a predetermined velocity of load and a predetermined velocity of center of gravity with a relationship between the velocity of load acquired by the load information acquisition means and the velocity of center of gravity calculated by the velocity-of-center-of-gravity calculation means.

According to the above, it is possible to determine the motion of the user based on the velocity of load and the velocity of the center of gravity. This makes it possible that when a determination is made of the motion of the user swinging their arms or rotating their hips with the shifting of their weight, the determination is made based on the balance between the velocity of the swing of the arms or the velocity of the rotation of the hips and the velocity of the shifting of weight.

In an embodiment of the present invention, the motion determination means may determine the given motion of the user based on, in a coordinate system where the velocity of load is a first axis and the velocity of center of gravity is a second axis, a distance from a straight line or a curve to a point in the coordinate system, the straight line or the curve representing the relationship between the predetermined velocity of load and the predetermined velocity of center of gravity, the point representing the velocity of load acquired by the load information acquisition means and the velocity of center of gravity calculated by the velocity-of-center-of-gravity calculation means.

According to the above, it is possible to determine, based on the distance, how much a given motion of the user differs from a predetermined motion. Further, with the determination made based on the distance, it is possible to determine a given motion of the user based on both the velocity of load and the velocity of the center of gravity.

In an embodiment of the present invention, the motion determination means may determine the given motion of the user based on, in the coordinate system where the velocity of load is the first axis and the velocity of center of gravity is the second axis, a distance from a straight line to the point in the coordinate system, the straight line representing a relationship between a velocity of load and a velocity of center of gravity that are detected when the given motion of the user is made in an ideal mariner, the point representing the velocity of load acquired by the load information acquisition means and the velocity of center of gravity calculated by the velocity-of-center-of-gravity calculation means.

According to the above, in the coordinate system a straight line is determined so as to represent the relationship between the velocity of load and the velocity of the center of gravity that are detected when a given motion of the user is made in an ideal manner. It is possible to determine the motion of the user based on the distance from the straight line to the point that represents the velocity of load acquired by the load information acquisition means and the velocity of the center of gravity calculated by the velocity-of-center-of-gravity calculation means.

In an embodiment of the present invention, an inclination of the straight line may be approximately 2.

In an embodiment of the present invention, an intercept of the straight line may be approximately 0.07.

In an embodiment of the present invention, an inclination of the straight line may be from approximately 1.7 to 2.3.

In an embodiment of the present invention, an intercept of the straight line may be from approximately 0.058 to 0.083.

In an embodiment of the present invention, the intercept of the straight line may decrease when the inclination of the straight line increases.

According to the above, a straight line is determined so as to represent the relationship between the velocity of load and the velocity of the center of gravity that are obtained when a given motion of the user is made in an ideal manner. For example, a swing that causes the hit ball to fly straight is determined in a golf swing.

In an embodiment of the present invention, the load information acquisition means may acquire, as the load information, a time when the load applied to the first input device satisfies a first condition and a velocity of load, which represents an amount of change in the load applied to the first input device in a predetermined time period. In this case, the information processing program further causes the computer to function as first evaluation means and second evaluation means. The first evaluation means makes a first evaluation based on the time when the load applied to the first input device satisfies the first condition and the time when the velocity of center of gravity satisfies a second condition. The second evaluation means makes a second evaluation based on the velocity of center of gravity and the velocity of load. The motion determination means determines the given motion of the user based on an evaluation result of the first evaluation means and an evaluation result of the second evaluation means.

According to the above, it is possible to determine the motion of the user based on the evaluation result of the first evaluation means and the evaluation result of the second evaluation means. This makes it possible to determine the motion of the user based on the velocity of the center of gravity and the velocity of load, as well as the above two times.

In an embodiment of the present invention, the information processing program may further cause the computer to function as third evaluation means. The third evaluation means makes a third evaluation based on a path of the position of center of gravity detected by the position-of-center-of-gravity detection means. In this case, the motion determination means determines the given motion of the user based also on an evaluation result of the third evaluation means.

According to the above, it is possible to make a third evaluation based on the path of the position of the center of gravity, and determine the motion of the user based also on the result of the third evaluation. Accordingly, it is possible to determine the motion of the user based also on the area surrounded by the path of the position of the center of gravity based on the shifting of the user's weight, the shape of the path, and the like.

In an embodiment of the present invention, the information processing program may further cause the computer to function as third evaluation means. The third evaluation means makes a third evaluation based on an area surrounded by at least a part of a path of the position of center of gravity detected by the position-of-center-of-gravity detection means and a line connecting two of the positions of center of gravity detected by the position-of-center-of-gravity detection means. The motion determination means determines the given motion of the user based also on an evaluation result of the third evaluation means.

According to the above, it is possible to make a third evaluation based on the area surrounded by at least a part of the path of the position of the center of gravity. Thus it is possible to determine the motion of the user based also on the evaluation result of the third evaluation.

In an embodiment of the present invention, the first evaluation means may calculate a first evaluation value based on the time when the load applied to the first input device satisfies the first condition and the time when the velocity of center of gravity satisfies the second condition. The second evaluation means may calculate a second evaluation value based on the velocity of center of gravity and the velocity of load. The motion determination means may change the second evaluation value in accordance with a value of the first evaluation value, and determine the given motion of the user based on the first evaluation value and the changed second evaluation value.

According to the above, it is possible to change the second evaluation value in accordance with the first evaluation value, and determine the motion of the user using the changed second evaluation value. This makes it possible to change the effect of the second evaluation value on the determination of the motion of the user, in accordance with the value of the first evaluation value.

In an embodiment of the present invention, the motion determination means may change the second evaluation value such that the greater the value of the first evaluation value, the smaller the value of the second evaluation value.

According to the above, the greater the value of the first evaluation value, the smaller the value of the second evaluation value can be made. This makes it possible that the greater the value of the first evaluation value, the smaller the effect of the second evaluation value on the determination of the motion of the user.

In an embodiment of the present invention, the motion determination means may determine whether or not a time of the given motion of the user is lagging behind a predetermined time.

According to the above, it is possible to determine, by measuring the load, whether or not the time of the motion of the user is lagging behind a predetermined time.

In an embodiment of the present invention, the information processing apparatus may further process a signal from a second input device that is different from the first input device. In this case, the information processing apparatus may further cause the computer to function as reference time setting means. The reference time setting means sets, as a reference time, a time when an input from the second input device to the information processing apparatus satisfies a predetermined condition. The motion determination means determines the given motion of the user based on a relationship between the load information acquired by the load information acquisition means in a time period determined in accordance with the reference time and the velocity-of-center-of-gravity information.

According to the above, it is possible to set the reference time in accordance with the signal from the second input device. Thus it is possible to determine the motion of the user based on the relationship between the load information acquired in the time period determined in accordance with the set reference time and the velocity-of-center-of-gravity information.

In an embodiment of the present invention, the motion determination means may determine, based on a relationship between the load information acquired in the time period determined in accordance with the reference time and the velocity-of-center-of-gravity information acquired the determined time period, the given motion of the user at a plurality of times in the time period.

According to the above, it is possible to determine the motion of the user a plurality of times in the time period determined in accordance with the reference time. Accordingly, it is possible to repeatedly determine the motion of the user for a predetermined time period after the reference time.

In an embodiment of the present invention, the second input device may include an acceleration sensor. In this case, based on the signal from the second input device, the reference time setting means sets, as the reference time, a time when a magnitude of an acceleration detected by the acceleration sensor has exceeded a predetermined threshold.

According to the above, it is possible to set, as the reference time, the time when the user has swung the second input device at a greater velocity than a predetermined velocity.

In an embodiment of the present invention, the information processing program may further cause the computer to function as display control means. The display control means, based on a determination of the motion determination means, displays a state where a predetermined object provided in a virtual space moves in the virtual space.

According to the above, in accordance with the motion of the user, it is possible to display a predetermined object moving in the virtual space.

An embodiment of the present invention is an information processing program to be executed by a computer of an information processing apparatus for processing a signal from a first input device including a load sensor to which load is applied by a user. The information processing program causes the computer to function as position-of-center-of-gravity detection means and motion determination means. The position-of-center-of-gravity detection means, based on the signal from the first input device, detects a position of center of gravity of the load applied to the first input device in a predetermined time period. The motion determination means determines a given motion of the user based on a path of the position of center of gravity detected by the position-of-center-of-gravity detection means.

According to the above, it is possible to determine the motion of the user based on the area surrounded by at least a part of the path of the position of the center of gravity that varies in accordance with the motion of the user.

An embodiment of the present invention may be carried out in the form of an information processing apparatus for executing the information processing program.

According to an embodiment of the present invention, it is possible to determine a given motion of the user by only the load input to the first input device including the load sensor, with no need for a complicated structure of the apparatus.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram showing an electrical structure of a video game system 10 of the example;

FIG. 7 is a block diagram showing an example of an electrical structure of the load controller 36;

FIG. 13A is a diagram showing a player being at rest in the backswing;

FIG. 13B is a diagram showing the moment when the player makes the transition from the backswing to the downswing;

FIG. 13C is a diagram showing the player making the downswing;

FIG. 13D is a diagram showing the moment (the moment of impact) when the player hits the ball;

FIG. 13E is a diagram showing the player following through;

DESCRIPTION OF THE PREFERRED EMBODIMENTS

Overall Structure of Game System

Figure 1:
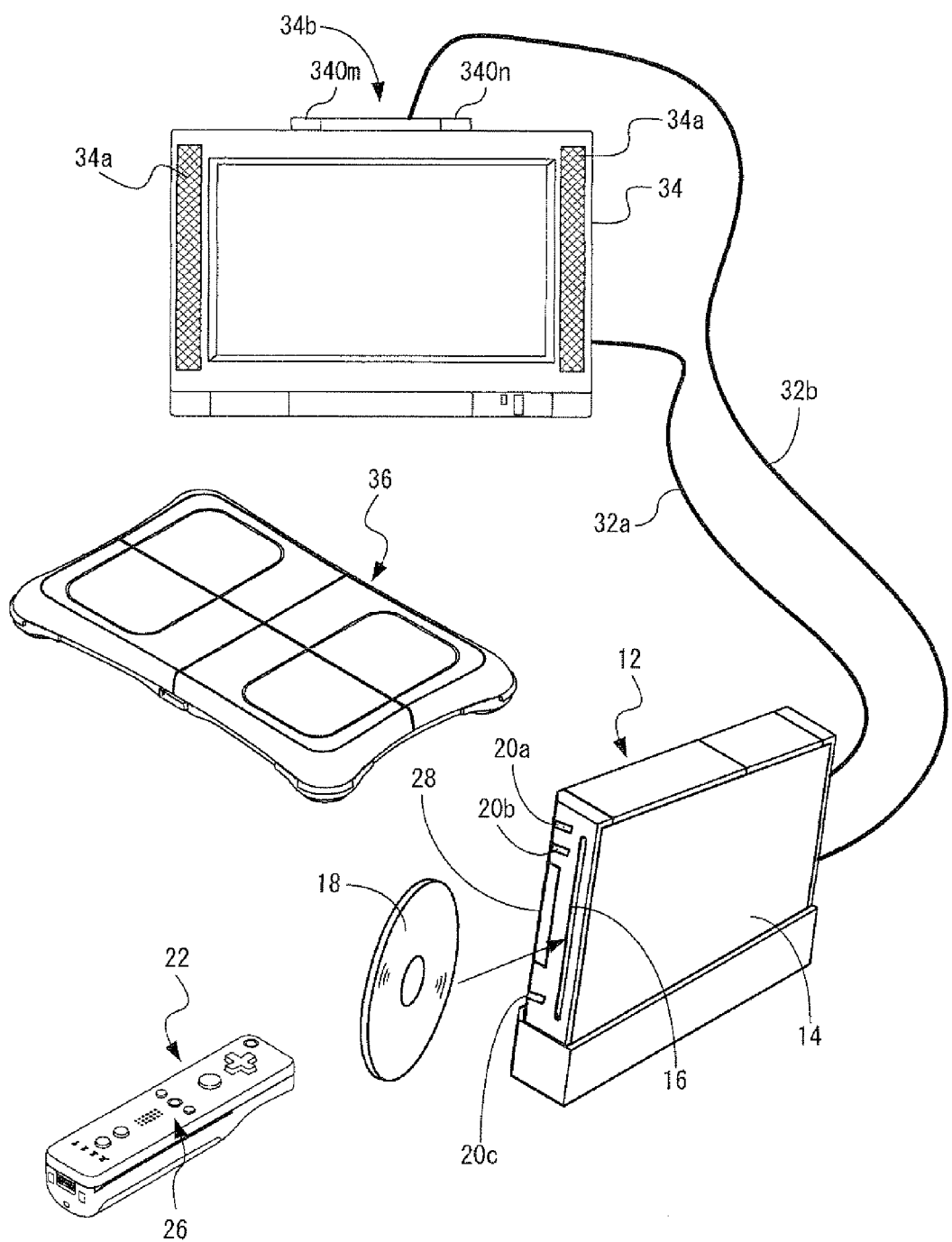
FIG. 1 is an external view of a game system according to an example of the present invention.

Next, an example of the present invention is described with reference to the accompanying drawings. FIG. 1 is an external view of a game system according to the example of the present invention. The game system 10 includes a game apparatus 12, a controller 22, and a load controller 36. Note that, the game apparatus 12 of the example is designed to communicate with up to four controllers (22, 36), though not shown. Also, the game apparatus 12 and each controller (22, 36) are connected via wireless communication. For example, the wireless communication is executed in accordance with the Bluetooth® standard, or alternatively, may be executed in accordance with other standards, such as infrared, wireless LAN or the like.

The game apparatus 12 includes a housing 14 in the shape of substantially a rectangular parallelepiped. A disk slot 16 is provided in a front surface of the housing 14. An optical disk 18 which is an example of an information storage medium storing a game program or the like is inserted and loaded through the disk slot 16 into a disk drive 54 (see FIG. 2) in the housing 14. An LED and a light guide plate are provided around the disk slot 16 and can be turned ON in response to various processes.

Also, a power button 20a and a reset button 20b are provided in an upper portion of the front surface of the game apparatus 12, and an eject button 20c is provided in a lower portion thereof. Moreover, a connector cover 28 for an external memory card is provided between the reset button 20b and the eject button 20c and in the vicinity of the disk slot 16. A connector 62 for an external memory card (see FIG. 2) is provided inside the external memory card connector cover 28. An external memory card (hereinafter simply referred to as a "memory card" (not shown)) is inserted into the connector 62. The memory card is utilized to load and temporarily store a game program or the like read out from the optical disk 18, or save game data (result data or intermediate data of a game) of a game played using the game system 10. Note that the game data may be saved into, for example, an internal memory, such as a flash memory 44 (see FIG. 2), which is provided in the game apparatus 12, instead of the memory card. Also, the memory card may be used as a backup memory for the internal memory.

Note that, as the memory card, a general-purpose SD card can be used, or alternatively, other general-purpose memory cards, such as a memory stick (registered trademark) and a multimedia card (registered trademark), can be used.

An AV cable connector 58 (see FIG. 2) is provided in a rear surface of the housing 14 of the game apparatus 12. The AV connector 58 is used to connect a monitor 34 and loudspeakers 34*a* to the game apparatus 12 via an AV cable 32*a*. The monitor 34 and the loudspeakers 34*a* may be typically of a color television set. The AV cable 32*a* allows a video signal and an audio signal from the game apparatus 12 to be input to a video input terminal and an audio input terminal of the color television, respectively. Therefore, a game image of a three-dimensional (3D) video game is displayed on a screen of the color television (monitor) 34, and stereo game audio, such as game music or sound effects, is output from the right and left loudspeakers 34*a*. Also, a marker unit 34*b* including two infrared LEDs (markers) 340*m* and 340*n* is provided in the vicinity of the monitor 34 (in this example, an upper portion of the monitor 34). The marker unit 34*b* is connected via a power supply cable 32*b* to the game apparatus 12. Therefore, power is supplied from the game apparatus 12 to the marker unit 34*b*. As a result, the markers 340*m* and 340*n* perform light emission and output infrared light toward the front of the monitor 34.

Note that power for the game apparatus 12 is supplied from a typical AC adapter (not shown). The AC adapter is plugged into a standard home wall socket. The game apparatus 12 converts home power supply (commercial power supply) into a low DC voltage signal suitable for driving. In other examples, a battery may be used as a power supply.

In the game system 10, when a user or users desire to play a game (or other applications rather than games), the user initially powers ON the game apparatus 12, and then selects an appropriate optical disk 18 storing a program of a video game (or another application which the user desires to play), and loads the optical disk 18 into the disk drive 54 of the game apparatus 12. In response to this, the game apparatus 12 starts executing the video game or another application based on a program recorded on the optical disk 18. The user operates the controller 22 so as to give an input to the game apparatus 12. For example, by operating any of input means 26, the game or another application is started. Also, in addition to operations to the input means 26, by moving the controller 22 itself, a moving image object (user object) can be moved in different directions, or a point of view (camera position) of the user in a 3D game world can be changed.

FIG. 2 is a block diagram showing an electrical structure of the video game system 10 of the example. Components in the housing 14 are mounted to a printed board, though not shown. As shown in FIG. 2, the game apparatus 12 includes a CPU 40. The CPU 40 functions as a game processor. A system LSI 42 is connected to the CPU 40. An external main memory 46, a ROM/RTC 48, a disk drive 54 and an AV IC 56 are connected to the system LSI 42.

The external main memory 46 stores a program, such as a game program or the like, or various kinds of data, or serves as a work area or a buffer area for the CPU 40. The ROM/RTC 48 is a so-called boot ROM, in which a program for starting up the game apparatus 12 is incorporated and a clock circuit for counting time is provided. The disk drive 54 reads out program data, texture data or the like from the optical disk 18, and writes data into an internal main memory 42*e* (described below) or the external main memory 46 by a control of the CPU 40.

The system LSI 42 includes an input/output processor 42*a*, a GPU (Graphics Processor Unit) 42*b*, a DSP (Digital Signal Processor) 42*c*, a VRAM 42*d*, and the internal main memory 42*e*, which are connected to each other via an internal bus (not shown).

The input/output processor (I/O processor) 42*a* executes transmission/reception or downloading of data. The data transmission/reception or downloading will be described in detail below.

The GPU 42*b*, which is a part of a drawing means, receives a graphics command (drawing command) from the CPU 40, and generates game image data in accordance with the command. Note that the CPU 40 gives the GPU 42*b* an image generating program required for generation of the game image data in addition to the graphics command.

The VRAM 42*d* is connected to the GPO 42*b* as described above, though not shown. The GPU 42*b* accesses the VRAM 42*d* to acquire data (image data: polygon data, texture data, etc.) required for the execution of the drawing command. Note that the CPU 40 writes image data required for drawing into the VRAM 42*d* via the GPU 42*b*. The GPU 42*b* access the VRAM 42*d* to generate game image data for drawing.

Note that it is assumed in this example that the GPU 42*b* generates game image data. When any application other than game applications is executed, the GPU 42*b* generates image data for the application.

The DSP 42*c*, which functions as an audio processor, generates audio data corresponding to sound, speech or music which is to be output from the loudspeakers 34*a*, using sound data, sound waveform (tone color) data or the like stored in the internal main memory 42*e*, the external main memory 46 or the like.

The image data and audio data thus generated are read out by the AV IC 56, and are then output via the AV connector 58 to the monitor 34 and the loudspeakers 34*a*, respectively. Therefore, a game screen is displayed on the monitor 34 while sound (music) required for a game is output from the loudspeakers 34*a*.

The flash memory 44, a wireless communication module 50, and a wireless controller module 52 as well as an extension connector 60 and the external memory card connector 62 are connected to the input/output processor 42*a*. An antenna 50*a* is connected to the wireless communication module 50. An antenna 52*a* is connected to the wireless controller module 52.

The input/output processor 42*a* can communicate with other game apparatuses or various servers connected to a network via the wireless communication module 50. Note that the input/output processor 42*a* can directly communicate with other game apparatuses without via a network. The input/output processor 42*a* regularly accesses the flash memory 44 to detect the presence or absence of data (transmission data) that needs to be transmitted to the network. If there is the transmission data, the input/output processor 42*a* transmits the transmission data via the wireless communication module 50 and the antenna 50*a* to the network. The input/output processor 42*a* also receives data (received data) transmitted from another game apparatus via the network, the antenna 50*a* and the wireless communication module 50, and stores the received data into the flash memory 44. Note that, in a certain case, the received data is directly discarded. Moreover, the input/output processor 42*a* receives data (downloaded data) downloaded from a download server via the network, the antenna 50a and the wireless communication module 50, and stores the downloaded data into the flash memory 44.

The input/output processor 42a also receives input data transmitted from the controller 22 or the load controller 36 via the antenna 52a and the wireless controller module 52, and stores (temporarily stores) the input data into a buffer area of the internal main memory 42e or the external main memory 46. The input data is utilized in a game process executed by the CPU 40 before being erased from the buffer area.

Note that, in this example, as described above, the wireless controller module 52 communicates with the controller 22 and the load controller 36 in accordance with the Bluetooth standard.

In FIG. 2, the controller 22 and the load controller 36 are shown as a single unit for the sake of convenience.

Also, the extension connector 60 and the external memory card connector 62 are connected to the input/output processor 42a. The extension connector 60 is a connector for interface, such as USB or SCSI. A medium (e.g., an external storage medium, etc.) or a peripheral device (e.g., another controller, etc.) can be connected to the extension connector 60. A wired LAN adapter can be connected to the extension connector 60, so that a wired LAN can be used instead of the wireless communication module 50. An external storage medium, such as a memory card or the like, can be connected to the external memory card connector 62. Therefore, for example, the input/output processor 42a can access an external storage medium via the extension connector 60 or the external memory card connector 62 to save or read out data.

As also shown in FIG. 1, the game apparatus 12 (housing 14) is provided with the power button 20a, the reset button 20b, and the eject button 20c. The power button 20a is connected to the system LSI 42. When the power button 20a is turned ON, power is supplied via an AC adapter (not shown) to each component of the game apparatus 12, so that the system LSI 42 is set to be in a normal conductive state (hereinafter referred to as a "normal mode"). On the other hand, when the power button 20a is turned OFF, power is supplied only to a portion of the components of the game apparatus 12, and the system LSI 42 is set to be in a mode in which power consumption is suppressed to the minimum level (hereinafter referred to as a "standby mode"). In this example, in the standby mode, the system LSI 42 outputs an instruction to stop power supply to components other than the input/output processor 42a, the flash memory 44, the external main memory 46, the ROM/RTC 48, the wireless communication module 50, and the wireless controller module 52. Therefore, in the standby mode, the CPU 40 does not execute an application.

Although power is supplied to the system LSI 42 even in the standby mode, a clock is not supplied to the GPU 42b, the DSP 42c or the VRAM 42d so that they are not driven, resulting in a decrease in power consumption.

Moreover, a fan for emitting heat of ICs, such as the CPU 40, the system LSI 42 and the like, is provided in the housing 14 of the game apparatus 12, though not shown. The fan is also stopped in the standby mode.

Note that, when the standby mode is not desired, then if the system LSI 42 is set so that the standby mode is not to be used, power supply to all circuit components is completely stopped when the power button 20a is turned OFF.

The normal mode and the standby mode can be switched by turning ON/OFF a power switch 26h (see FIGS. 3A to 3E) of the controller 22 or by a remote operation. When the remote operation is not performed, the system LSI 42 may be set so that power is not supplied to the wireless controller module 52a in the standby mode.

The reset button 20b is also connected to the system LSI 42. When the reset button 20b is pushed down, the system LSI 42 restarts the startup program of the game apparatus 12. The eject button 20c is connected to the disk drive 54. When the eject button 20c is pushed down, the optical disk 18 is ejected from the disk drive 54.

Figure 3A:
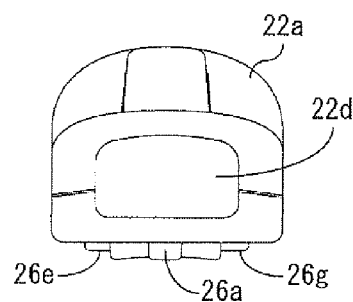
FIGS. 3A through 3E are diagrams showing examples of external views of a controller 22.
Figure 3E:
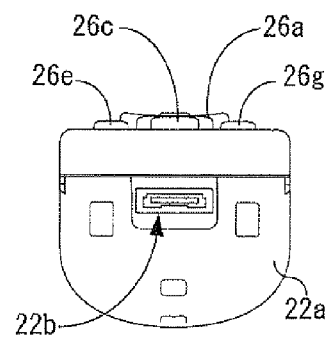
Figure 3B:
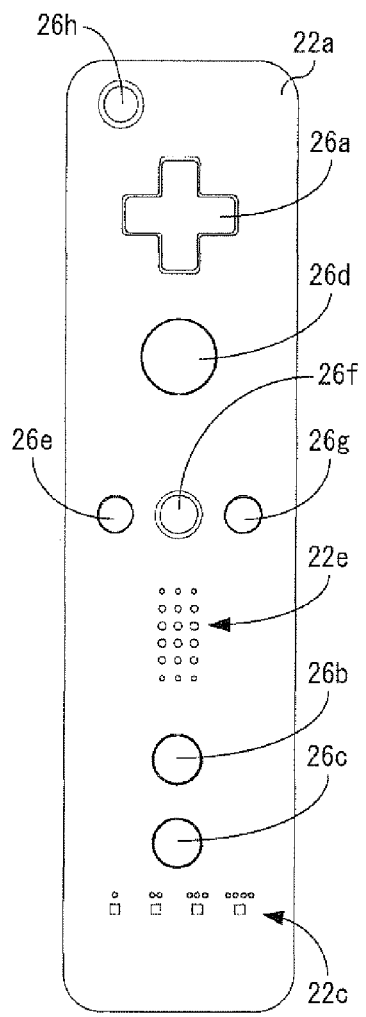
Figure 3C:
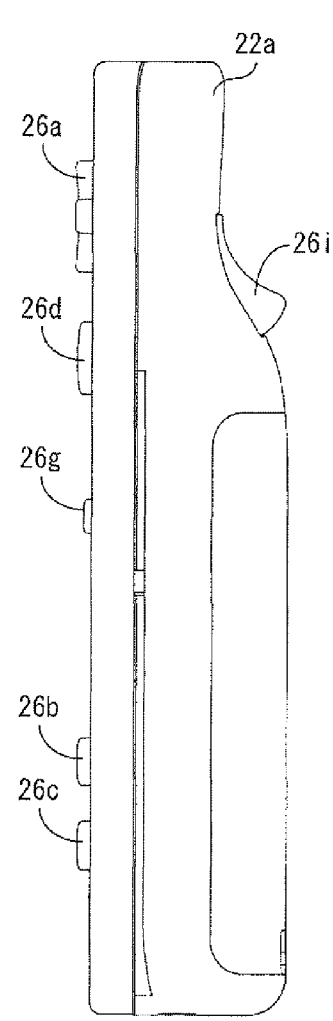
Figure 3D:
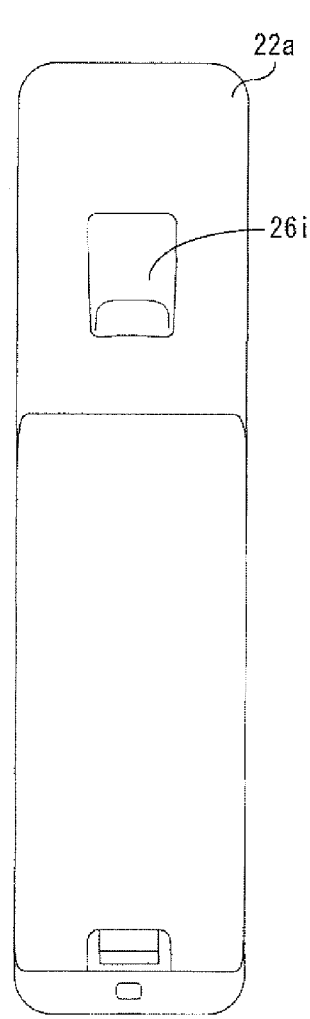

FIGS. 3A to 3E are diagrams showing examples of external views of the controller 22. FIG. 3A shows a front end surface of the controller 22. FIG. 3B shows an upper surface of the controller 22. FIG. 3C shows a right side surface of the controller 22. FIG. 3D shows a bottom surface of the controller 22. FIG. 3E shows a rear end surface of the controller 22.

Referring to FIGS. 3A to 3E, the controller 22 has a housing 22a formed by, for example, plastic molding. The housing 22a is in the shape of substantially a rectangular parallelepiped, and has a size which allows the user to hold the controller 22 with one hand. The housing 22a (controller 22) is provided with the input means (a plurality of buttons or switches) 26. Specifically, as shown in FIG. 3B, a cross-key 26a, a 1-button 26b, a 2-button 26c, an A-button 26d, a "−" button 26e, a HOME button 26f, a "+" button 26g, and the power switch 26h are provided in the upper surface of the housing 22a. Also, as shown in FIGS. 3C and 3D, a slope surface is formed in the bottom surface of the housing 22a. A B-trigger switch 26i is provided in the slope surface.

The cross-key 26a is a 4-direction push switch which includes operation portions corresponding to four directions indicated by arrows, i.e., forward (or upward), backward (or downward), rightward and leftward directions. By operating one of the operation portions, the user can indicate a movement direction of a character or an object (a user character or a user object) which the user can operate, or a movement direction of a cursor.

The 1-button 26b and the 2-button 26c are each a push button switch. For example, the 1-button 26b and the 2-button 26c are used to perform a game operation, such as adjustment of a viewpoint position or a viewpoint direction (i.e., a position or an angle of view of a virtual camera) when a three-dimensional game image is displayed. Also, the 1-button 26b and the 2-button 26c may be used to perform the same operations as those of the A-button 26d and the B-trigger switch 26i or supplementary operations.

The A-button switch 26d is a push button switch which causes a user character or a user object to perform any action other the direction specification, i.e., hitting (punching), throwing, catching (getting), riding, jumping or the like. For example, in an action game, an instruction to jump, punch, move a weapon or the like can be input. Also, in a role playing game (RPG) or a simulation RPG, an instruction to get an item, select a weapon or a command, make a decision or the like can be input.

The "−" button 26e, the HOME button 26f, the "+" button 26g and the power switch 26h are also push button switches. The "−" button 26e is used to select a game mode. The HOME button 26f is used to display a game menu (menu screen). The "+" button 26g is used to, for example, start (resume) or temporarily stop a game. The power switch 26h is used to turn ON/OFF a power supply of the game apparatus 12 by a remote operation.

Note that, in this example, a power switch for turning ON/OFF the controller 22 itself is not provided, and the controller 22 is turned ON by operating any of the input means 26 of the controller 22, and is automatically turned OFF if none of the input means 26 is operated for a predetermined time period (e.g., 30 seconds) or more.

The 8-trigger switch 26i is also a push button switch, and is mainly used to provide an input mimicking a trigger for shooting a bullet or the like, or designate a position selected by the controller 22. When the B-trigger switch 26i continues to be pressed, an operation or a parameter of a user object can be maintained in a predetermined state. Also, in a certain case, the B-trigger switch 26i functions in a manner similar to that of a typical B-button, i.e., is used to cancel an action decided by the A-button 26d.

Also, as shown in FIG. 3E, an external extension connector 22b is provided in the rear end surface of the housing 22a. Also, as shown in FIG. 3B, an indicator 22c is provided in a portion closer to the rear end surface of the upper surface of the housing 22a. The external extension connector 22b is used to, for example, connect to another extension controller (not shown). The indicator 22c includes, for example, four LEDs. By turning ON one of the four LEDs, identification information (controller number) of a controller 22 corresponding to the LED turned ON can be indicated. Alternatively, the remaining amount of the power supply of the controller 22 can be indicated by the number of LEDs which are turned ON.

Figure 4:
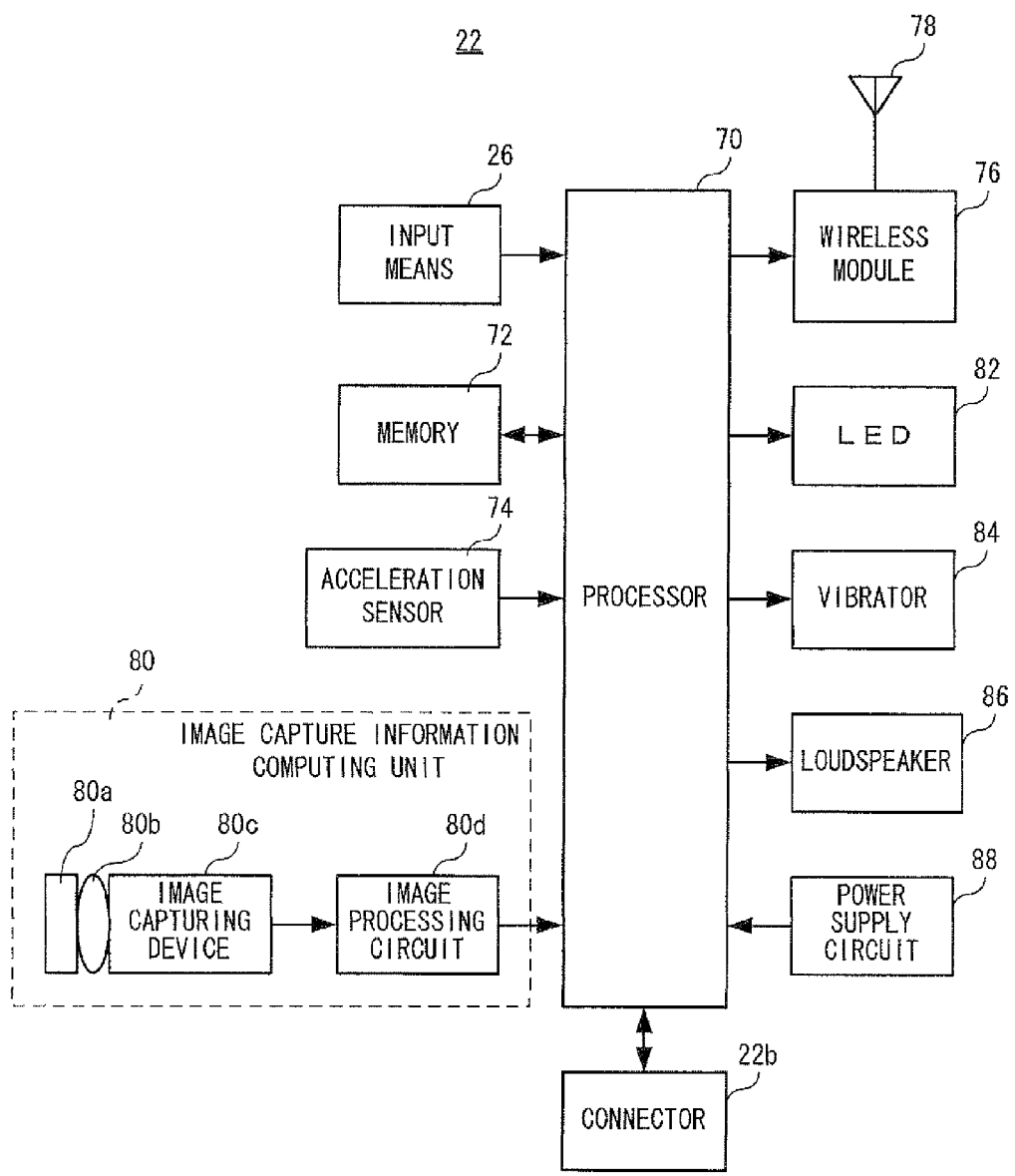
FIG. 4 is a block diagram showing an electrical structure of the controller 22.

Moreover, the controller 22 has an image capture information computing unit 80 (see FIG. 4). As shown in FIG. 3A, a light incident portion 22d of the image capture information computing unit 80 is provided in the front end surface of the housing 22a. The controller 22 also has a loudspeaker 86 (see FIG. 4). As shown in FIG. 32, the loudspeaker 86 is provided in the housing 22a, corresponding to a sound hole 22e which is provided in the upper surface of the housing 22a and between the 1-button 26b and the HOME button 26f.

Note that the shape of the controller 22 and the shapes, number and installation positions of the input means 26 shown in FIGS. 3A to 3E are only for illustrative purposes. Various modifications and changes can be made thereto within the scope of the present invention.

FIG. 4 is a block diagram showing an electrical structure of the controller 22. Referring to FIG. 4, the controller 22 includes a processor 70. The external extension connector 22b, the input means 26, a memory 72, an acceleration sensor 74, a wireless module 76, the image capture information computing unit 80, LEDs 82 (the indicator 22c), a vibrator 84, the loudspeaker 86, and a power supply circuit 88 are connected via an internal bus (not shown) to the processor 70. An antenna 78 is connected to the wireless module 76.

The processor 70 controls the overall operation of the controller 22. The processor 70 transmits (inputs) information (input information) received from the input means 26, the acceleration sensor 74 and the image capture information computing unit 80, as input data, to the game apparatus 12 via the wireless module 76 and the antenna 78. In this case, the processor 70 employs the memory 72 as a work area or a buffer area.

An operation signal (operation data) from the input means 26 (26a to 26i) is input to the processor 70. The processor 70 temporarily stores the operation data in the memory 72.

Also, the acceleration sensor 74 detects an acceleration along each of three axes in a vertical direction (y-axis direction), a lateral direction (x-axis direction) and a front-to-rear direction (z-axis direction) of the controller 22. That is, the acceleration sensor 74 detects the acceleration with respect to each axis of an xyz coordinate system (object coordinate system) of the controller 22. The acceleration sensor 74 is typically of a capacitance type or may be of other types.

For example, the acceleration sensor 74 detects accelerations (ax, ay, az) along the x-axis, the y-axis and the z-axis and outputs data of the detected accelerations (acceleration data) to the processor 70 at first predetermined intervals. For example, the acceleration sensor 74 detects an acceleration in each axial direction within the range of −2.0 g to 2.0 g (g herein indicates the gravitational acceleration). The processor 70 detects acceleration data received from the acceleration sensor 74 at second predetermined intervals and temporarily stores the acceleration data in the memory 72. The processor 70 generates input data containing at least one of operation data, acceleration data, and marker coordinate data (described below), and transmits the generated input data to the game apparatus 12 at third predetermined intervals (e.g., 5 msec).

Note that, in this example, the acceleration sensor 74 is provided at a portion in the vicinity of the cross-key 26a of the printed board in the housing 22a, though not shown in FIGS. 3A to 3E.

The wireless module 76 uses, for example, the Bluetooth (registered trademark) technique to modulate carrier waves having a predetermined frequency with input data, and emits a resultant weak radio wave signal from the antenna 78. In other words, the input data is modulated by the wireless module 76 into the weak radio wave signal, which is in turn transmitted from the antenna 78 (controller 22). The weak radio wave signal is received by the wireless controller module 52 of the game apparatus 12. The received weak radio waves are subjected to demodulation and decoding processes, and therefore, the game apparatus 12 can acquire the input data from the controller 22. Thereafter, the CPU 40 executes a game process based on the acquired input data and a program (game program).

Moreover, as described above, the controller 22 includes the image capture information computing section 80. The image capture information computing section 80 includes an infrared filter 80a, a lens 80b, an image capturing device 80c, and an image processing circuit 80d. The infrared filter 80a passes only an infrared part of light entering from the front of the controller 22. As described above, the markers 340m and 340n provided in the vicinity of (around) the display screen of the monitor 34 are infrared LEDs which output infrared light toward the front of the monitor 34. Therefore, by providing the infrared filter 80a, images of the markers 340m and 340n can be more correctly captured. The lens 80b collects infrared light passing through the infrared filter 82 and emits the infrared light to the image capturing device 80c. The image capturing device 80c, which is, for example, a solid-state image capturing device, such as a CMOS sensor or a CCD sensor, receives infrared light collected by the lens 80b. Therefore, the image capturing device 80c captures only infrared light passing through the infrared filter 80a to generate image data. Hereinafter, the image captured by the image capturing device 80c is referred to as a captured image. The image data generated by the image capturing device 80c is processed by the image processing circuit 80d. The image processing circuit 80d calculates a position of a target object (the markers 340m and 340n) in the captured image, and outputs coordinates indicating the calculated position, as captured image data, to the processor 70 at fourth predetermined intervals. Note that the process of the image processing circuit 80d will be described below.

Figure 5:
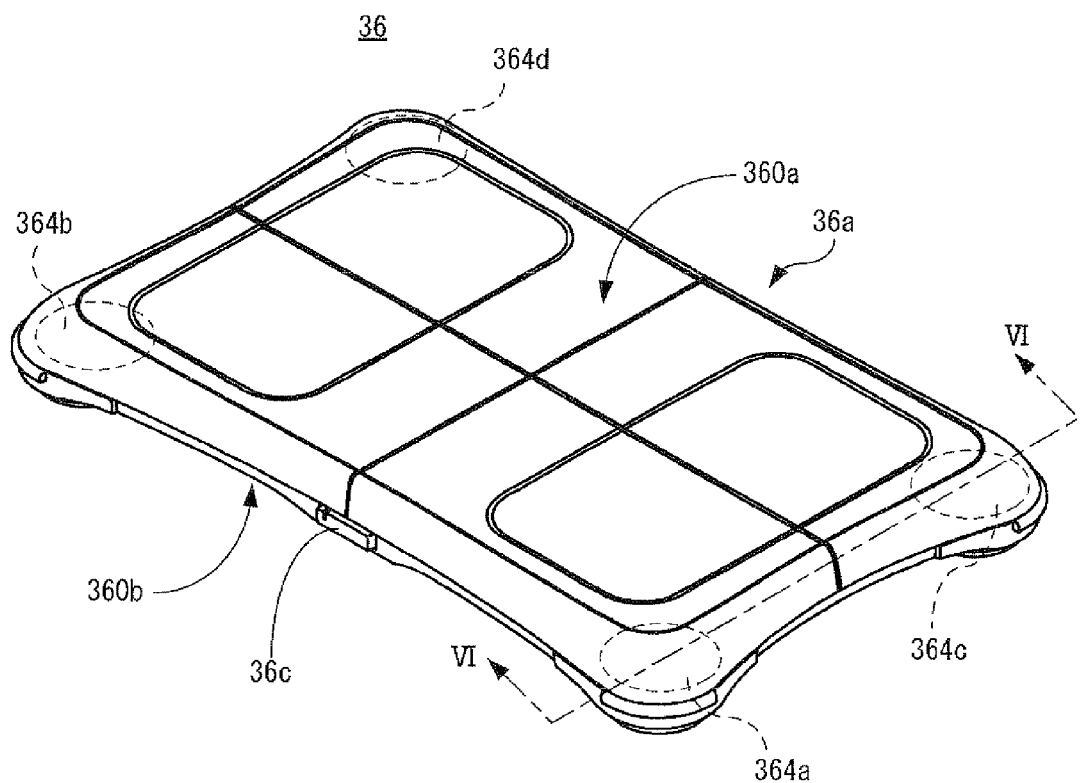
FIG. 5 is a perspective external view of a load controller 36 shown in FIG. 1.

FIG. 5 is a perspective external view of the load controller 36 shown in FIG. 1. As shown in FIG. 5, the load controller 36 includes a platform 36a to be mounted by the user (the user puts their foot or feet thereon), and at least four load sensors 364 (364a to 364d) for detecting a load on the platform 36a. Note that each load sensor 364 is provided inside the platform 36a (see FIG. 7) and is shown with a dashed line in FIG. 5.

The platform 36a is in the shape of substantially a rectangular parallelepiped, and is in the shape of substantially a rectangle as viewed from the top. For example, the short side and the long side of the rectangle are set to about 30 cm and about 50 cm, respectively. The platform 36a has a flat upper surface to be mounted by the user. The platform 36a has four corner side surfaces each partially sticking out in a cylindrical shape.

In the platform 36a, the four load sensors 364 are arranged at predetermined intervals. In this example, the four load sensors 364 are arranged in a periphery of the platform 36a, specifically, at the respective four corners. The intervals at which the load sensors 364 are arranged are set to appropriate values which allow accurate detection of what is intended by a game operation depending on the way in which the user puts a load onto the platform 36a.

Figure 6:
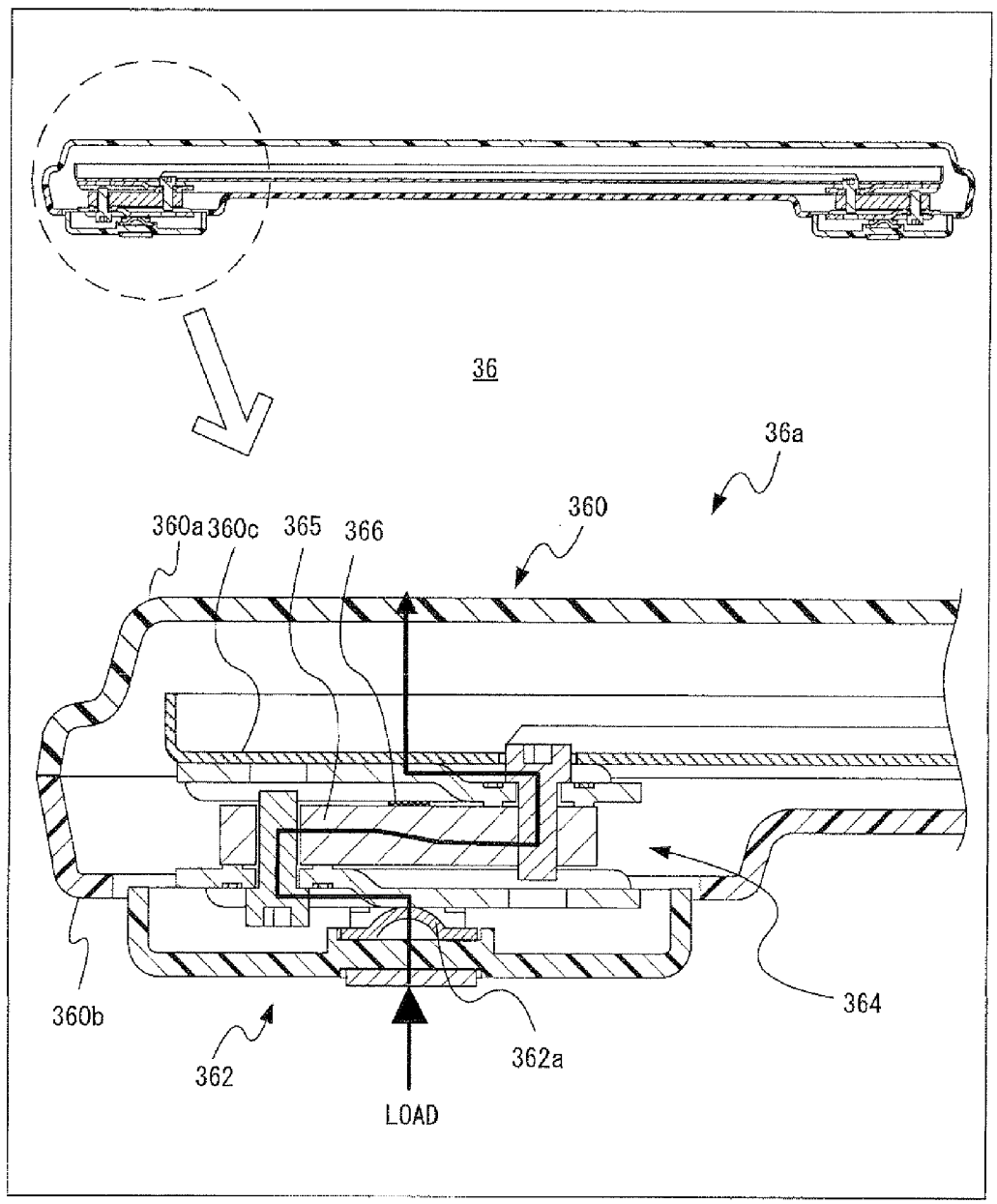
FIG. 6 is a cross-sectional view of the load controller 36 taken along line VI-VI shown in FIG. 5.

FIG. 6 is a cross-sectional view of the load controller 36 taken along line VI-VI of FIG. 5 and an enlarged view of a corner portion of the load controller 36 in which a load sensor 364 is provided. As can be seen from FIG. 6, the platform 36a includes a support plate 360 to be mounted by the user, and legs 362. The legs 362 are provided at portions where the load sensors 364 are arranged. In this example, since the four load sensors 364 are arranged at the four corners, the four legs 362 are also provided at the four corners. Each leg 362 is formed by plastic molding in the shape of substantially a cylinder with a base. The load sensors 364 are each provided on a spherical part 362a provided on the base of the corresponding leg 362. The support plate 360 is supported by the legs 362 with the load sensors 364 being interposed therebetween.

The support plate 360 includes an upper plate 360a forming an upper surface and an upper side surface portion, a lower plate 360b forming a lower surface and a lower side surface portion, and an intermediate plate 360c provided between the upper plate 360a and the lower plate 360b. The upper plate 360a and the lower plate 360b are formed by, for example, plastic molding, and are integrated using an adhesive or the like. The intermediate plate 360c is, for example, formed of a single metal plate by press forming. The intermediate plate 360c is fixed onto the four load sensors 364. The upper plate 360a has a grid-patterned rib (not shown) on a lower surface thereof. The upper plate 360a is supported by the intermediate plate 360c with the rib being interposed therebetween. Therefore, when the user mounts the platform 36a, the load is transferred to the support plate 360, the load sensors 364 and the legs 362. As indicated with arrows in FIG. 6, reactions from a floor generated by the input load are transferred from the legs 362 via the spherical parts 362a, the load sensors 364 and the intermediate plate 360c to the upper plate 360a.

Each load sensor 364 is, for example, a strain gauge (strain sensor) load cell, which is a load transducer which converts an input load to an electrical signal. In the load sensor 364, a structural member 365 is deformed, depending on an input load, resulting in strain. The strain is converted into a change in electrical resistance and is then converted into a change in voltage by a strain sensor 366 attached to the structural member. Therefore, the load sensor 364 outputs a voltage signal indicating the input load from an output terminal thereof.

Note that the load sensor 364 may be of other types, such as a tuning fork type, a string vibration type, a capacitance type, a piezoelectric type, a magnetostrictive type, and a gyroscopic type.

Referring back to FIG. 5, the load controller 36 further includes a power button 36c. When the power button 36c is turned ON, power is supplied to each circuit component (see FIG. 7) of the load controller 36. Note that the load controller 36 may be powered ON in accordance with an instruction from the game apparatus 12. Also, the load controller 36 is powered OFF if a state in which the user does not mount the load controller 36 continues for a predetermined time period (e.g., 30 seconds) or more. Note that, when the load controller 36 is in the active state, then if the power button 36c is pushed down, the load controller 36 may be powered OFF.

FIG. 7 is a block diagram showing an example of an electrical structure of the load controller 36. Note that signal and communication flows are indicated by solid lines with an arrow or arrows in FIG. 7. Dashed lines with an arrow or arrows indicate supply of power.

The load controller 36 includes a microcomputer 100 for controlling the operation of the load controller 36. The microcomputer 100 includes a CPU, a ROM, a RAM and the like (not shown). The CPU controls the operation of the load controller 36 in accordance with a program stored in the ROM.

The power button 36c, an A/D converter 102, a DC/DC converter 104, and a wireless module 106 are connected to the microcomputer 100. Moreover, an antenna 106a is connected to the wireless module 106. The four load sensors 364 are connected via amplifiers 108 to the A/D converter 102, respectively.

The load controller 36 also accommodates a battery 110 for supplying power. In other examples, an AC adapter may be connected to the load controller 36 instead of the battery so that commercial power is supplied to the load controller 36. In this case, a power supply circuit which converts alternating current into direct current and decreases and rectifies direct voltage needs to be provided instead of the DC/DC converter. In this example, power is supplied directly from the battery 110 to the microcomputer 100 and the wireless module 106. In other words, power is invariably supplied to a portion (CPU) of the components of the microcomputer 100 and the wireless module 106 so as to determine whether or not the power button 36c has been turned on or whether or not a command to power ON (detection of a load) has been transmitted from the game apparatus 12. On the other hand, power is supplied to the load sensors 364, the A/D converter 102 and the amplifiers 108 from the battery 110 via the DC/DC converter 104. The DC/DC converter 104 converts the voltage value of the direct current from the battery 110 to a different voltage value, and supplies the resultant power to the load sensors 364, the A/D converter 102 and the amplifiers 108.

The supply of power to the load sensors 364, the A/D converter 102 and the amplifiers 108 may be performed as required by the microcomputer 100 controlling the DC/DC converter 104. Specifically, the microcomputer 100, when determining that it is necessary to operate the load sensors 364 to detect a load, may control the DC/DC converter 104 to supply power to the load sensors 364, the A/D converter 102 and the amplifiers 108.

When power is supplied to the load sensors 364, each load sensor 364 outputs a signal indicated a load input thereto. The signals are amplified by the respective amplifiers 108, and are converted from analog signals into digital data by the A/D converter 102. The digital data is input to the microcomputer 100. A detected value of each load sensor 364 is given identification information of the load sensor 364. Therefore, each load sensor 364 can be identified from a corresponding detected value. Thus, the microcomputer 100 can acquire data representing detected load values at the same time of the four load sensors 364.

On the other hand, the microcomputer 100, when determining that it is not necessary to operate the load sensors 364 (i.e., it is not the time of load detection), controls the DC/DC converter 104 to stop the supply of power to the load sensors 364, the A/D converter 102 and the amplifiers 108. Thus, the load controller 36 can operate the load sensors 364 to detect a load only when it is required, whereby power consumption for load detection can be suppressed.

The load detection is typically required when the game apparatus 12 (FIG. 1) needs to acquire load data. For example, the game apparatus 12, when requiring load information, transmits a load acquisition command to the load controller 36. The microcomputer 100, when receiving the load acquisition command from the game apparatus 12, controls the DC/DC converter 104 to supply power to the load sensors 364 and the like so as to detect a load. On the other hand, the microcomputer 100, when not receiving the load acquisition command from the game apparatus 12, controls the DC/DC converter 104 to stop supply of power.

Alternatively, the microcomputer 100 may determine that load detection time occurs at predetermined intervals and control the DC/DC converter 104. When the load detection is thus periodically performed, cycle information may be initially supplied and stored from the game apparatus 12 into the microcomputer 100 of the load controller 36 or may be previously stored in the microcomputer 100, for example.

Data representing detected values from the load sensors 364 is transmitted as operation data (input data) of the load controller 36 from the microcomputer 100 via the wireless module 106 and an antenna 106b to the game apparatus 12 (FIG. 1). For example, when receiving a command from the game apparatus 12 and performing the load detection, then if receiving detected value data of the load sensors 364 from the A/D converter 102, the microcomputer 100 transmits the detected value data to the game apparatus 12. Alternatively, the microcomputer 100 may transmit detected value data to the game apparatus 12 at predetermined intervals. If the cycle of the transmission is longer than the cycle of the load detection, data containing load values which are detected at a plurality of detection times until the next transmission time is transmitted.

Note that the wireless module 106 can perform communication in accordance with the same wireless standard (Bluetooth (registered trademark), wireless LAN, etc.) as that of the wireless controller module 52 of the game apparatus 12. Therefore, the CPU 40 of the game apparatus 12 can transmit the load acquisition command via the wireless controller module 52 and the like to the load controller 36. The microcomputer 100 of the load controller 36 can receive the command via the wireless module 106 and the antenna 106a from the game apparatus 12, and transmit input data containing a detected load value (or a calculated load value) of each load sensor 364 to the game apparatus 12.

For example, in a game which is executed based on a simple total of four load values detected by the four load sensors 364, the user is permitted to mount any position with respect to the four load sensors 364 of the load controller 36, i.e., the user is permitted to mount the platform 36a at any position and in any orientation to play a game. In some kinds of games, however, the direction of a load value detected by each load sensor 364 as viewed from the user needs to be identified, i.e., a positional relationship between the four load sensors 364 of the load controller 36 and the user needs to be recognized. In this case, for example, the positional relationship between the four load sensors 364 and the user may be previously defined, and the user may be supposed to mount the platform 36a in a manner which allows the predetermined positional relationship. Typically, a positional relationship in which there are two load sensors 364 in front of, behind, to the right of, and to the left of the user mounting a middle of the platform 36a, i.e., a positional relationship in which, when the user mounts a middle of the platform 36a of the load controller 36, there is a load sensor 364 in front right, front left, rear right and rear left directions with respect to the user as a center, is defined. In this case of this example, the platform 36a of the load controller 36 is in the shape of a rectangle as viewed from the top and the power button 36c is provided at one side (long side) of the rectangle. Therefore, it is previously ruled that the user should mount the platform 36a using the power button 36c as a guide in a manner which allows the long side at which the power button 36c is provided to be located in a predetermined direction (front, rear, left or right). In this case, a load value detected by each load sensor 364 is located in a predetermined direction (front right, front left, rear right, and rear left) as viewed from the user. Therefore, the load controller 36 and the game apparatus 12 can comprehend a direction in which each detected load value is located as viewed from the user, based on the identification information of the load sensors 364 contained in the detected load value data and arrangement data representing previously set (stored) positions or directions of the load sensors 364 with respect to the user. As a result, for example, it is possible to recognize what is intended by a game operation input by the user, such as forward, backward, rightward and leftward operation directions and the like.

Note that the arrangement of the load sensors 364 with respect to the user may not be previously defined, and may be input and set by the user during initial setting or during a game. For example, a screen image may be displayed which instructs the user to mount a portion in a predetermined direction (front left, front right, rear left, rear right, etc.) as viewed from the user, and load values may be acquired, so that a positional relationship between the load sensors 364 and the user can be specified, and therefore, arrangement data may be generated and stored based on these settings. Alternatively, a screen image for selecting an arrangement of the load controllers 36 may be displayed on the monitor 34 to cause the user to select a direction in which a guide (the power button 360) is located as viewed from the user by an input using the controller 22. Arrangement data of the load sensors 364 may be generated and stored based on the selection.

(Overview of Game Process)

Figure 8:
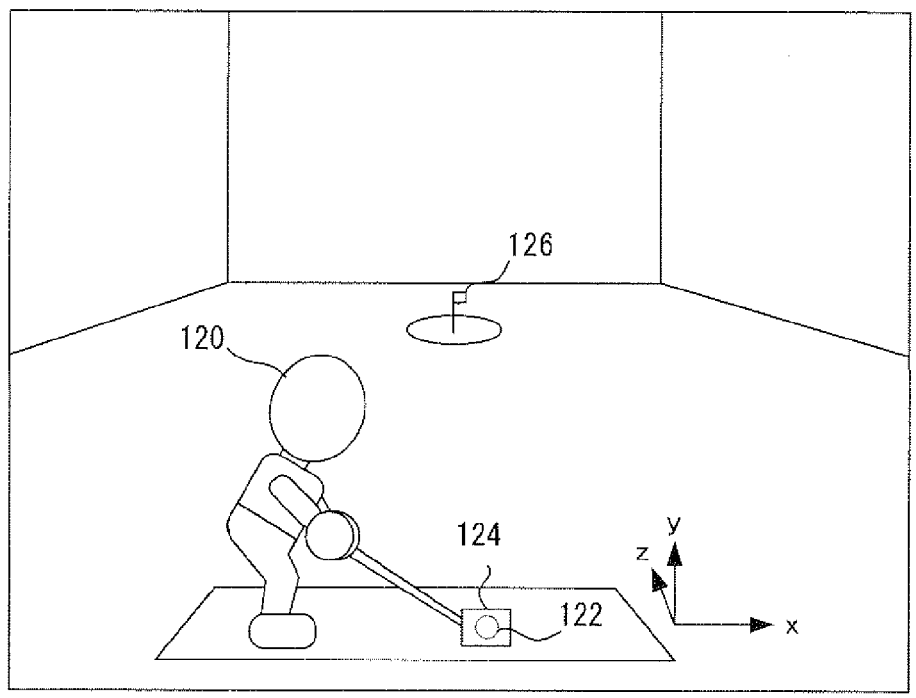
FIG. 8 is an example of a screen image of a game assumed in the present embodiment.
Figure 9:
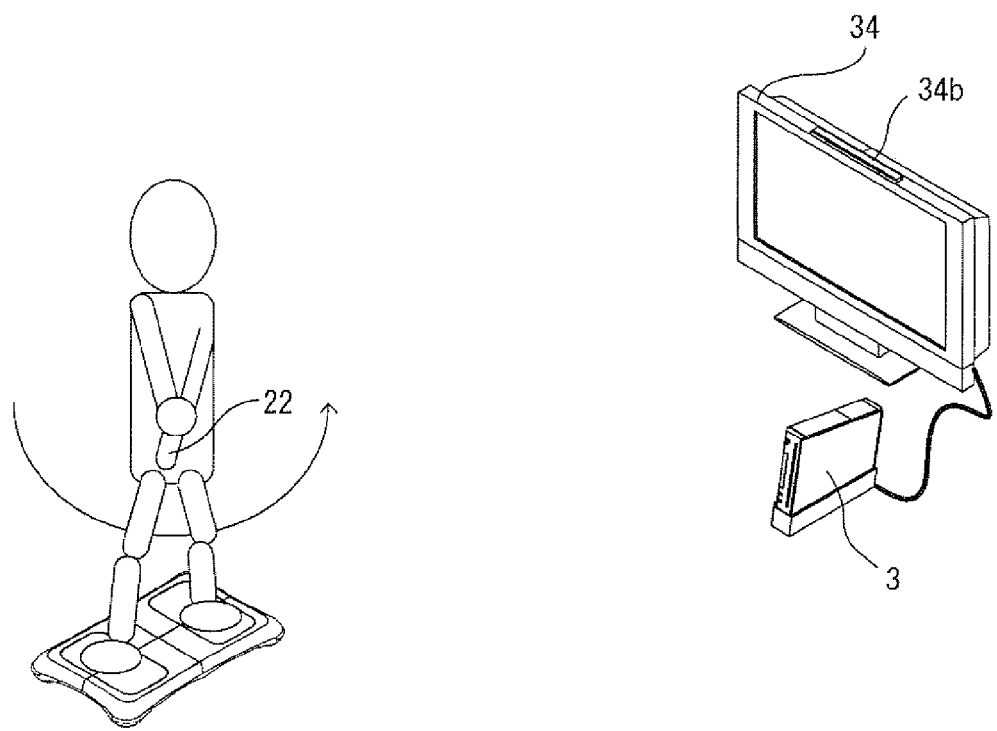
FIG. 9 is a diagram showing a right-handed player mounting the load controller 36 and swinging the controller 22 as if swinging a golf club.

Next, an overview of a game process according to an embodiment of the present invention is described with reference to FIGS. 8 and 9. A game assumed in the present embodiment is a golf practice game. FIG. 8 is an example of a screen image of the game assumed in the present embodiment. Referring to FIG. 8, the screen image displays a golf practice range constructed in a virtual game space, a player object 120, which is a representation of a player that appears in the virtual game space, a ball object (referred to simply as a "ball") 122, a club head 124 of a golf club, and a flagstick 126. In this game the player virtually practices golf by controlling the player object 120 that appears in the virtual game space. Referring to FIG. 8, the player object 120 that is right-handed is displayed. A given position in the virtual game space is represented as a coordinate value of an xyz coordinate system (a space-fixed coordinate system). As shown in FIG. 8, the x-axis positive direction of the xyz coordinate system is the left-to-right direction of the screen image, the y-axis positive direction is the upward direction of the virtual game space, and the z-axis positive direction is the direction from the player object 120 to the flagstick 126 (the perspective direction of the screen image). Note that the xyz coordinate axes are not actually displayed on the screen image.

In this case, the load controller 36 is placed longitudinally with respect to the screen of the monitor 34 (so that the long sides of the controller are parallel to a direction toward the screen). For example, a right-handed player mounts the load controller 36 placed longitudinally, stands facing right with respect to the screen, and swings the controller 22 as if actually swinging a golf club. FIG. 9 is a diagram showing a right-handed player mounting the load controller 36 and swinging the controller 22 as if swinging a golf club. As shown in FIG. 9, the player performs a swinging motion holding the controller 22 with both hands or one hand. In accordance with this swinging motion of the player, the player object 120 displayed on the screen image makes a golf swing and hits the ball 122 to make a shot. Then the screen image displays the shot ball 122 flying away in the game space.

In the game process according to the present embodiment, each parameter given to the ball 122 is calculated based on the motion of the player swinging the controller 22, and based also on the change in the load and the change in the position of the center of gravity that are caused by the shifting of the player's weight, and the carry and trajectory of the ball 122 are determined based on the calculated parameters. Each parameter given to the ball 122 is specifically described below.

Generally, the carry and trajectory of the shot golf ball are determined based on each parameter given to the ball. That is, the carry and trajectory of the ball are determined in accordance with the magnitude of the initial velocity imparted to the ball, and the launch angle, the amount of slice (sidespin), the rightward launch angle, and the amount of backspin, of the ball. Each parameter is described below. Note that the calculation method of each parameter will be described later.

Figure 10:
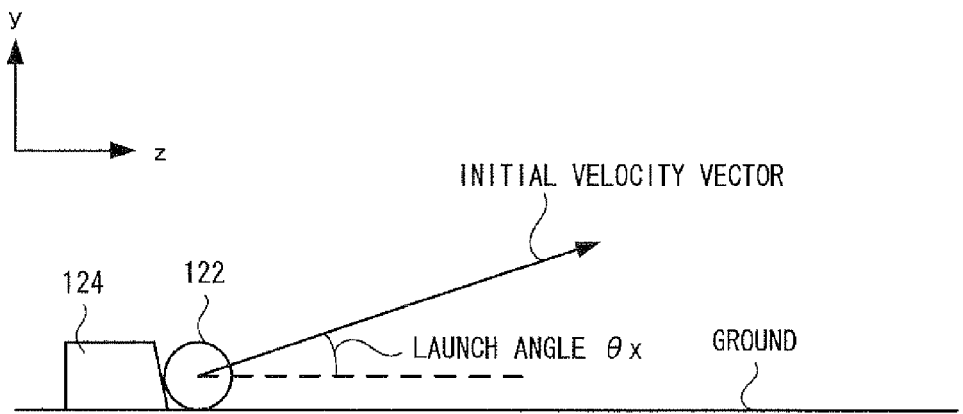
FIG. 10 is a diagram showing in a game space a lateral view of the state of the moment (the moment of impact) when an initial velocity is imparted to a ball 122, and also showing the launch angle of the ball.

The magnitude of the initial velocity of the ball is the magnitude of the initial velocity imparted to the ball at the moment when the ball is hit with the golf club to make a shot. The launch angle of the ball is the angle formed by the initial velocity vector of the ball and the ground. FIG. 10 is a diagram showing in the game space a lateral view of the state of the moment (the moment of impact) when an initial velocity is imparted to the ball 122, and the diagram also shows the launch angle of the ball. As shown in FIG. 10, the launch angle $\theta x$ of the ball 122 is the angle formed by the initial velocity vector and the ground. That is, the launch angle $\theta x$ is, when the initial velocity vector of the ball is projected onto the yz plane of the xyz coordinate system of the game space, the angle formed by the projection vector on the yz plane and the z-axis.

Figure 11:
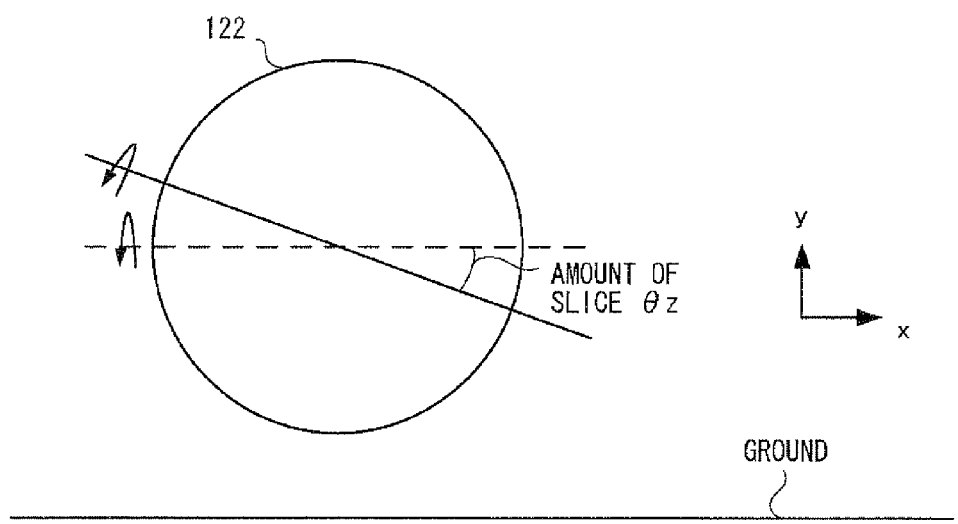
FIG. 11 is a diagram showing a rear view of the ball 122 when an initial velocity is imparted to the ball, and also showing the amount of slice of the ball.

The amount of slice of the ball is an amount that represents the degree of the curve of the ball to the right or left when the ball launches and flies away in the game space. Specifically, the amount of slice of the ball is represented by the inclination (angle) of the axis of rotation of the ball with respect to the ground. FIG. 11 is a diagram showing a rear view of the ball 122 when an initial velocity is imparted to the ball, and the diagram also shows the amount of slice of the ball. As shown in FIG. 11, the amount of slice $\theta z$ of the ball is an angle of rotation about the z-axis (the angle between a dashed line and a solid line of FIG. 11) that is formed by the axis of rotation of the ball. Generally, the ball has backspin (rotation) when an initial velocity is imparted to the ball. As shown in the dashed line of FIG. 11, when the axis of rotation of the backspin is not inclined with respect to the ground (when the axis of rotation of the backspin is parallel to the x-axis), the ball 122 travels straight in the virtual game space, without curving. As shown in the solid line of FIG. 11, however, when the axis of rotation of the backspin is inclined to the right with respect to the ground at a particular angle (a positive value), the ball 122 travels while curving to the right (in the x-axis positive direction) (slices). On the other hand, when the axis of rotation of the backspin is inclined to the left with respect to the ground at a particular angle (a negative value), the ball 122 travels while curving to the left (in the x-axis negative direction) (hooks). When the ball 122 has backspin, a vertically upward force with respect to the axis of rotation of the backspin acts on the ball 122, and consequently, a force in a lateral direction (the x-axis direction) acts on the ball 122 in accordance with the angle of the axis of rotation of the backspin. That is, the amount and direction of the curve of the ball 122 are determined in accordance with the magnitude and sign (positive or negative) of the amount of slice $\theta z$ of the ball.

Note that generally, the amount of the curve of the ball depends on the amount of rotation (the velocity of rotation) of the backspin. In the present embodiment, however, the amount of rotation of the backspin is predetermined in accordance with the type (number) of the golf club, and therefore the amount of the curve of the ball 122 is determined based only on the value of the amount of slice $\theta z$ and the type of the golf club.

Figure 12:
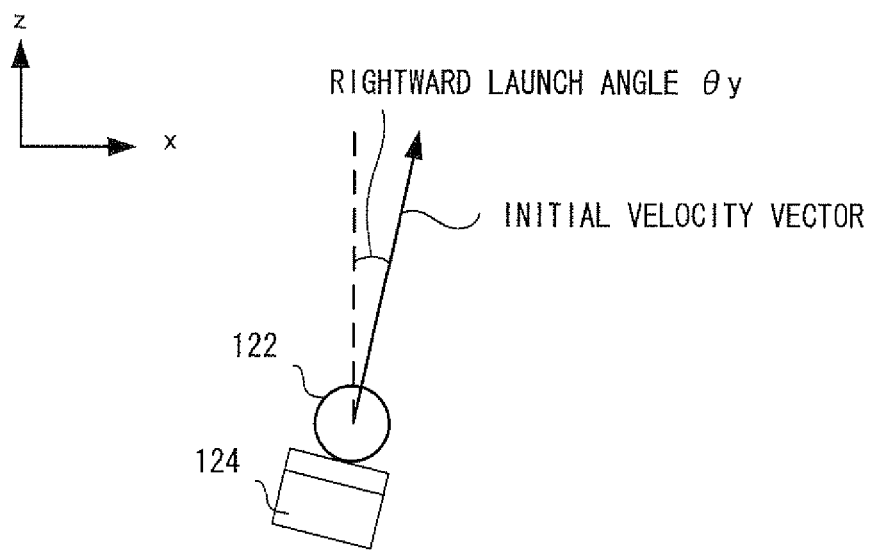
FIG. 12 is a diagram showing in the game space a top view of the state of the moment (the moment of impact) when an initial velocity is imparted to the ball 122, and also showing the rightward launch angle of the ball.

The rightward launch angle of the ball is the lateral angle of the launch of the ball. FIG. 12 is a diagram showing in the game space a top view of the state of the moment (the moment of impact) when an initial velocity is imparted to the ball 122, and the diagram also shows the rightward launch angle of the ball. As shown in FIG. 12, at the moment when the club head 124 of the golf club hits the ball 122, the club face (striking surface) of the club head 124, which makes contact with the ball 122, may not be directed straight in the z-axis direction (the direction of the flagstick). In this case, the direction of the launch of the ball 122 and the z-axis direction form a particular angle, which is the rightward launch angle $\theta y$. The rightward launch angle $\theta y$ of the ball 122 is, when the initial velocity vector of the ball is projected onto the xz plane, the angle formed by the projection vector on the xz plane and the z-axis. That is, the rightward launch angle $\theta y$ of the ball is an angle of rotation about the y-axis that is formed from a direction straight forward toward the flagstick (a dashed line of FIG. 12). As shown in FIG. 12, when the rightward launch angle $\theta y$ has a positive value, the ball 122 launches to the right of the game space (in the x-axis positive direction). On the other hand, when the rightward launch angle has a negative value, the ball 122 launches to the left of the game space (in the x-axis negative direction).

(Calculation of Each Parameter)

Next, the calculation method of each parameter is described. First, the calculation method of the amount of slice $\theta z$ is described, and then the calculation methods of the other parameters (the magnitude of the initial velocity, the launch angle $\theta x$, and the rightward launch angle $\theta y$) will be described.

In the present embodiment the amount of slice $\theta z$ of the ball is determined based on the load value detected by the load controller 36 and the change over time in the load value. Specifically, the amount of slice $\theta z$ is calculated using three evaluation values (first through third evaluation values) determined by the load value and the position of the center of gravity that are detected by the load controller 36 and the changes over time in the load value and the position. The three evaluation values are described below.

The first evaluation value is calculated based on the time when the load value detected by the load controller 36 becomes the maximum and the time when the velocity of the center of gravity, which represents the velocity of movement of the position of the center of gravity of the load applied to the load controller 36, i.e., the position of the center of gravity of the player, becomes the maximum. The first evaluation value is an evaluation value related to the timing of the impact, and the value represents whether or not the player is swinging late. First, a description is given of the time when the load value detected by the load controller 36 becomes the maximum.

While the player makes a golf swing mounting the load controller 36, the load value detected by the load controller 36 (the total load value of the four load sensors 364*a* through 364*d*) changes. FIGS. 13A through 13E are diagrams showing the player actually making a golf swing. FIG. 13A is a diagram showing the player being at rest in the backswing. FIG. 13B is a diagram showing the moment when the player makes the transition from the backswing to the downswing. FIG. 13C is a diagram showing the player making the downswing. FIG. 13D is a diagram showing the moment (the moment of impact) when the player hits the ball. FIG. 13E is a diagram showing the player following through.

As shown in FIGS. 13A through 13E, when making a golf swing, the player makes the transition from the backswing to the downswing, hits (impacts) the ball, makes the transition to the follow-through, and finishes the swing. During this process, the load value detected by the load controller 36 decreases immediately after the transition has been made from the backswing to the downswing (FIG. 13B), increases during the downswing (FIG. 13C), and indicates the maximum value near the moment of impact (FIG. 13D). After the impact, the load value decreases again during the follow-through (FIG. 13E), and becomes constant (i.e., the value of the player's weight) after the player has finished the swinging motion.

Here, an explanation is given of the reason that the load value changes while the player makes a swing as described above. When the player is at rest on the load controller 36, the load value detected by the load controller 36 is constant. However, when the player swings their arms on the load controller 36, the load value changes. For example, when the player makes the transition from the backswing to the downswing, the player applies a force in an attempt to swing down their arms. In accordance with the motion of the player swinging down their arms, an approximately vertically downward acceleration is applied to the arms and the golf club (the controller 22). In this case, due to the law of inertia (action and reaction), an approximately vertically upward force corresponding to the approximately vertically downward acceleration is applied to the player's whole body (more precisely, the player's shoulder joints). Accordingly, the load value detected by the load controller 36 indicates a smaller value than the player's weight immediately after the player has made the transition from the backswing to the downswing.

On the other hand, while the player is making the downswing (FIG. 13C), a centrifugal force is applied to their arms and the golf club (the controller 22) in accordance with the force of the player swinging the arms (the velocity of the swing). Accordingly, when the player is making the downswing and the player's arms are directed toward the ground (when the player is making the swing shown in FIGS. 13C and 13D), a vertically downward force is applied to the arms and the golf club (the controller 22). This increases the load value detected by the load controller 36 while the player is making the downswing. The centrifugal force becomes the maximum near the moment (the moment of impact) when the player hits the ball, and therefore the load value detected by the load controller 36 becomes the maximum value near the moment of impact. After the impact, the player follows through in a relaxed manner. In the follow-through the centrifugal force applied to the arms in the up/down direction turns vertically upward, and therefore the load value detected by the load controller 36 decreases again. When the motion of the player stops, the load value becomes constant.

The load value changes also due to the rotation of the player's hips (the shifting of the player's weight). For example, when the player, if right-handed, is at rest in the backswing, they tend to put more of their weight on the right foot. When making the transition from the backswing to the downswing, the player attempts to shift their weight from the right foot to the left foot, lightly kicking the ground (the load controller 36) with the right foot. Then, at the moment of impact the player hits the ball, planting themselves on the left foot. In accordance with this rotation of the player's hips, the load value increases when the transition is made from the backswing to the downswing, and becomes the maximum near the moment of impact. Then the load value decreases in the follow-through and becomes a constant value.

Figure 14:
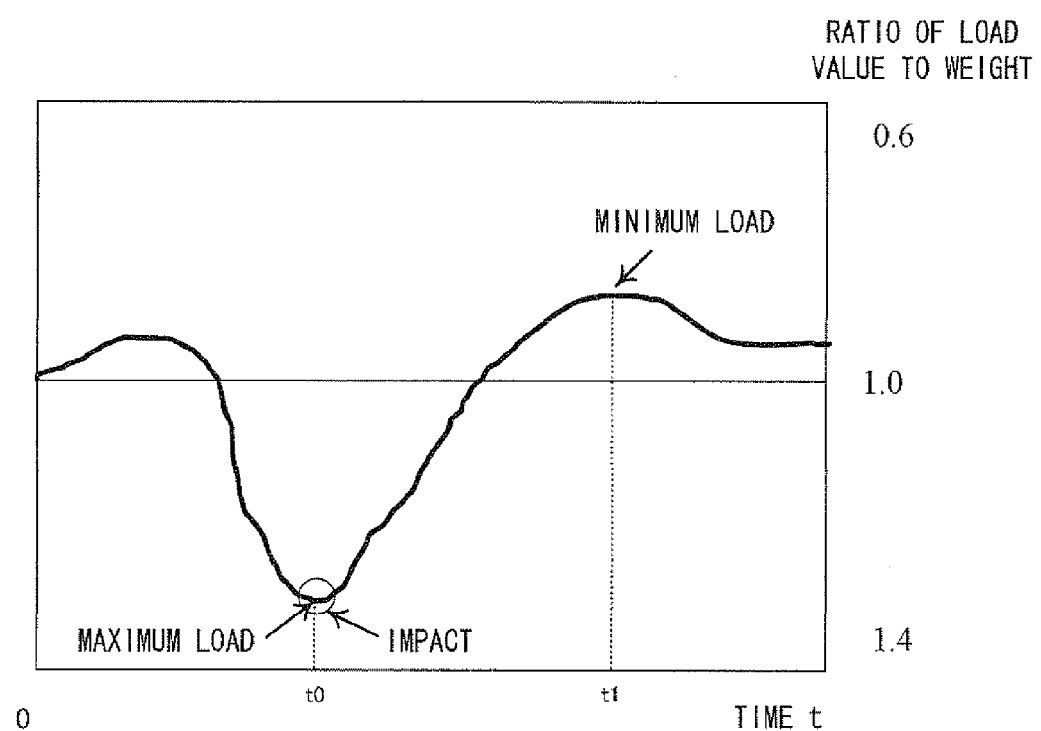
FIG. 14 is a diagram showing the change over time in the load value detected by the load controller 36, from immediately after the player has started the downswing.

FIG. 14 is a diagram showing the change over time in the load value detected by the load controller 36, from immediately after the player has started the downswing. In FIG. 14, the vertical axis represents the ratio of load value to weight (the value obtained by dividing the load value, detected by the load controller 36, by the player's weight), and the horizontal axis represents time. Note that referring to FIG. 14, the further downward the vertical axis, the greater the ratio of load value to weight. As shown in FIG. 14, the load value temporarily decreases when the player makes the transition from the resting state in the backswing (at the top of the swing) to the downswing, and then increases. Then the load value becomes the maximum near the moment of impact (when $t=t0$). Then the load value decreases again when the transition is made to the follow-through, and becomes the minimum (when $t=t1$) immediately before the player finishes the swing.

As described above, the load value detected by the load controller 36 changes during the swinging motion of the player, and becomes the maximum near the moment of impact. Accordingly, it is possible to predict the moment of impact by detecting the time when the load value detected by the load controller 36 becomes the maximum.

Figure 15A:
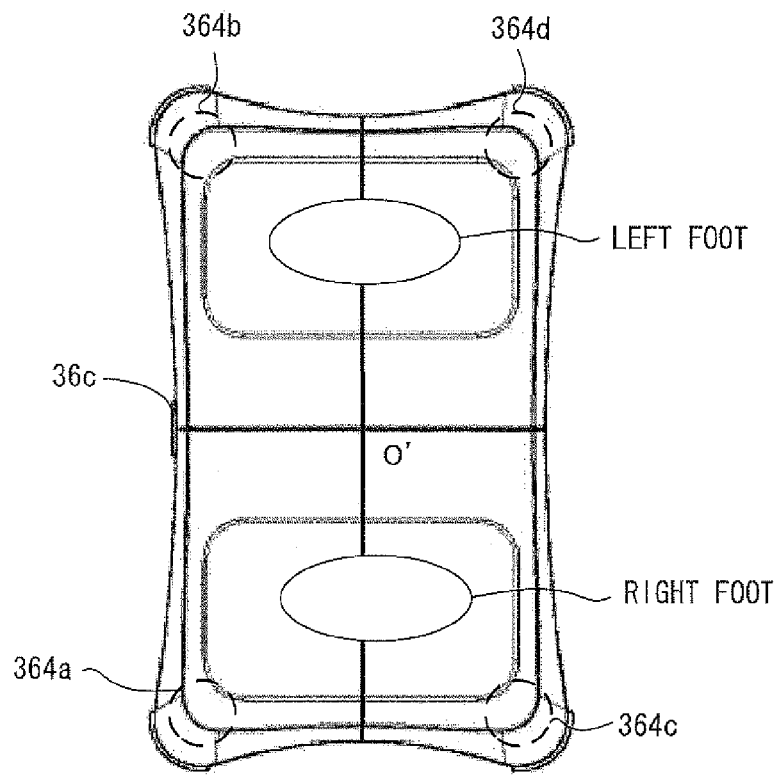
FIG. 15A is a top view of the load controller 36.
Figure 15B:
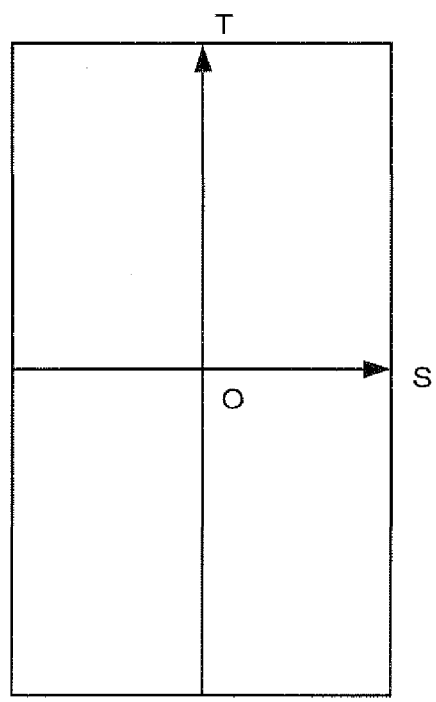
FIG. 15B is a diagram showing an ST coordinate system that corresponds to the positions on a platform 36a of the load controller 36.

Next, a description is given of the time when the velocity of the center of gravity becomes the maximum. As described above, the velocity of the center of gravity refers to the velocity of change in the position of the center of gravity of the player. The position of the center of gravity refers to the position of the center of gravity of the load applied to the platform 36*a* of the load controller 36, and is determined by the load value detected by each of the load sensors 364*a* through 364*d* (see FIG. 5). The position of the center of gravity is represented as a coordinate value of an ST coordinate system that corresponds to the positions on the platform 36*a* of the load controller 36. FIG. 15A is a top view of the load controller 36. FIG. 15B is a diagram showing the ST coordinate system that corresponds to the positions on the platform 36*a* of the load controller 36. In FIG. 15A, the area above the center O' (the side where the load sensors 364*b* and 364*d* are provided) is the area where the player, if right-handed, places the left foot. The area below the center O' (the side where the load sensors 364*a* and 364*c* are provided) is the area where the player, if right-handed, places the right foot. As shown in FIGS. 15A and 15B, the positions on the platform 36*a* of the load controller 36 correspond to the positions in the ST coordinate system. For example, the center O' of the platform 36*a* corresponds to the origin O of the ST coordinate system. Here, when the load value detected by the load sensor 364*a* is a; the load value detected by the load sensor 364*b* is b; the load value detected by the load sensor 364*c* is c; and the load value detected by the load sensor 364d is d, an S-axis coordinate value (SG) and a T-axis coordinate value (TG) of the center of gravity are calculated by the following equation 1 and equation 2, respectively:

$$SG = ((c+d) - (a+b)) \times m \quad (1)$$

$$TG = ((b+d) - (a+c)) \times n \quad (2)$$

Here, m and n are constants, and $-1 \leq SG \leq 1$, and $-1 \leq TG \leq 1$. The position of the center of gravity that is thus calculated changes in accordance with the shifting of the player's weight. For example, when the player, if right-handed, puts their weight on the left foot, the T-axis coordinate value becomes a positive value. When the player puts their weight on the toes, the S-axis coordinate value becomes a positive value. Note that the above calculation equations for the position of the center of gravity are merely illustrative, and the position of the center of gravity may be calculated by other methods.

When performing a swinging motion, the player shifts their weight in accordance with the swing of the arms. Accordingly, the position of the center of gravity changes. Specifically, the player, if right-handed, makes a swing while shifting their weight from the right foot to the left foot in accordance with the change of state from the backswing to the downswing to the impact to the follow-through. In this case, the velocity of movement of the center of gravity tends to be relatively small from the backswing to the downswing, and on the other hand, tends to increase at the moment of impact. In the follow-through after the impact, the velocity of movement of the center of gravity decreases again, and becomes 0 when the swing finishes. The reason for this is considered that the player attempts to apply the maximum force at the moment of impact. In order to hit the ball far, the player shifts their weight while rotating their hips so as to put their weight over the ball. Accordingly, the velocity of movement of the center of gravity becomes the maximum near the moment of impact.

Figure 16:
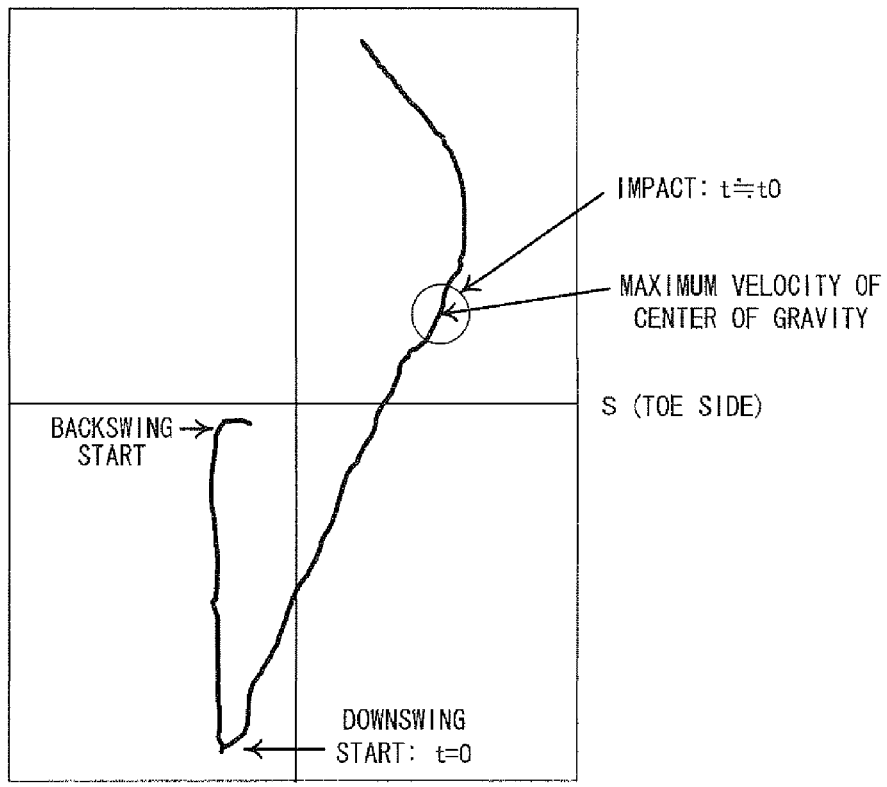
FIG. 16 is a diagram showing the path of the position of the center of gravity, from immediately after the player has started the backswing.

FIG. 16 is a diagram showing the path of the position of the center of gravity, from immediately after the player has started the backswing. As shown in FIG. 16, when the player starts the backswing, the position of the center of gravity moves from near the center of the platform 36a to the right foot. Then, when the player starts the downswing from the top of the swing, the position of the center of gravity moves from the right foot to the left foot. The velocity of the center of gravity gradually increases from the start of the downswing to the impact, and becomes the maximum near the moment of impact.

As described above, in an ideal swing the load value detected by the load controller 36 and the velocity of movement of the center of gravity (the velocity of the center of gravity) become the maximums near the moment of impact. Here, the ideal swing refers to a swing that causes the ball to fly straight without slicing or hooking. That is, in the ideal swing the time when the load value becomes the maximum and the time when the velocity of the center of gravity becomes the maximum are substantially the same, and there is a particular relationship (equation 3 described below) between these times. When the player hits the ball with the ideal swing, the ball flies straight.

However, in an actual swing, the gap between the above two times may differ from the gap between the times in the ideal swing. For example, in the case of swinging late, a large gap occurs between the above two times. Specifically, when the load value detected by the load controller 36 is the maximum, it is considered to be the moment of impact, since the player's arms (the controller 22) is reaching the lowest point (see FIG. 13E). However, if weight has sufficiently shifted and the center of gravity has moved further to the left foot at this time, the velocity of the center of gravity has decreased, already past the time of the maximum velocity. That is, in this case, the player's body is leaning forward at the moment of impact, and the player is swinging late. In actual golf, if a right-handed player swings late, the bail slices. On the other hand, in the case of swinging early, weight has not sufficiently shifted at the moment of impact, and the velocity of the center of gravity is still increasing. That is, if the swing is earlier than the shifting of weight, it is already past the moment of impact when the velocity of the center of gravity indicates the maximum value. In actual golf, if a right-handed player swings early, the ball hooks.

As described above, based on the time when the load value becomes the maximum and the time when the velocity of the center of gravity becomes the maximum, it is possible to determine whether or not the ball is to slice, or whether or not the ball is to hook. Accordingly, the first evaluation value, which is used to calculate the amount of slice $\theta z$, is calculated by the following equation 3:

first evaluation value=time when load value becomes maximum−time when velocity of center of gravity becomes maximum−predetermined value (3)

Note that in equation 3 the "predetermined value" is a constant, which is specific to a golf swing. Accordingly, when the motion of the player is determined in the cases of hitting a ball with a tennis racket, hitting a ball with a ping-pong racket, and hitting a ball with a baseball bat, the present invention can be applied by, for example, changing the "predetermined value" in accordance with the sport. The first evaluation value calculated by equation 3 is a value that represents the degree of swinging late, and the value represents the gap from the time of the impact in the ideal swing. When the first evaluation value is 0, it is indicated that the time of the impact is that of the ideal swing. When the first evaluation value is 0, the hit ball flies straight.

Figure 17:
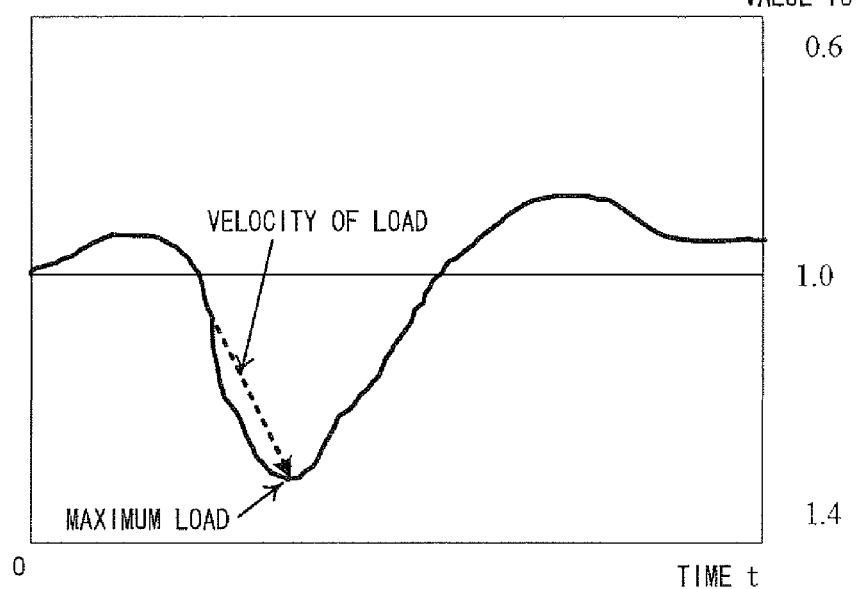
FIG. 17 is a diagram illustrating the velocity of load.

Next, the second evaluation value is described. The second evaluation value is a value that represents the balance between the velocity of the swing of the arms and the velocity of the rotation of the hips, and the value represents whether or not the player is swinging late. Specifically, the second evaluation value is calculated based on the gap from the relationship between the velocity of the center of gravity and the velocity of load in the ideal swing. Here, the velocity of load refers to the degree of increase (the degree of the applied load) in the load value (the total load value) detected by the load controller 36. FIG. 17 is a diagram illustrating the velocity of load. In FIG. 17, similarly to FIG. 14, the vertical axis represents the ratio of load value to weight and the horizontal axis represents time. The velocity of load refers to the amount of change in the load value in a predetermined time period, and is represented by the inclination of a dashed arrow shown in FIG. 17. Specifically, the velocity of load is the inclination of the straight line that connects the point representing the maximum load value with the point of predetermined frame times before the maximum load value.

Here, it is considered that in the ideal swing (a swing that causes the ball to fly straight) there is a particular relationship between the velocity of load and the velocity of the center of gravity. Specifically, in the ideal swing there is a proportional relationship between the velocity of load and the velocity of the center of gravity. The reason is explained below.

That is, the velocity of load is proportional to the velocity of the swing (the velocity of the swing of the arms) and the velocity of rotation of the hips. This is because the greater the velocity of the swing, the greater the increase in the load, and also the greater the velocity of rotation of the hips, the greater the increase in the load. That is, the faster the swing, the shorter the time from the start of the backswing to the impact, and also the greater the velocity of rotation of the hips, the shorter the time from the start of the backswing to the impact. In addition, the faster the swing, the greater the load value, and also the greater the velocity of rotation of the hips, the greater the load value. Accordingly, the velocity of load increases depending on the velocity of the swing and the velocity of rotation of the hips. Further, in the ideal swing the shifting of weight becomes faster in accordance with the velocity of the swing. That is, it is considered that in the ideal swing there is a particular relationship between the velocity of load and the velocity of the center of gravity, and specifically, the velocity of load is proportional to the velocity of the center of gravity.

When the velocity of movement of the center of gravity (the velocity of the center of gravity) is great even though the swing is slow and the velocity of load is small, the swing of the arms is too slow compared to the velocity of the shifting of weight, and therefore only the torso shifts forward in the direction of the hit ball. Due to this, the arms lag behind the shifting of the torso at the moment of impact. Accordingly, in this case, the player swings late and the hit ball slices. On the other hand, when the velocity of the center of gravity is small even though the swing is fast and the velocity of load is great, the swing of the arms is too fast compared to the velocity of the shifting of weight, and therefore the swing is made only by the arms. Due to this, the player hits the ball while pulling the shot at the moment of impact. Accordingly, in this case, the hit ball hooks.

As described above, when the velocity of load is relatively great compared to the velocity of the center of gravity, the hit ball hooks, and when the velocity of load is relatively small compared to the velocity of the center of gravity, the hit ball slices. Accordingly, it is considered that there is a particular relationship between the velocity of load and the velocity of the center of gravity so that the hit ball flies straight.

Figure 18:
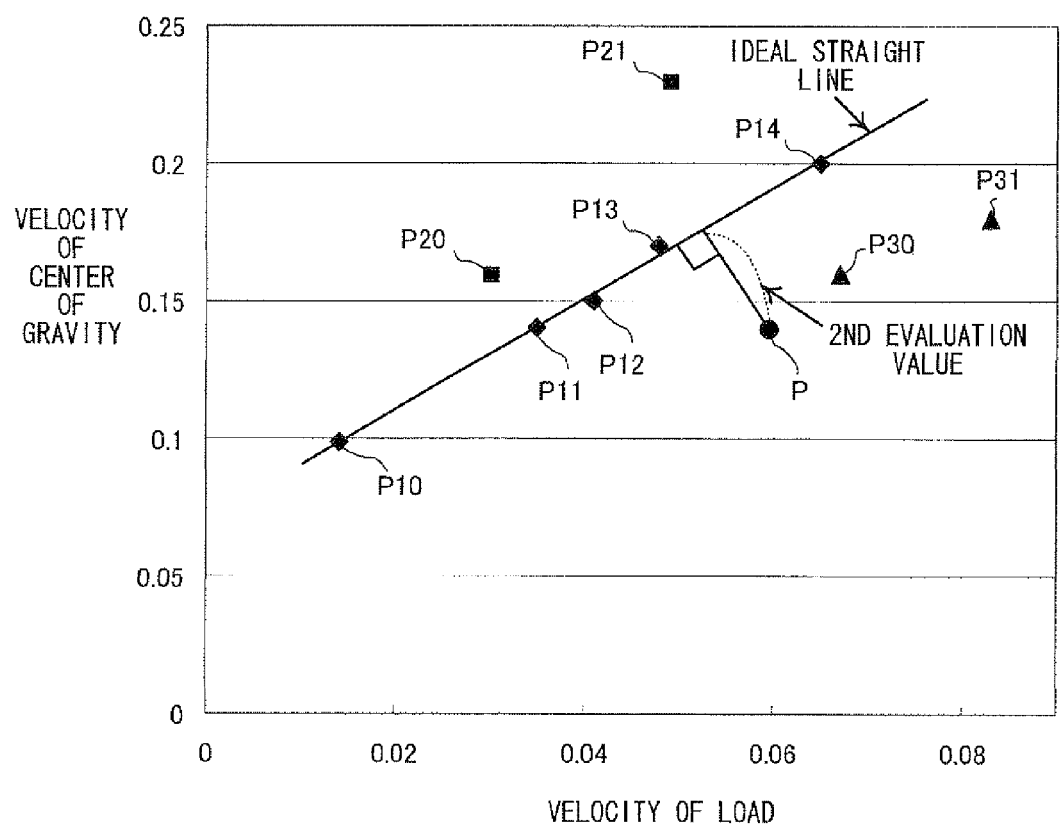
FIG. 18 is a diagram showing the relationship between the velocity of load and the velocity of the center of gravity in an ideal swing, and also showing a second evaluation value.

FIG. 18 is a diagram showing the relationship between the velocity of load and the velocity of the center of gravity in the ideal swing, and the diagram also shows the second evaluation value. In FIG. 18, the vertical axis represents the velocity of the center of gravity, and the horizontal axis represents the velocity of load. In FIG. 18, points (P10 through P14) are plotted on a straight line (an ideal straight line) so as to represent the velocity of load and the velocity of the center of gravity when a golfer capable of hitting the ball straight actually makes such a swing as to hit the ball straight. Further, in FIG. 18, points (P20 and P21) are also plotted so as to represent these velocities when a golfer capable of slicing the ball actually makes such a swing as to slice the ball. Furthermore, in FIG. 18, points (P30 and P31) are also plotted so as to represent these velocities when a golfer capable of hooking the ball actually makes such a swing as to hook the ball. As shown in FIG. 18, in the ideal swing (a swing that causes the ball to fly straight) the ratio of the amount of increase in the velocity of load to the amount of increase in the velocity of the center of gravity is constant. However, the points that represent the velocity of load and the velocity of the center of gravity in the swing of the sliced ball are plotted above the ideal straight line. On the other hand, the points that represent the velocity of load and the velocity of the center of gravity in the swing of the hooked ball are plotted below the ideal straight line.

The following table represents the coordinate values of the points P10 through P14 shown in FIG. 18.

TABLE 1

| Number | Velocity of load | Velocity of center of gravity |
|---|---|---|
| P10 | 0.014 | 0.099 |
| P11 | 0.035 | 0.14 |
| P12 | 0.041 | 0.15 |
| P13 | 0.048 | 0.17 |
| P14 | 0.065 | 0.2 |

Note that in table 1 the velocity of load represents the amount of change in the ratio of load value to weight (the value obtained by dividing the load value, detected by the load controller 36, by the player's weight) per one frame time (specifically, 1/60 seconds). Accordingly, for example, when the velocity of load is 0.014, the amount of increase in the ratio of load value to weight per second is 0.014×60=0.84 (i.e., the amount of increase in the load value per second is the player's weight×0.84 kg). Further, in table 1 the velocity of the center of gravity represents the amount of movement of the position of the center of gravity in the ST coordinate system per one frame time. That is, in table 1 the velocity of the center of gravity represents the distance between the point in the ST coordinate system at a particular time and the point in the ST coordinate system of one frame time thereafter.

As shown in FIG. 18 and table 1, in the ideal swing the inclination (the value obtained by dividing the amount of increase in the velocity of the center of gravity by the amount of increase in the velocity of load) of the ideal straight line is approximately 2. For example, the inclination of the straight line that connects the point P10 with the point P14 is approximately 1.98, and the inclination of the straight line that connects the point P10 with the point P13 is approximately 2.09. Further, the intercept (the intersection point of a coordinate axis that represents the velocity of the center of gravity and the ideal straight line) when the inclination of the ideal straight line is 2 is approximately 0.07. For example, the intercept of the straight line that passes through the point P10 and has an inclination of 2 is 0.071, and the intercept of the straight line that passes through the point P12 and has an inclination of 2 is 0.068. Accordingly, in the ideal swing (a swing that causes the ball to fly straight) the inclination of the ideal straight line is approximately 2, and the intercept is approximately 0.07. Note that the inclination of the ideal straight line may not necessarily be 2, and may also be in a predetermined range (e.g., a range from 1.7 to 2.3). Further, the intercept of the ideal straight line may not necessarily be 0.07, and may also be in a predetermined range (e.g., a range from approximately 0.058 to 0.083). For example, the inclination of the straight line that connects the point P11 with the point P12 is approximately 1.67, and the inclination of the straight line that connects the point P11 with the point P13 is approximately 2.31. If the intercepts of the straight lines that pass through the above points are calculated when the inclination is 1.7, for example, the intercept of the straight line that passes through the point P10 is approximately 0.075, and the intercept of the straight line that passes through the point P14 is approximately 0.09. Then the average of the intercepts of the straight lines that pass through the above points when the inclination is 1.7 is approximately 0.083. If the intercepts of the straight lines that pass through the above points are calculated when the inclination is 2.3, for example, the intercept of the straight line that passes through the point P10 is approximately 0.067, and the intercept of the straight line that passes through the point 214 is approximately 0.051. Then the average of the intercepts of the straight lines that pass through the above points when the inclination is 2.3 is approximately 0.058. Accordingly, it is preferable that the ideal straight line has an inclination in a range from approximately 1.7 to 2.3 and has an intercept in a range from approximately 0.058 to 0.083 (in this case, the greater the inclination of the straight line, the smaller the value of the intercept). As described above, based on actual measurement data obtained when an ideal swing is made, it is possible to calculate in advance various features (the inclination of the straight line, the value of the intercept, realistic ranges of the velocity of load and the velocity of the center of gravity, and the like) that represent an ideal swing.

In addition, in FIG. 18, a point P is plotted at a position distant from the ideal straight line. The point P is a point that represents a swing where the velocity of the center of gravity is smaller than the velocity of load (the velocity of load is greater than the velocity of the center of gravity). As shown in FIG. 18, the second evaluation value, which is used to calculate the amount of slice θz, is calculated as the distance between the point P and the ideal straight line. The greater the distance between the ideal straight line and the point P representing the swing of the player, the more the swing differs from the ideal swing. Consequently, the ball hooks or slices. Further, when the point that represents the swing of the player is located above the ideal straight line, the velocity of load is relatively small compared to the velocity of the center of gravity. Consequently, the player swings late and the hit ball slices. On the other hand, the point that represents the swing of the player is located below the ideal straight line, the velocity of load is relatively great compared to the velocity of the center of gravity. Consequently, the hit ball hooks.

As described above, the second evaluation value is calculated by calculating the velocity of the center of gravity and the velocity of load and obtaining a distance from the ideal straight line. The second evaluation value is determined as the distance between the ideal straight line and the point P, whereby it is possible to evaluate the velocity of load and the velocity of the center of gravity in a balanced manner. Note that the second evaluation value may also be determined by the gap between the ideal straight line and the point P in the vertical axis direction or the horizontal axis direction (the distance between: the intersection point of the ideal straight line and the straight line that passes through the point P and that is parallel to the vertical axis or the horizontal axis; and the point P), as well as the distance between the ideal straight line and the point P. Note that, as described below, the second evaluation value is corrected in accordance with the value of the first evaluation value.

Figure 19:
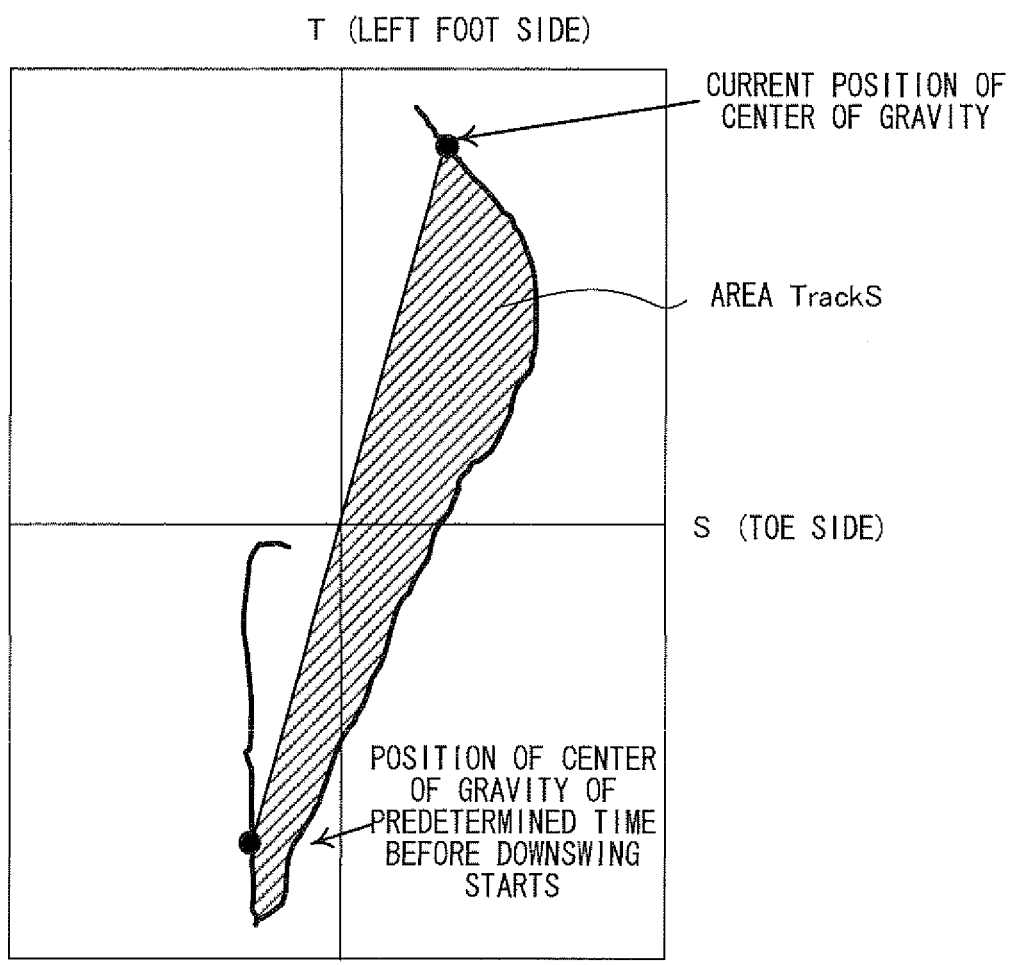
FIG. 19 is a diagram showing the path of the position of the center of gravity, and also showing a third evaluation value.

Next, the third evaluation value is described. The third evaluation value is a value determined by the path of the position of the center of gravity, and the value represents how the player swings (the path of the swing). Specifically, the third evaluation value is the value of the area surrounded by a curve that represents the path of the position of the center of gravity and a predetermined straight line. FIG. 19 is a diagram showing the path of the position of the center of gravity, and the diagram also shows the third evaluation value. FIG. 19, similarly to FIG. 16, shows the path of the position of the center of gravity, from immediately after the player has started the backswing. As shown in FIG. 19, the third evaluation value is an area TrackS, which is surrounded by: the straight line that connects the position of the center of gravity of a predetermined time before the start of the downswing with the current position of the center of gravity; and the path of the position of the center of gravity. When the area TrackS is great, the ball tends to slice. The reason is explained below.

In actual golf, when a player makes a swing with elbows bent away from the body, the hit ball slices. Specifically, in this case, the path of the swing of the player is a so-called outside-in path, and the hit ball slices. When the player makes a swing with elbows bent away from the body, the golf club passes through positions distant from the body, and therefore weight is applied in the direction of the toes. Accordingly, the path of the position of the center of gravity has a more bulging shape (a shape bulging in the S-axis positive direction), and therefore the area TrackS increases. On the other hand, in actual golf, when a player makes a swing with elbows tucked into the body, the hit ball hooks. Specifically, in this case, the path of the swing of the player is a so-called inside-out path, and the hit ball hooks. When the player makes a swing with elbows tucked into the body, the golf club passes through positions close to the body, and therefore weight is applied in the direction of the heels. Accordingly, the path of the position of the center of gravity has a shape bulging in the S-axis negative direction, and therefore the area TrackS decreases. Note that the above area is calculated on the assumption that in FIG. 19, the right side of the straight line has a positive value and the left side has a negative value. Accordingly, when the path of the position of the center of gravity has a shape bulging in the S-axis negative direction, the area TrackS may have a negative value. As described above, based on the area TrackS surrounded by the path of the position of the center of gravity and a predetermined straight line, it is possible to determine whether the hit ball is to slice or hook.

Based on the first through third evaluation values that are calculated as described above, the amount of slice θz of the ball is calculated. Specifically, the amount of slice θz of the ball is calculated using the following equation 4:

$$\text{amount of slice } \theta z = \text{first evaluation value} + \text{second evaluation value} + K3 \times \text{third evaluation value} \quad (4)$$

Here, K3 is a constant. Although described in detail below, in equation 4 the second evaluation value may be corrected in accordance with the value of the first evaluation value. Accordingly, the amount of slice θz may be calculated using the corrected second evaluation value.

Next, a description is given of the calculation methods of the other parameters (the magnitude of the initial velocity, the launch angle θx, and the rightward launch angle θy) related to the carry and the trajectory of the ball. The magnitude of the initial velocity of the ball is calculated based on the type (number) of the golf club and the swing power (club head speed). The swing power is calculated based on the magnitude of the acceleration detected by the controller 22, the magnitude of the velocity of load, and the magnitude of the velocity of the center of gravity. The relationship between the magnitude of the initial velocity of the ball and the swing power is defined in advance by a table. The table is prepared in advance in accordance with the numbers of the golf clubs. Accordingly, when the swing power is calculated, the magnitude of the initial velocity is calculated with reference to the table.

The launch angle θx of the ball is calculated based on the type (number) of the golf club used by the player object 120 and the swing power (club head speed). The relationship between the launch angle θx of the ball and the swing power is defined in advance by a table. The table is prepared in advance in accordance with the numbers of the golf clubs.

Figure 20:
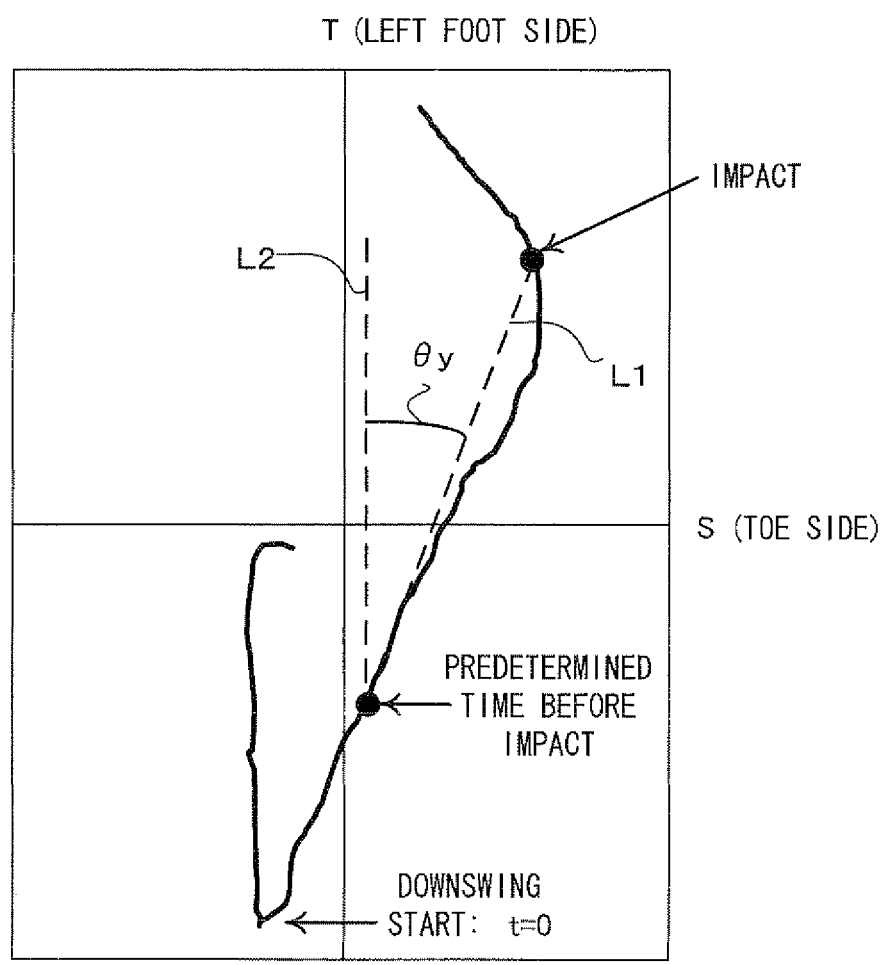
FIG. 20 is a diagram showing the calculation method of the rightward launch angle $\theta y$.

The rightward launch angle θy of the ball is calculated based on the path of the position of the center of gravity. FIG. 20 is a diagram showing the calculation method of the rightward launch angle θy. In FIG. 20, the path of the position of the center of gravity, from immediately after the player has started a swing, is shown. Specifically, the rightward launch angle θy is the angle formed by: a straight line L1 that connects the position of the center of gravity of a predetermined time before the impact with the position of the center of gravity at the moment of impact; and the direction of the hit ball. That is, the rightward launch angle θy is the angle formed by the straight line L1 and a straight line L2 that passes through the position of the center of gravity of the predetermined time before the impact and that is parallel to the T-axis.

(Details of Game Process)

Figure 21:
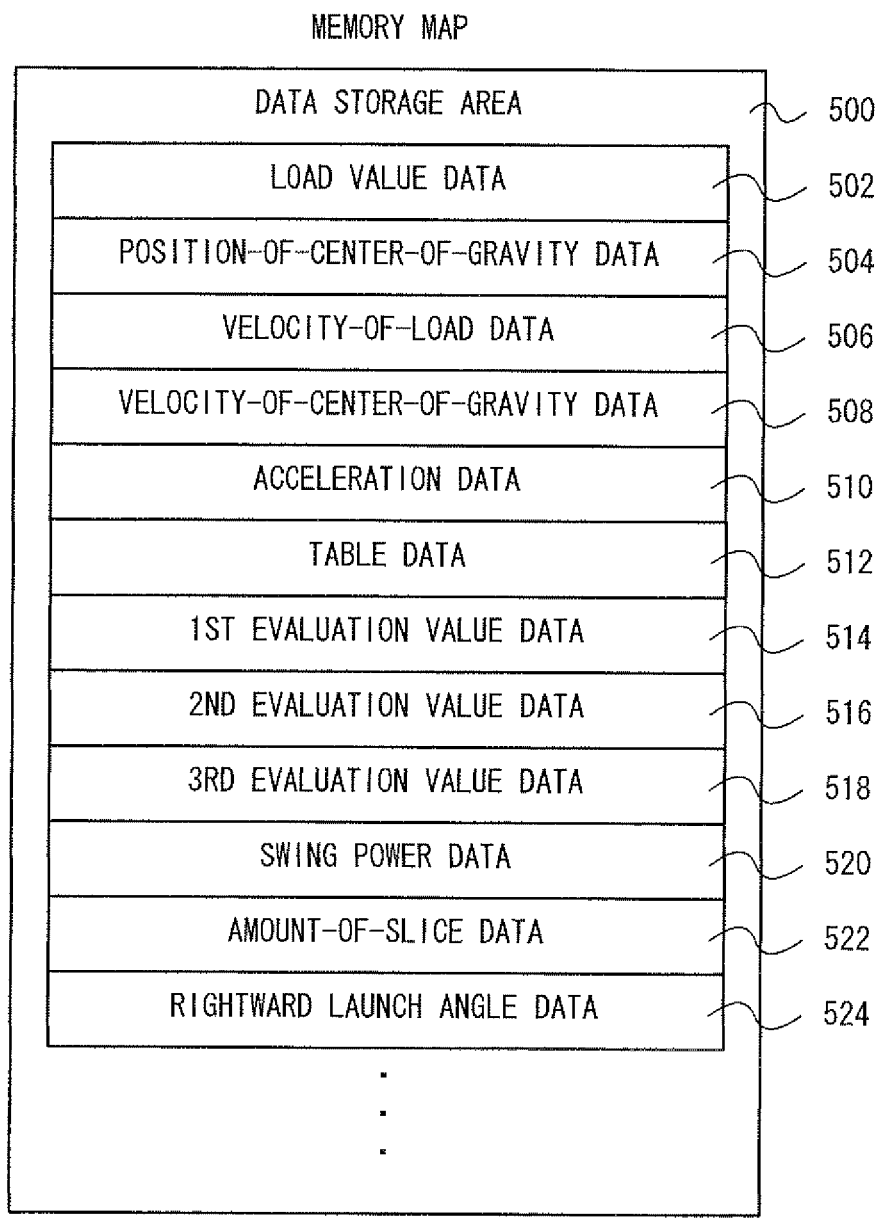
FIG. 21 is a diagram showing main data stored in a main memory (an external main memory 46 or an internal main memory 42e) of the game apparatus 12.

Next, details of the game process executed by the game apparatus 12 are described with reference to FIGS. 21 through 23. First, with reference to FIG. 21, a description is given of main data used in the process executed by the game apparatus 12. FIG. 21 is a diagram showing the main data stored in a main memory (the external main memory 46 or the internal main memory 42e) of the game apparatus 12.

As shown in FIG. 21, a data storage area 500 of the main memory of the game apparatus 12 stores therein load value data 502, position-of-center-of-gravity data 504, velocity-of-load data 506, velocity-of-center-of-gravity data 508, acceleration data 510, table data 512, first evaluation value data 514, second evaluation value data 516, third evaluation value data 518, swing power data 520, amount-of-slice data 522, and rightward launch angle data 524. Note that the main memory stores therein, as well as the data shown in FIG. 21, data necessary for the game process, such as image data of various objects (the player object 120 and the ball 122) that appear in the game and data representing various parameters of the objects. The program area of the main memory stores therein a game program that executes the game process. Further, the controller 22 and the load controller 36 transmit operation data (input data representing input to the input means 26, data representing the acceleration detected by the acceleration sensor 74, and data representing the loads detected by the load sensors 364) to the game apparatus 12, for example, every 1/200 seconds. Then the game apparatus 12 (the CPU 40) temporarily stores the operation data in a buffer area provided in the main memory.

The load value data 502 is a set of data representing the load value detected by the load controller 36. That is, the load value data 502 is a set of data representing the total value of the loads detected by the load sensors 364a through 364d of the load controller 36. Specifically, the load value data 502 is an array, and the data representing the total load value is stored in each component of the array in chronological order.

The position-of-center-of-gravity data 504 is a set of data representing the position of the center of gravity that is calculated from the load values of the load sensors 364a through 364d by equation 1 and equation 2. Specifically, the position-of-center-of-gravity data 504 is an array, and the data representing the position of the center of gravity is stored in each component of the array in chronological order.

The velocity-of-load data 506 is data representing the velocity of load. The velocity of load is calculated based on the load value data 502. The velocity-of-center-of-gravity data 508 is a set of data representing the velocity of the center of gravity. Specifically, the velocity-of-center-of-gravity data 508 is an array, and the data representing the velocity of the center of gravity is stored in each component of the array in chronological order. The velocity of the center of gravity is calculated based on the position-of-center-of-gravity data 504.

The acceleration data 510 is a set of data representing the magnitude of the acceleration detected by the acceleration sensor 74 of the controller 22. Specifically, the acceleration data 510 is an array, and the data representing the magnitude of the acceleration is stored in each component of the array in chronological order.

The table data 512 is a set of data representing a table that indicates the relationships between the swing power (club head speed), the magnitude of the initial velocity, and the launch angle θx. The table data 512 is data prepared in advance with respect to each number of the golf clubs, and is stored in advance in the optical disk 18. For example, in the table for the driver the magnitude of the initial velocity and the launch angle θx that correspond to the swing power (club head speed) are stored for the driver.

The first evaluation value data 514 is data representing the first evaluation value. The second evaluation value data 516 is data representing the second evaluation value. The third evaluation value data 518 is data representing the third evaluation value.

The swing power data 520 is data representing the swing power. As described above, the swing power is a value calculated based on the magnitude of the acceleration of the controller 22, the magnitude of the velocity of load, and the magnitude of the velocity of the center of gravity. The swing power indicates a value in a range from 0 to 1.0, for example.

The amount-of-slice data 522 is data representing the amount of slice θz. The rightward launch angle data 524 is data representing the rightward launch angle θy.

Figure 22:
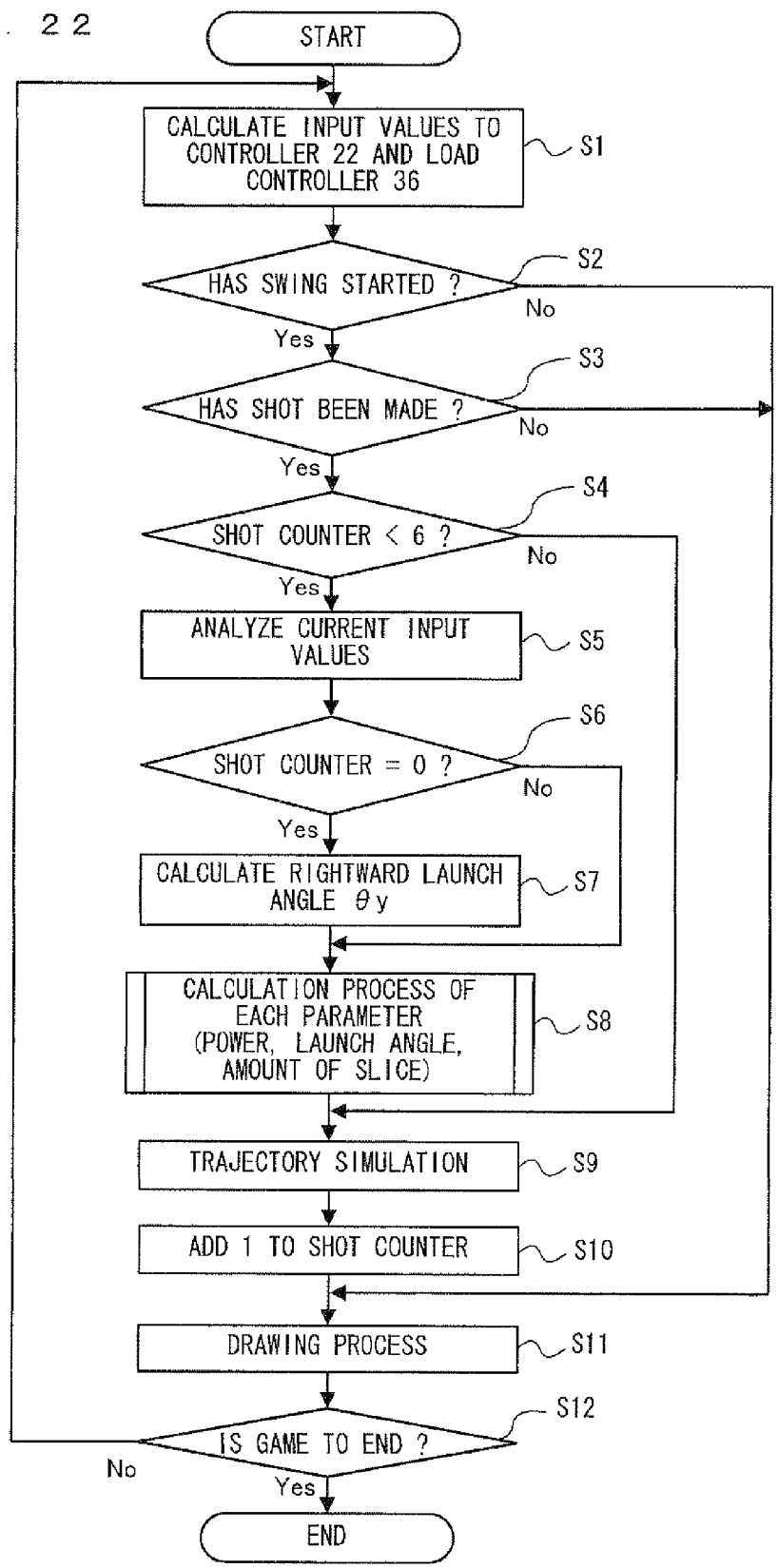
FIG. 22 is a main flow chart showing the flow of the game process executed by the game apparatus 12.
Figure 23:
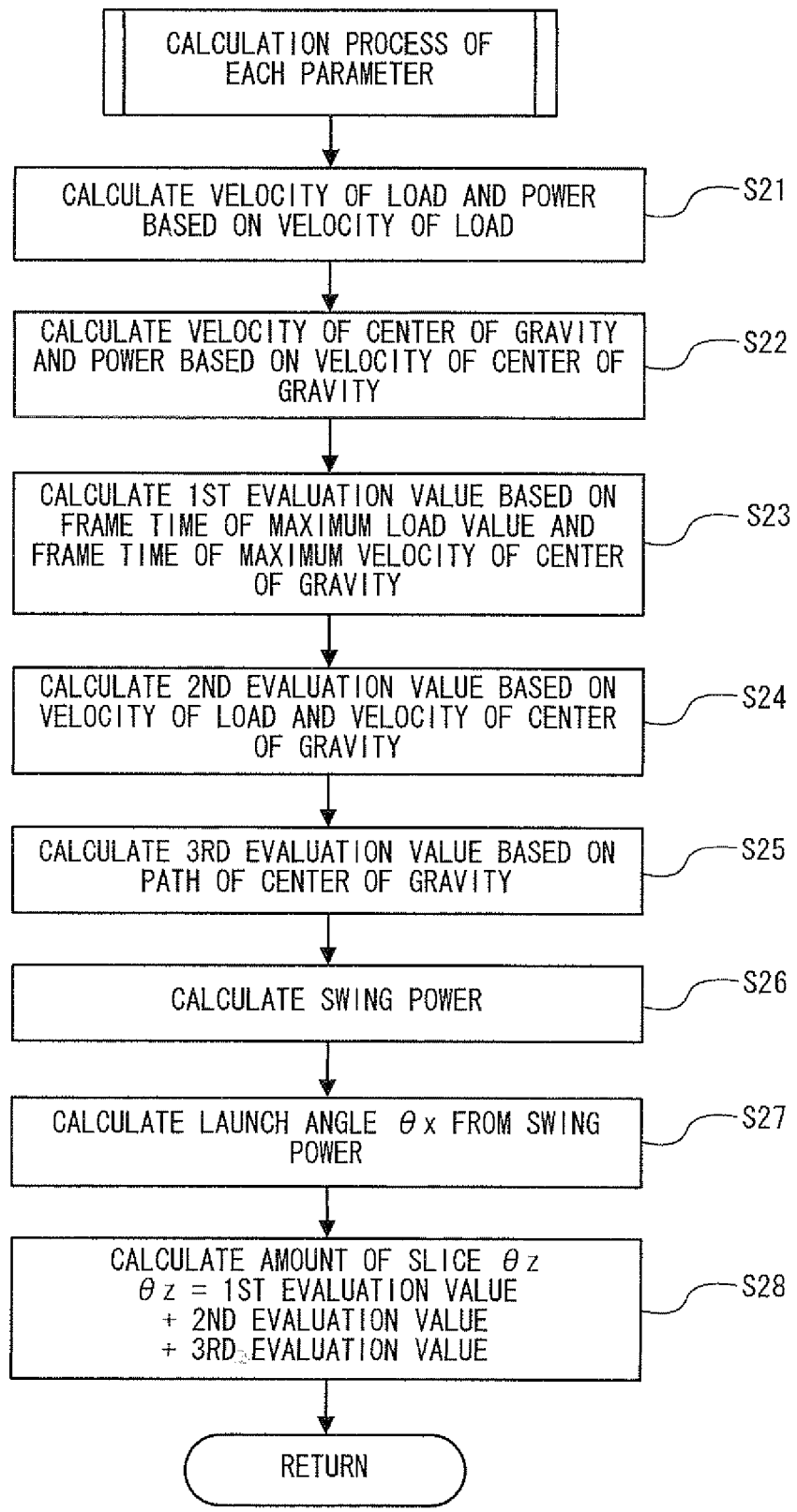
FIG. 23 is a flow chart showing the calculation process (S8) of each parameter.

Next, with reference to FIG. 22, a description is given of the game process executed by the game apparatus 12. FIG. 22 is a main flow chart showing the flow of the game process executed by the game apparatus 12. When the power to the game apparatus 12 is turned on, the CPU 40 of the game apparatus 12 executes the startup program stored in the ROM/RTC 48, and thus each unit such as the external main memory 46 is initialized. The game program stored in the optical disk 18 is read by the main memory, and the execution of the game program is started by the CPU 40. The CPU 40 performs initialization. In the initialization the CPU 40 arranges the player object 120 and the ball 122 in the game space, sets the types (numbers) of the golf clubs belonging to the player object 120, and the like. The flow chart shown in FIG. 22 is a flow chart showing the game process executed after the process described above is completed. Note that in FIG. 22, the game process that is not directly related to the present invention is not described. The loop of the process of steps S1 through S11 shown in FIG. 22 is performed in each frame (e.g., 1/60 seconds; referred to as a "frame time").

In step S1 the CPU 40 calculates the input values from the player to the controller 22 and the load controller 36. Specifically, with reference to the buffer area of the main memory, the CPU 40 acquires data representing the most recent acceleration (vector) transmitted from the controller 22 and data representing the operation performed on the input means 26. The CPU 40 calculates the magnitude of the most recent acceleration that has been acquired, and stores the calculated magnitude as the acceleration data 510 in the main memory. Similarly, with reference to the buffer area of the main memory, the CPU 40 acquires data representing the load value of each load sensor 364, the data having been transmitted from the load controller 36. The CPU 40 calculates the total of the acquired load values of the load sensors 364, and stores the total load value as the load value data 502 in the main memory. The CPU 40 also calculates the position of the center of gravity by substituting the acquired load values of the load sensors 364 into equation 1 and equation 2, and stores the calculated position as the position-of-center-of-gravity data 504 in the main memory. With reference to the position-of-center-of-gravity data 504, the CPU 40 also calculates the distance between the calculated position of the center of gravity and the position of the center of gravity of one frame time before. The CPU 40 calculates the current velocity of the center of gravity by dividing the calculated distance by one frame time, and stores the calculated current velocity as the velocity-of-center-of-gravity data 508 in the main memory. The CPU 40 proceeds to perform the process of step S2.

In step S2 the CPU 40 determines whether or not the player has started a swing. This process is a process of determining whether the current state is the state where a swing has already been started or the state immediately after a swing has been started. The state where a swing has been started refers to the state from when the player starts the downswing to when the player finishes the swing (the state from FIG. 13B to the finish of the swing). The state immediately after a swing has been started refers to the state immediately after the downswing has been started (the state at the moment of FIG. 13B). In step S2, two determinations are made. Specifically, the CPU 40 determines whether or not a swing is currently being made first determination). When a swing is not being made, the CPU 40 determines whether or not a swing has been started (a second determination). In step S2, when the first determination is positive, the second determination is not made, and the determination of step S2 is positive. When the first determination is negative, the CPU 40 makes the second determination, and when the second determination is positive, the determination of step S2 is positive. When the first determination is negative and the second determination is also negative, the determination of step S2 is negative.

More specifically, with reference to the main memory, the CPU 40 determines whether or not the current state is the state where a swing is being made. For example, when a swing state flag (which indicates the state where a swing has been started) stored in the main memory indicates 1, the CPU 40 determines that the current state is the state where a swing is being made (the first determination is positive). When the first determination is positive, the CPU 40 proceeds to perform the process of step S3. On the other hand, when the swing state flag indicates 0 (when the first determination is negative), the CPU 40 makes the second determination. The second determination is the determination of whether or not the player has started a swing. Specifically, in the second determination the CPU 40 determines whether or not the magnitude of the most recent acceleration acquired in step S1 is greater than a predetermined threshold. When the magnitude is greater than the predetermined threshold, the CPU 40 determines that the player has started a swing. When the magnitude of the most recent acceleration acquired in step S1 is equal to or smaller than the predetermined threshold, the CPU 40 determines that the player has not started a swing. When the second determination is positive, the CPU 40 sets the swing state flag to 1, also sets a swing start elapsed time to 0, the time representing the elapsed time since the swing has been started, and stores these values in the main memory. The CPU 40 proceeds to perform the process of step S3. On the other hand, when the second determination is negative, the determination of step S2 is negative, and the CPU proceeds to perform the process of step S11.

That is, in step S2, in one stroke (the motion of the player object 120 hitting the ball 122 once is defined as one stroke), when the player has swung the controller 22 at a predetermined velocity (force), it is determined that a swing has been started. When it is determined that a swing has been started, the determination of step S2 is always positive also in the processes (the process of S1 through S12) of the subsequent loops until the stroke finishes and switches to the next stroke. On the other hand, when the player has not swung the controller 22 at the predetermined velocity (force), it is determined that a swing has not been started in this stroke, and it is determined also in the processes of the subsequent loops whether or not a swing has been started.

In step S3 the CPU 40 determines whether or not the player object 120 has hit the ball 122 to make a shot. The determination of whether or not a shot has been made is based on whether or not a predetermined time has elapsed since the swing has been started. Specifically, with reference to the swing start elapsed time stored in the main memory, the CPU 40 determines whether or not a predetermined time (frame times required from the start of the downswing to the impact) has elapsed since the swing has been started. When the predetermined time has elapsed since the swing has been started, the CPU 40 determines that the player object 120 has hit the ball 122 to make a shot. When the predetermined time has not elapsed since the swing has been started, the CPU 40 adds 1 to the swing start elapsed time, and stores the result in the main memory. When the determination is positive, the CPU 40 proceeds to perform the process of step S4. When the determination is negative, the CPU 40 proceeds to perform the process of step S11.

Note that in step S3 the predetermined time is determined in accordance with the magnitude of the acceleration obtained when the second determination of step S2 (the determination of whether or not a swing has been started) is positive. Specifically, the more strongly the player swings the controller 22 at the start of the swing, the greater the magnitude of the acceleration at that time. Accordingly, the predetermined time is set be smaller. That is, the more strongly the player swings the controller 22, the shorter the time, from when the swing is started to when the ball 122 is hit to make a shot, is set to be. In accordance with the length of time from when the swing is started to when the ball 122 is hit to make a shot, the motion of the player object 120 (the animation of the player object 120) to be displayed on the screen image is determined. That is, the shorter this length of time, the faster the swinging motion of the player object 120 to be displayed on the screen image.

In step S4 the CPU 40 determines whether or not a shot counter is less than 6. Here, the shot counter refers to the elapsed time (frame times) since the player object 120 has hit (impacted) the ball 122 to make a shot. The shot counter is reset to 0 when the player object 120 has hit the ball 122 to make a shot, and is stored in the main memory. When the determination is positive, the CPU 40 proceeds to perform the process of step S5. On the other hand, when the determination is negative, the CPU 40 proceeds to perform the process of step S9. That is, the process of steps S5 through S8 described below is performed from the moment of impact to 6 frame time.

In step S5 the CPU 40 analyzes the input values of the current time. Here, the CPU 40 calculates the power based on the acceleration detected by the controller 22, the maximum value of the load value detected by the load controller 36, the velocity of the center of gravity, and the maximum value of the velocity of the center of gravity. Specifically, with reference to the acceleration data 510 of the main memory, the CPU 40 calculates the power based on the acceleration of the controller 22 by integrating the magnitudes (the absolute values) of the accelerations detected from the start of the swing (downswing) to a predetermined frame time (e.g., 25 frame time). More specifically, the CPU 40 calculates the power based on the acceleration by subtracting a predetermined threshold (e.g., 2.5) from the magnitude of the acceleration detected at each time from the start of the swing to the predetermined frame time and adding all the subtraction results. This makes it possible to reflect on the swing power the force applied to the controller 22 since the player has started the swing.

With reference to the load value data 502 of the main memory, the CPU 40 also calculates the maximum load value from the start of the swing to the current time and the frame time of the maximum load value. Specifically, with reference to the load value data 502, the CPU 40 searches each load value included in the load value data 502, to thereby acquire the maximum load value and the frame time (the index of the array) of the maximum load value. The CPU 40 also searches each velocity of the center of gravity included in the velocity-of-center-of-gravity data 508, to thereby acquire the maximum velocity of the center of gravity from the start of the swing to the current time and the frame time of the maximum velocity. The CPU 40 stores each value (the power based on the acceleration, the maximum load value and the frame time of the maximum load value, and the maximum velocity of the center of gravity and the frame time of the maximum velocity) in the main memory.

In step S6 the CPU 40 determines whether or not the shot counter is 0. This process is a process of determining whether or not the current time is the moment of impact. Specifically, with reference to the main memory, the CPU 40 determines whether or not the shot counter equals 0. When the determination is positive, the CPU 40 proceeds to perform the process of step S7. On the other hand, when the determination is negative, the CPU proceeds to perform the process of step S8.

In step S7 the CPU 40 calculates the rightward launch angle θy. Specifically, with reference to the position-of-center-of-gravity data 504, the CPU 40 calculates the straight line (L1 of FIG. 20) that is directed from the position of the center of gravity of predetermined frame times (e.g., 30 frame times) before the current time (the time of the impact) to the position of the center of gravity of the current time. The CPU 40 also calculates the straight line (L2) that passes through the position of the center of gravity of the predetermined frame times before the current time and that is parallel to the T-axis. Then the CPU 40 calculates the angle (θy) formed by the two calculated straight lines, and stores the calculated angle as the rightward launch angle data 524 in the main memory. Note that the rightward launch angle θy is not present in a predetermined range (e.g., a range from to −4.0 to 4.0), the CPU 40 sets the calculated rightward launch angle θy to the upper limit value (4.0) or the lower limit value (−4.0) of the predetermined range. This makes it possible that the CPU 40 eliminates an unrealistic rightward launch angle θy. The CPU 40 proceeds to process the process of step S8.

In step S8 the CPU 40 performs the calculation process of each parameter. In step S8 the CPU 40 calculates the swing power, the launch angle θx, and the amount of slice θz. Details of the process of step S8 are described with reference to FIG. 23. FIG. 23 is a flow chart showing the calculation process of each parameter (S8).

In step S21 the CPU 40 calculates the velocity of load and the power based on the velocity of load. The power based on the velocity of load refers to a value calculated from the velocity of load, and is one of the elements of the swing power described below. Specifically, with reference to the main memory, the CPU 40 acquires the load value of predetermined frame times (e.g., 5 frame times) before the frame time of the maximum load acquired in step S5. Then the CPU 40 calculates the velocity of load by subtracting the load value, of the predetermined frame times before, from the maximum load value acquired in step S5 and dividing the subtraction result by the predetermined frame times. Then the CPU 40 stores the calculated velocity of load as the velocity-of-load data 506 in the main memory. The CPU 40 also calculates, as the power based on the velocity of load, the value obtained by multiplying the calculated velocity of load by a predetermined coefficient, and stores the calculated value in the main memory. The CPU 40 proceeds to perform the process of step S22.

In step S22 the CPU 40 calculates the velocity of the center of gravity and the power based on the velocity of the center of gravity. The power based on the velocity of the center of gravity refers to a value calculated from the velocity of the center of gravity, and is one of the elements of the swing power described below. Specifically, with reference to the velocity-of-center-of-gravity data 508 of the main memory, the CPU 40 acquires the velocity of the center of gravity of the current time. The CPU 40 also calculates, as the power based on the velocity of the center of gravity, the value obtained by multiplying the acquired velocity of the center of gravity by a predetermined coefficient, and stores the calculated value in the main memory. The CPU 40 proceeds to perform the process of step S23.

In step S23 the CPU 40 calculates the first evaluation value. As described above, the first evaluation value is a value calculated based on the time when the load value becomes the maximum and the time when the velocity of the center of gravity becomes the maximum, and is calculated using equation 3. Specifically, the CPU 40 calculates, as the first evaluation value, the value obtained by subtracting the frame time of the maximum velocity of the center of gravity acquired in step S5 and a predetermined value (e.g., 2) from the frame time of the maximum load acquired in step S5. The CPU 40 stores the calculated first evaluation value as the first evaluation value data 514 in the main memory. The CPU 40 proceeds to perform the process of step S24.

In step S24 the CPU 40 calculates the second evaluation value. Specifically, in a coordinate system where the velocity of load is a first axis and the velocity of the center of gravity is a second axis, the CPU 40 calculates the distance from the ideal straight line (the ideal straight line shown in FIG. 18) stored in advance in the main memory to the point where the velocity of load calculated in step S21 and the velocity of the center of gravity calculated in step S22 are the coordinate values of the respective axes. When the point is located above the ideal straight line (in the case of a slice), the CPU 40 stores the calculated distance as the second evaluation value data 516 in the main memory. When the point is located below the ideal straight line (in the case of a hook), the CPU 40 multiplies the calculated distance by −1, and stores the obtained value as the second evaluation value data 516 in the main memory. The CPU 40 proceeds to perform the process of step S25.

In step S25 the CPU 40 calculates the third evaluation value (the area TrackS surrounded by a curve that represents the path of the position of the center of gravity and a predetermined straight line). Specifically, with reference to the position-of-center-of-gravity data 504, the CPU 40 calculates the straight line that connects the position of the center of gravity of predetermined frame times (i.e., 30 frame times) before the start of the downswing with the position of the center of gravity of the current time. Then the CPU 40 calculates the area TrackS surrounded by the calculated straight line and the path of the position of the center of gravity included in the position-of-center-of-gravity data 504. The CPU 40 stores the calculated area TrackS as the third evaluation value data 518 in the main memory. As shown in FIG. 19, the area TrackS is calculated such that the area of the right side (in the S-axis positive direction) of the straight line has a positive value and the area of the left side (in the S-axis negative direction) of the straight line has a negative value. Accordingly, in the case of the path of the position of the center of gravity as shown in FIG. 19, the area TrackS has a positive value, and when the path of the position of the center of gravity has a shape bulging to the left (in the S-axis negative direction), the area TrackS has a negative value. The CPU 40 proceeds to perform the process of step S26.

In step S26 the CPU 40 calculates the swing power. The CPU 40 calculates the swing power based on the acceleration detected by the controller 22, the velocity of load, and the velocity of the center of gravity. Specifically, the CPU 40 calculates the sum of the power based on the acceleration of the controller 22, which is calculated in step S5, the power based on the velocity of load, which is calculated in step S21, and the power based on the velocity of the center of gravity, which is calculated in step 222, and stores the calculated sum as the swing power data 520 in the main memory. The CPU 40 proceeds to perform the process of step S27.

In step S27 the CPU 40 calculates the launch angle θx. Specifically, with reference to the table data 512 of the main memory, the CPU 40 calculates the launch angle θx based on the swing power calculated in step S26. As described above, in the table data 512 the relationship between the swing power and the launch angle θx is stored as a table, and therefore, with reference to the table, the CPU 40 can calculate the launch angle θx from the swing power calculated in step S26. The CPU 40 proceeds to perform the process of step S28.

In step S28 the CPU 40 calculates the amount of slice θz. Specifically, the CPU 40 calculates the amount of slice θz by substituting the first evaluation value calculated in step S23, the second evaluation value calculated in step S24, and the third evaluation value calculated in step S25, into equation 4. The CPU 40 stores the calculated amount of slice θz as the amount-of-slice data 522 in the main memory.

Note that in step S28 the CPU 40 corrects the value of the second evaluation value in accordance with the value of the first evaluation value. For example, the CPU 40 corrects the second evaluation value using the following equation 5:

corrected second evaluation value=(1−first evaluation value/5)×second evaluation value yet to be corrected  (5)

The second evaluation value yet to be corrected refers to the second evaluation value calculated in step S24. As shown in equation 5, for example, when the first evaluation value is 0, the corrected second evaluation value equals the second evaluation value yet to be corrected. However, for example, when the first evaluation value is 1, the corrected second evaluation value is 0.8 times as much as the second evaluation value yet to be corrected. This is a process of reducing the effect of the second evaluation value on the amount of slice θz when the absolute value of the first evaluation value is great, i.e., when there is a large gap between the time of the impact and the ideal time. For example, when the first evaluation value is a high positive value, the time when the load value becomes the maximum lags behind the time when the velocity of the center of gravity becomes the maximum. Accordingly, the swing of the player is lagging significantly behind the ideal swing. When the player is thus swinging significantly late, it is considered that the hit ball is to slice, regardless of the value of the second evaluation value. That is, when the timing of the impact has a large gap, it is unlikely that the ball flies straight. Accordingly, the second evaluation value is corrected in accordance with the value of the first evaluation value. This makes it possible to take into account the second evaluation value (i.e., the gap from the relationship between the velocity of the swing and the velocity of rotation of the hips in the ideal swing), when the timing of the impact is correct (when the first evaluation value is close to 0). On the other hand, it is possible to determine the swing without taking the second evaluation value into account, when the timing of the impact is not correct (when the absolute value of the first evaluation value is great). Then the CPU 40 ends the calculation process of each parameter.

Referring back to FIG. 22, in step S9 the CPU 40 performs the process of a trajectory simulation. Specifically, the CPU adds the initial velocity (the magnitude and direction of the initial velocity) and the rotation (the amount of slice and the amount of backspin) to the ball 122, using the parameters calculated in step S8. The CPU 40 calculates the position of the ball 122 in the game space by solving an equation of motion for the trajectory of the ball 122, using the Runge-Kutta method, for example. Note that the amount of backspin (the amount of rotation of the ball 122) is determined in accordance with the swing power and the type (number) of the golf club. The CPU 40 proceeds to perform the process of step S10.

In step S10 the CPU 40 adds 1 to the shot counter. Specifically, the CPU 40 adds 1 to the shot counter of the main memory, and stores the result in the main memory again. The CPU proceeds to perform the process of step S11.

In step S11 the CPU 40 performs a drawing process. Specifically, in accordance with the swing start elapsed time, the CPU 40 displays the player object 120 making the swing, places the ball 122 at the position of the ball 122 in the game space, which is calculated in step S9, displays the placed ball 122 on the screen image, and the like. The CPU 40 also displays the image of the background and the like on the screen image. Consequently, the screen image displays the ball 122 flying away in the game space and the player object 120 making the swing (e.g., the image of the player object 120 shown in FIGS. 13B and 13C). The CPU proceeds to perform the process of step S12.

In step S12 the CPU 40 determines whether or not the game is to end. When the determination is positive, the CPU 40 ends the game process, and when the determination is negative, the CPU 40 repeats the game process, returning to step S1. For example, when the player has pressed a button of the controller 22 or the like that indicates the end of the game process, the CPU 40 ends the game process. Thus the game process according to the present embodiment ends.

In the above flow the process of steps S5 through S8 is repeated from the moment of impact to 6 frame time, so as to calculate each parameter. With each parameter thus calculated not only at the moment of impact but also from the impact to a predetermined frame time, it is possible to reflect the swing of the player on the game process more accurately. That is, when the maximum load is detected, the maximum load can be recognized by detecting that the current load value has fallen below the load value of the most recent frame time, and therefore it is impossible to determine at the current time whether or not the load value is the maximum load value. Since the velocity of the swing of the player depends on the maximum load value, it is necessary to accurately obtain the maximum load value so as to accurately obtain the velocity of the swing of the player. Accordingly, with each parameter calculated not only at the moment of impact but also for a predetermined time period after the impact, it is possible to reflect the swing of the player on the trajectory of the ball more accurately. Note that in another embodiment each parameter may be calculated only at the moment of impact, and the subsequent trajectory simulation may be performed using the calculated parameters.

In the above flow the rightward launch angle θy is calculated only at the moment of impact in step S7. This is because the trajectory of the ball is virtually determined by the rightward launch angle θy in a few frame times immediately after the impact. Accordingly, the ball moves in a shaking manner if the rightward launch angle θy changes in a few frame times immediately after the impact, and this creates incongruity. Therefore the rightward launch angle θy is calculated only at the moment of impact so as to prevent such trajectory of the ball. In another embodiment the rightward launch angle θy may be calculated in a few frame times immediately after the impact. In this case, it is preferable that the rightward launch angle θy calculated in each frame time is complemented so that the trajectory of the ball is congruous.

As described above, in the present embodiment the first evaluation value, which represents the gap from the time of the impact in the ideal swing, is calculated based on the time when the load value becomes the maximum and the time when the velocity of the center of gravity becomes the maximum. Further, the second evaluation value, which represents the gap from the relationship between the velocity of load and the velocity of the center of gravity in the ideal swing, is calculated based on the velocity of load, which represents the degree of the applied load in a predetermined time period, and the velocity of the center of gravity, which represents the velocity of movement of the position of the center of gravity. Furthermore, in the present embodiment the third evaluation value, which represents the area surrounded by the path of the position of the center of gravity, is calculated. Based on the calculated first through third evaluation values, it is possible to calculate the amount of slice θz of the ball 122. This makes it possible to determine whether or not the shot ball 122 is to slice, or whether or not the ball 122 is to hook.

Note that in the present embodiment the amount of slice θz is calculated using the first through third evaluation values; however, in another embodiment the amount of slice may be calculated using any of these evaluation values. For example, the determination of whether or not the ball 122 is to slice, or the determination of whether or not the ball 122 is to hook, may be made based only on the first evaluation value or the second evaluation value. Alternatively, the determination of whether or not the ball 122 is to slice, or the like, may be made based only on the third evaluation value.

In the present embodiment a golf practice game is described; however, the present embodiment may be applied to a golf game where the player enjoys a virtual golf course. In another embodiment the present invention may be applied to other games such as tennis, baseball, and ping-pong.

In the present embodiment the motion of the player is determined based on the time when the load value becomes the maximum and the time when the velocity of the center of gravity becomes the maximum (the determination of whether or not the ball is to slice is made in accordance with the swing of the player). In another embodiment the motion of the player may be determined based on the time when the load value satisfies a predetermined condition and the time when the velocity of the center of gravity satisfies a predetermined condition. For example, in a tennis serve the player swings up a racket, swings it down, and hits the tennis ball. It is considered that when swinging up the racket, the player shifts their weight backward, and when swinging down the racket, the player shifts their weight forward. Accordingly, the velocity of the center of gravity changes during the swing, and satisfies a predetermined condition (for example, the velocity of the center of gravity becomes the maximum or the local maximum, becomes a predetermined value that is smaller than the maximum, or becomes the local minimum) at the time when the player hits the tennis ball. On the other hand, it is considered that when the player swings up the racket and swings it down, the load value detected by the load controller 36 falls below the player's weight. That is, the load value does not become the maximum, but satisfies a predetermined condition (for example, the load value becomes the minimum value, or becomes a predetermined value that is smaller than the maximum value) at the time when the player hits the tennis ball. In a tennis serve the ball may be caught in the net (the swing is made early), or the ball may go over the baseline (the swing is made late), depending on the shifting of weight at the time when the player hits the ball. Accordingly, it is considered that there is a particular relationship between the time when the load value satisfies a predetermined condition and the time when the velocity of the center of gravity satisfies a predetermined condition, and therefore the motion of the player may be determined based on these times.

The present invention can also be applied to the determination of a motion of the player such as swinging their arms, rotating their hips, or shaking their head, with the shifting of their weight. That is, a determination may be made of not only the motion of hitting with a tool an object such as a ball, but also the motion of, for example, pitching a ball in baseball, or serving and receiving a ball in volleyball. That is, with the method described above, a determination can be made of a motion in which the load value detected by the load controller 36 changes when the player swings their arms or the like, and the position of the center of gravity also changes when the player shifts their weight.

In the present embodiment the second evaluation value is calculated based on a distance from the ideal straight line that represents a predetermined velocity of load and a predetermined velocity of the center of gravity. In another embodiment the second evaluation value may be calculated based on a calculated velocity of load and a calculated velocity of the center of gravity. For example, the second evaluation value may be determined by comparing the ratio of a calculated velocity of load to a calculated velocity of the center of gravity with a predetermined value. That is, the second evaluation value may be calculated by comparing the relationship (which may be a relationship determined by equations, or may be a value determined by proportion or products) between a predetermined velocity of load and a predetermined velocity of the center of gravity with the relationship between a calculated velocity of load and a calculated velocity of the center of gravity. In yet another embodiment the relationship between a predetermined velocity of load and a predetermined velocity of the center of gravity may not be limited to a straight line, and may be a curve.

In the present embodiment the second evaluation value is calculated based on the value of the velocity of load, which represents the degree of increase in the load, and the value of the velocity of the center of gravity. In another embodiment the velocity of load may be the degree of decrease in the load. In yet another embodiment the direction of the velocity of the center of gravity may also be taken into account. For example, the second evaluation value may be calculated in accordance with whether or not the direction of the velocity of the center of gravity (the movement direction of the center of gravity) and the value of the velocity of load at a particular time satisfy a particular relationship.

As described above, the motion of the player may be determined based on the relationship between load information about the change over time in the load value detected by the load controller 36 and information about the velocity of the center of gravity, which represents the velocity of movement of the position of the center of gravity. Here, the load information may be the maximum value (or the minimum value) of the load and the time of the maximum (or minimum) value, the local maximum (or the local minimum) of the load and the time of the local maximum (or minimum), the time when the load value becomes a predetermined value, the velocity of load, and the like. The information about the velocity of the center of gravity may be the value and direction of the velocity of the center of gravity, the maximum (or minimum) velocity of the center of gravity and the time of the maximum (or minimum) velocity, and the like.

In the present embodiment the third evaluation value is calculated as the area surrounded by the path of the position of the center of gravity; however, in another embodiment the third evaluation value may be calculated from the shape (e.g., the degree of bulging to the right or left) of the path of the position of the center of gravity. For example, the third evaluation value may be determined by the difference between the S-coordinate value of the point of predetermined frame times before the start of the downswing and the maximum S-coordinate value of the position of the center of gravity. When this difference is great, the path of the position of the center of gravity bulges in the S-axis positive direction, and therefore the ball is to slice if hit by a right-handed player.

In the present embodiment, based on whether or not a predetermined time has elapsed since the player has started the downswing, it is determined whether or not the player object 120 has hit the ball 122 to make a shot. That is, in the present embodiment, when the magnitude of the acceleration of the controller 22 has exceeded a predetermined threshold, it is determined that the player has started the downswing, and then the time when a predetermined time has elapsed since the downswing has been started is determined as the time of the impact. In another embodiment, when the magnitude and direction of the acceleration of the controller 22 have satisfied a predetermined condition (e.g., when the magnitude of the acceleration has fallen below a predetermined threshold, or when the direction of the acceleration has changed), it may be determined that a swing has been started. In yet another embodiment the player object 120 may start the downswing in accordance with whether or not an input has been made to the input means (e.g., the A-button 26d) of the controller 22, and then the time when a predetermined time has elapsed since the downswing has been started may be determined as the time of the impact. Alternatively, the time of the impact may be determined based on the orientation and acceleration of the controller 22. For example, since the player is approximately at rest at the top of the swing (in the state of FIG. 13A), when the acceleration sensor 74 detects the orientation of the controller 22, the game apparatus 12 can detect that the swing is at the top. When the player starts the downswing from this orientation, an acceleration occurs to the controller 22, and therefore the game apparatus 12 can detect the start of the downswing by detecting this acceleration. Then, since it is considered that the acceleration that occurs to the controller 22 becomes the maximum near the impact, the game apparatus 12 can also determine, as the time of the impact, the time when the acceleration has become the maximum. In this case, it is preferable that the maximum value of the acceleration that can be detected by the acceleration sensor 74 is sufficiently greater than the acceleration that occurs due to the motion of the player swinging the controller 22.

In the present embodiment the above process is performed using the load controller 36 provided with the four load sensors 364. In another embodiment the number of the load sensors may not necessarily be four, and may be three, or may be five or more. In addition, the four load sensors 364 may not necessarily be arranged at the four corners of the load controller 36, and may be arranged in any manner. That is, the number and the arrangement of the load sensors may be provided in any manner, and the position of the center of gravity can be calculated by making corrections that are specific to the geometrical arrangement of the load sensors.

In the present embodiment, data representing detected values from the load sensors 364 is transmitted to the game apparatus 12. In another embodiment the load controller 36 may calculate the total value of the loads detected by the load sensors 364 and the position of the center of gravity, and transmit the calculated total value and position of the center of gravity to the game apparatus 12. That is, the game apparatus 12 may receive a signal including the total load value and the position of the center of gravity that are calculated by the load controller 36, and the above information may be acquired from the signal received by the game apparatus 12.

The game program of the present invention may be provided to the game apparatus 12 not only via an external storage medium such as the optical disk 18 but also via a wired or wireless communication circuit. The program may be executed by a hand-held game apparatus. The game program may be stored in advance in a non-volatile storage device provided within the game apparatus 12. Note that an information storage medium (a computer-readable storage medium) that stores the game program may be a CD-ROM, a DVD, and an optical disk storage medium similar to these, or may be a non-volatile semiconductor memory.

In another embodiment the program for the determination of a motion may be executed by an information processing apparatus other than a game apparatus, such as a dedicated device for the determination of a motion (e.g., a training device for a golf swing determination) or a personal computer having an input device capable of measuring loads.

In the present embodiment the process of the flowchart described above is performed by the CPU 40 of the game apparatus 12 executing the game program. In another embodiment some or all of the process may be performed by a dedicated circuit provided in the game apparatus 12.

While the invention has been described in detail, the above description is in all aspects illustrative and not restrictive. It is understood that numerous other modifications and variations can be devised without departing from the scope of the invention.

What is claimed is:

1. A non-transitory computer-readable storage medium having stored therein an information processing program to be executed by a computer of an information processing apparatus for processing a signal from a first input device including a load sensor to which load is applied by a user, the information processing program causing the computer to perform functionality comprising:

acquiring, based on the signal from the first input device, load information about a change over time in the load applied to the first input device;

detecting a position of center of gravity of the user based on the signal from the first input device;

calculating a velocity of center of gravity, the velocity of center of gravity representing a velocity of movement of the position of center of gravity; and determining a given motion of the user based on a relationship between the load information and velocity-of-center-of-gravity information about the velocity of center of gravity.

2. The non-transitory computer-readable storage medium having stored therein the information processing program according to claim 1, wherein
the information processing program further causes the computer to perform functionality comprising storing, in a storage unit, therein load value data based on the signal from the first input device, the load value data representing the load applied to the first input device in a predetermined time period; and
acquiring the load information based on the load value data stored in the storage unit.

3. The non-transitory computer-readable storage medium having stored therein the information processing program according to claim 1, wherein the information processing program further causes the computer to perform functionality comprising:
acquiring, as the load information, a time when the load applied to the first input device satisfies a first condition; and
determining the given motion of the user based on the time when the load applied to the first input device satisfies the first condition and a time when the velocity of center of gravity satisfies a second condition.

4. The non-transitory computer-readable storage medium having stored therein the information processing program according to claim 3, wherein the information processing program further causes the commuter to perform functionality comprising:
acquiring a time when the load applied to the first input device becomes a maximum; and
determining the given motion of the user based on the time when the load becomes the maximum and a time when the velocity of center of gravity becomes a maximum.

5. The non-transitory computer-readable storage medium having stored therein the information processing program according to claim 4, wherein the information processing program further causes the computer to perform functionality comprising:
determining the given motion of the user based on a difference between the time when the load becomes the maximum and the time when the velocity of center of gravity becomes the maximum.

6. The non-transitory computer-readable storage medium having stored therein the information processing program according to claim 1, wherein the information processing program further causes the computer to perform functionality comprising:
acquiring a velocity of load as the load information, the velocity of load representing an amount of change in the load applied to the first input device in a predetermined time period; and
determining the given motion of the user based on the velocity of center of gravity and the velocity of load.

7. The non-transitory computer-readable storage medium having stored therein the information processing program according to claim 1, wherein the information processing program further causes the computer to perform functionality comprising:
acquiring a velocity of load as the load information, the velocity of load representing an amount of change in the load applied to the first input device in a predetermined time period; and
determining the given motion of the user by comparing a relationship between a predetermined velocity of load and a predetermined velocity of center of gravity with a relationship between the acquired velocity of load and the calculated velocity of center of gravity.

8. The non-transitory computer-readable storage medium having stored therein the information processing program according to claim 7, wherein
the given motion of the user is determined based on, in a coordinate system where the velocity of load is a first axis and the velocity of center of gravity is a second axis, a distance from a straight line or a curve to a point in the coordinate system, the straight line or the curve representing the relationship between the predetermined velocity of load and the predetermined velocity of center of gravity, the point representing the acquired velocity of load and the calculated velocity of center of gravity.

9. The non-transitory computer-readable storage medium having stored therein the information processing program according to claim 8, wherein
the given motion of the user is determined based on, in the coordinate system where the velocity of load is the first axis and the velocity of center of gravity is the second axis, a distance from a straight line to the point in the coordinate system, the straight line representing a relationship between a velocity of load and a velocity of center of gravity that are detected when the given motion of the user is made in an ideal manner, the point representing the acquired velocity of load and the calculated velocity of center of gravity.

10. The non-transitory computer-readable storage medium having stored therein the information processing program according to claim 9, wherein
an inclination of the straight line is approximately 2.

11. The non-transitory computer-readable storage medium having stored therein the information processing program according to claim 10, wherein
an intercept of the straight line is approximately 0.07.

12. The non-transitory computer-readable storage medium having stored therein the information processing program according to claim 9, wherein
an inclination of the straight line is from approximately 1.7 to 2.3.

13. The non-transitory computer-readable storage medium having stored therein the information processing program according to claim 12, wherein
an intercept of the straight line is from approximately 0.058 to 0.083.

14. The non-transitory computer-readable storage medium having stored therein the information processing program according to claim 13, wherein
the intercept of the straight line decreases when the inclination of the straight line increases.

15. The non-transitory computer-readable storage medium having stored therein the information processing program according to claim 1, wherein the information processing program further causes the computer to perform functionality comprising:
acquiring, as the load information, a time when the load applied to the first input device satisfies a first condition and a velocity of load, the velocity of load representing an amount of change in the load applied to the first input device in a predetermined time period;
making a first evaluation based on the time when the load applied to the first input device satisfies the first condition and the time when the velocity of center of gravity satisfies a second condition;
making a second evaluation based on the velocity of center of gravity and the velocity of load; and
determining the given motion of the user based on an evaluation result of the first evaluation unit and an evaluation result of the second evaluation unit.

16. The non-transitory computer-readable storage medium having stored therein the information processing program according to claim 15, wherein the information processing program further causes the computer to perform functionality comprising making a third evaluation based on a path of the detected position of center of gravity; and determining the given motion of the user based also on an evaluation result of the third evaluation unit.

17. The non-transitory computer-readable storage medium having stored therein the information processing program according to claim 15, wherein the information processing program further causes the computer to perform functionality comprising making a third evaluation based on an area surrounded by at least a part of a path of the detected position of center of gravity and a line connecting two of the detected positions of center of gravity; and determining the given motion of the user based also on an evaluation result.

18. The non-transitory computer-readable storage medium having stored therein the information processing program according to claim 15, wherein the information processing program further causes the computer to perform functionality comprising:

calculating a first evaluation value based on the time when the load applied to the first input device satisfies the first condition and the time when the velocity of center of gravity satisfies the second condition;

calculating a second evaluation value based on the velocity of center of gravity and the velocity of load; and changing the second evaluation value in accordance with a value of the first evaluation value, and determining the given motion of the user based on the first evaluation value and the changed second evaluation value.

19. The non-transitory computer-readable storage medium having stored therein the information processing program according to claim 18, wherein the second evaluation value is changed such that the greater the value of the first evaluation value, the smaller the value of the second evaluation value.

20. The non-transitory computer-readable storage medium having stored therein the information processing program according to claim 1, wherein whether or not a time of the given motion of the user is lagging behind a predetermined time is determined.

21. The non-transitory computer-readable storage medium having stored therein the information processing program according to claim 1, wherein the information processing apparatus further processes a signal from a second input device that is different from the first input device;

the information processing apparatus further causes the computer to perform functionality comprising setting, as a reference time, a time when an input from the second input device to the information processing apparatus satisfies a predetermined condition; and determining the given motion of the user based on a relationship between the acquired load information in a time period determined in accordance with the reference time and the velocity-of-center-of-gravity information.

22. The non-transitory computer-readable storage medium having stored therein the information processing program according to claim 21, wherein the information processing program further causes the computer to perform functionality comprising:

determining, based on a relationship between the load information acquired in the time period determined in accordance with the reference time and the velocity-of-center-of-gravity information acquired in the determined time period, the given motion of the user at a plurality of times in the time period.

23. The non-transitory computer-readable storage medium having stored therein the information processing program according to claim 21, wherein the second input device includes an acceleration sensor; and based on the signal from the second input device, the reference time setting unit sets, as the reference time, a time when a magnitude of an acceleration detected by the acceleration sensor has exceeded a predetermined threshold.

24. The non-transitory computer-readable storage medium having stored therein the information processing program according to claim 1, wherein the information processing program further causes the computer to perform functionality comprising displaying, based on a determination of the given motion of the user based on the relationship between the load information and the velocity-of-center-of-gravity information about the velocity of center of gravity, a state where a predetermined object provided in a virtual space moves in the virtual space.

25. An information processing apparatus for processing a signal from a first input device including a load sensor to which load is applied by a user, the information processing apparatus comprising:

a load information acquisition unit for, based on the signal from the first input device, acquiring load information about a change over time in the load applied to the first input device;

a position-of-center-of-gravity detection unit for detecting a position of center of gravity of the user based on the signal from the first input device;

a velocity-of-center-of-gravity calculation unit for calculating a velocity of center of gravity, the velocity of center of gravity representing a velocity of movement of the position of center of gravity; and a motion determination unit for determining a given motion of the user based on a relationship between the load information and velocity-of-center-of-gravity information about the velocity of center of gravity.

26. An information processing system for processing a signal from a first input device including a load sensor to which load is applied by a user, the information processing system comprising:

a memory; and one or more processors operatively associated with the memory and configured to perform functionality comprising:

a load information acquisition unit for, based on the signal from the first input device, acquiring load information about a change over time in the load applied to the first input device, a position-of-center-of-gravity detection unit for detecting a position of center of gravity of the user based on the signal from the first input device, a velocity-of-center-of-gravity calculation unit for calculating a velocity of center of gravity, the velocity of center of gravity representing a velocity of movement of the position of center of gravity, and a motion determination unit for determining a given motion of the user based on a relationship between the load information and velocity-of-center-of-gravity information about the velocity of center of gravity.

27. A method implemented using an information processing apparatus having one or more processors and for processing a signal from a first input device including a load sensor to which load is applied by a user, the method comprising:
  acquiring, based on the signal from the first input device, load information about a change over time in the load applied to the first input device;
  detecting a position of center of gravity of the user based on the signal from the first input device;
  calculating a velocity of center of gravity, the velocity of center of gravity representing a velocity of movement of the position of center of gravity; and
  determining a given motion of the user based on a relationship between the load information and velocity-of-center-of-gravity information about the velocity of center of gravity.

* * * * *